(12) United States Patent
Berry et al.

(10) Patent No.: US 10,605,459 B2
(45) Date of Patent: Mar. 31, 2020

(54) INTEGRATED COMBUSTOR NOZZLE FOR A SEGMENTED ANNULAR COMBUSTION SYSTEM

(71) Applicant: General Electric Company, Schenectady, NY (US)

(72) Inventors: Jonathan Dwight Berry, Simpsonville, SC (US); Stanley Kevin Widener, Greenville, SC (US); Michael John Hughes, State College, PA (US); Matthew Troy Hafner, Honea Path, SC (US); Joseph Vincent Citeno, Greenville, SC (US)

(73) Assignee: General Electric Company, Schenectady, NY (US)

( * ) Notice: Subject to any disclaimer, the term of this patent is extended or adjusted under 35 U.S.C. 154(b) by 494 days.

(21) Appl. No.: 15/464,419

(22) Filed: Mar. 21, 2017

(65) Prior Publication Data
US 2017/0299187 A1    Oct. 19, 2017

Related U.S. Application Data

(60) Provisional application No. 62/313,312, filed on Mar. 25, 2016.

(51) Int. Cl.
  *F23R 3/34* (2006.01)
  *F23R 3/28* (2006.01)
  (Continued)

(52) U.S. Cl.
  CPC .............. *F23R 3/286* (2013.01); *F01D 9/041* (2013.01); *F02C 7/18* (2013.01); *F02C 7/24* (2013.01);
  (Continued)

(58) Field of Classification Search
  CPC .. F23R 3/002; F23R 3/34; F23R 3/346; F23R 3/46; F23R 3/50
  See application file for complete search history.

(56) References Cited

U.S. PATENT DOCUMENTS 2,595,999 A    5/1952  Way et al.
2,625,792 A    1/1953  McCarthy et al.
(Continued)

FOREIGN PATENT DOCUMENTS

EP       2 551 597 A2    1/2013
WO    WO2014191495 A1   12/2014

OTHER PUBLICATIONS

International Search Report and Written Opinion issued in connection with corresponding PCT Application No. PCT/US2017/23751 dated Jun. 1, 2017.
(Continued)

*Primary Examiner* — Gerald L Sung
*Assistant Examiner* — Marc J Amar
(74) *Attorney, Agent, or Firm* — Dority & Manning, P.A.

(57) ABSTRACT

The present disclosure is directed to an integrated combustor nozzle for a segmented annular combustion system. The integrated combustor nozzle includes an outer liner segment, an inner liner segment, and a fuel injection panel extending radially between the outer liner segment and the inner liner segment. The fuel injection panel includes a first side wall, a second side wall, and a plurality of premixing channels between the first and second side walls, each of the premixing channels having an outlet on one of the first and second side walls. The aft end of the fuel injection panel defines a turbine nozzle.

24 Claims, 28 Drawing Sheets

(51) Int. Cl.
*F23R 3/50* (2006.01)
*F01D 9/04* (2006.01)
*F02C 7/18* (2006.01)
*F02C 7/24* (2006.01)

(52) U.S. Cl.
CPC ............... *F23R 3/283* (2013.01); *F23R 3/34* (2013.01); *F23R 3/346* (2013.01); *F23R 3/50* (2013.01); *F05D 2220/30* (2013.01); *F05D 2240/35* (2013.01); *F23R 2900/03341* (2013.01)

(56) References Cited

U.S. PATENT DOCUMENTS

| | | | |
|---|---|---|---|
| 3,433,015 A * | 3/1969 | Sneeden | F01D 9/041 60/804 |
| 3,657,882 A | 4/1972 | Hugoson | |
| 3,657,883 A | 4/1972 | DeCorso | |
| 3,750,398 A | 8/1973 | Adeelizzi et al. | |
| 4,016,718 A | 4/1977 | Lauck | |
| 4,158,949 A * | 6/1979 | Reider | F23R 3/50 60/737 |
| 4,195,474 A | 4/1980 | Bintz et al. | |
| 4,297,843 A | 11/1981 | Sato et al. | |
| 4,373,327 A | 2/1983 | Adkins | |
| 4,413,470 A | 11/1983 | Scheihing et al. | |
| 4,422,288 A | 12/1983 | Steber | |
| 4,614,082 A | 9/1986 | Sterman et al. | |
| 4,719,748 A | 1/1988 | Davis, Jr. et al. | |
| 4,720,970 A | 1/1988 | Hudson et al. | |
| 4,819,438 A | 4/1989 | Schultz | |
| 4,843,825 A | 7/1989 | Clark | |
| 4,903,477 A | 2/1990 | Butt | |
| 5,237,813 A | 8/1993 | Harris et al. | |
| 5,239,818 A * | 8/1993 | Stickles | F23R 3/04 60/737 |
| 5,297,385 A | 3/1994 | Dubell et al. | |
| 5,761,898 A | 6/1998 | Barnes et al. | |
| 5,826,430 A | 10/1998 | Little | |
| 5,839,283 A * | 11/1998 | Dobbeling | F23R 3/045 60/737 |
| 5,906,093 A | 5/1999 | Coslow et al. | |
| 5,924,288 A | 7/1999 | Fortuna et al. | |
| 5,960,632 A | 10/1999 | Abuaf et al. | |
| 6,082,111 A | 7/2000 | Stokes | |
| 6,085,514 A | 7/2000 | Benim et al. | |
| 6,098,397 A | 8/2000 | Glezer et al. | |
| 6,109,019 A | 8/2000 | Sugishita | |
| 6,116,013 A | 9/2000 | Moller | |
| 6,116,018 A | 9/2000 | Tanimura et al. | |
| 6,276,142 B1 | 8/2001 | Putz | |
| 6,298,656 B1 | 10/2001 | Donovan et al. | |
| 6,345,494 B1 | 2/2002 | Coslow | |
| 6,374,593 B1 | 4/2002 | Ziegner | |
| 6,412,268 B1 | 7/2002 | Cromer et al. | |
| 6,450,762 B1 | 9/2002 | Munshi | |
| 6,463,742 B2 | 10/2002 | Mandai et al. | |
| 6,523,352 B1 | 2/2003 | Takahashi et al. | |
| 6,546,627 B1 | 4/2003 | Sekihara et al. | |
| 6,568,187 B1 | 5/2003 | Jorgensen et al. | |
| 6,619,915 B1 | 9/2003 | Jorgensen | |
| 6,644,032 B1 | 11/2003 | Jorgensen et al. | |
| 7,010,921 B2 | 3/2006 | Intile et al. | |
| 7,056,093 B2 | 6/2006 | Self et al. | |
| 7,310,938 B2 | 12/2007 | Marcum et al. | |
| 7,334,960 B2 | 2/2008 | Glessner et al. | |
| RE40,658 E | 3/2009 | Powis et al. | |
| 7,665,309 B2 | 2/2010 | Parker et al. | |
| 7,874,138 B2 * | 1/2011 | Rubio | F23M 9/06 60/39.37 |
| 7,886,517 B2 | 2/2011 | Chopra et al. | |
| 8,015,818 B2 | 9/2011 | Wilson et al. | |
| 8,104,292 B2 | 1/2012 | Lee et al. | |
| 8,151,570 B2 | 4/2012 | Jennings et al. | |
| 8,272,218 B2 | 9/2012 | Fox et al. | |
| 8,281,594 B2 | 10/2012 | Wiebe | |
| 8,375,726 B2 | 2/2013 | Wiebe et al. | |
| 8,381,532 B2 * | 2/2013 | Berry | F01D 9/06 60/751 |
| 8,387,391 B2 | 3/2013 | Patel et al. | |
| 8,387,398 B2 | 3/2013 | Martin et al. | |
| 8,499,566 B2 | 8/2013 | Lacy et al. | |
| 8,549,861 B2 | 10/2013 | Huffman | |
| 8,590,313 B2 * | 11/2013 | Graves | F23R 3/06 60/748 |
| 8,752,386 B2 | 6/2014 | Fox et al. | |
| 9,016,066 B2 | 4/2015 | Wiebe et al. | |
| 9,255,490 B2 | 2/2016 | Mizukami et al. | |
| 9,335,050 B2 * | 5/2016 | Cunha | F23R 3/14 |
| 9,512,781 B2 | 12/2016 | Mizukami et al. | |
| 2002/0112483 A1 | 8/2002 | Kondo et al. | |
| 2003/0140633 A1 | 7/2003 | Shimizu et al. | |
| 2003/0167776 A1 | 9/2003 | Coppola | |
| 2003/0192320 A1 | 10/2003 | Farmer et al. | |
| 2006/0248898 A1 | 11/2006 | Buelow et al. | |
| 2007/0089419 A1 * | 4/2007 | Matsumoto | F23R 3/06 60/737 |
| 2008/0208513 A1 | 8/2008 | Dupuy et al. | |
| 2010/0058763 A1 * | 3/2010 | Rubio | F23M 9/06 60/737 |
| 2010/0077719 A1 | 4/2010 | Wilson et al. | |
| 2010/0287946 A1 | 11/2010 | Buelow et al. | |
| 2011/0179803 A1 * | 7/2011 | Berry | F01D 9/06 60/785 |
| 2011/0209482 A1 | 9/2011 | Toqan et al. | |
| 2012/0151928 A1 | 6/2012 | Patel et al. | |
| 2012/0151929 A1 | 6/2012 | Patel et al. | |
| 2012/0151930 A1 | 6/2012 | Patel et al. | |
| 2014/0260257 A1 | 9/2014 | Rullaud et al. | |
| 2014/0373548 A1 | 12/2014 | Hasselqvist et al. | |
| 2016/0215980 A1 * | 7/2016 | Chang | F02C 7/24 |
| 2017/0176014 A1 * | 6/2017 | Hughes | F23R 3/346 |

OTHER PUBLICATIONS

Nishimura, et al., The Approach to the Development of the Next Generation Gas Turbine and History of Tohoku Electric Power Company Combined Cycle Power Plants, GT2011-45464, Proceedings of ASME Turbo Expo 2011, Vancouver, British Columbia, Canada, Jun. 6-10, 2011, pp. 1-6.
U.S. Appl. No. 14/924,742, filed Oct. 28, 2015.
U.S. Appl. No. 14/944,341, filed Nov. 18, 2015.
U.S. Appl. No. 15/442,171, filed Feb. 24, 2017.
U.S. Appl. No. 15/442,203, filed Feb. 24, 2017.
U.S. Appl. No. 15/442,227, filed Feb. 24, 2017.
U.S. Appl. No. 15/442,255, filed Feb. 24, 2017.
U.S. Appl. No. 15/442,269, filed Feb. 24, 2017.
U.S. Appl. No. 15/442,292, filed Feb. 24, 2017.
U.S. Appl. No. 15/464,394, filed Mar. 21, 2017.
U.S. Appl. No. 15/464,400, filed Mar. 21, 2017.
U.S. Appl. No. 15/464,406, filed Mar. 21, 2017.
U.S. Appl. No. 15/464,411, filed Mar. 21, 2017.
U.S. Appl. No. 15/464,425, filed Mar. 21, 2017.
U.S. Appl. No. 15/464,431, filed Mar. 21, 2017.
U.S. Appl. No. 15/464,443, filed Mar. 21, 2017.
U.S. Appl. No. 15/464,452, filed Mar. 21, 2017.
U.S. Appl. No. 15/361,840, filed Nov. 28, 2016.
U.S. Appl. No. 15/406,820, filed Jan. 16, 2017.

* cited by examiner

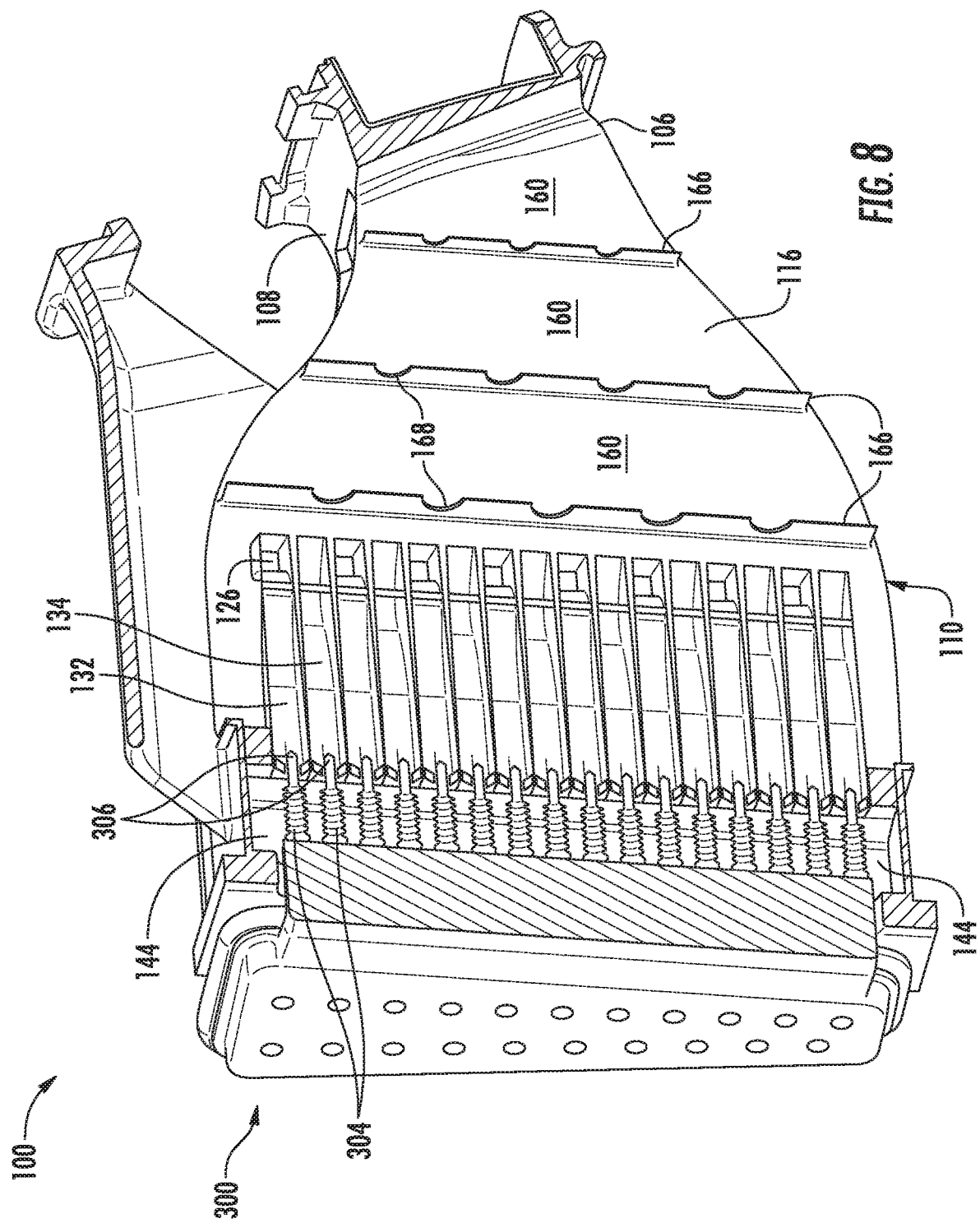

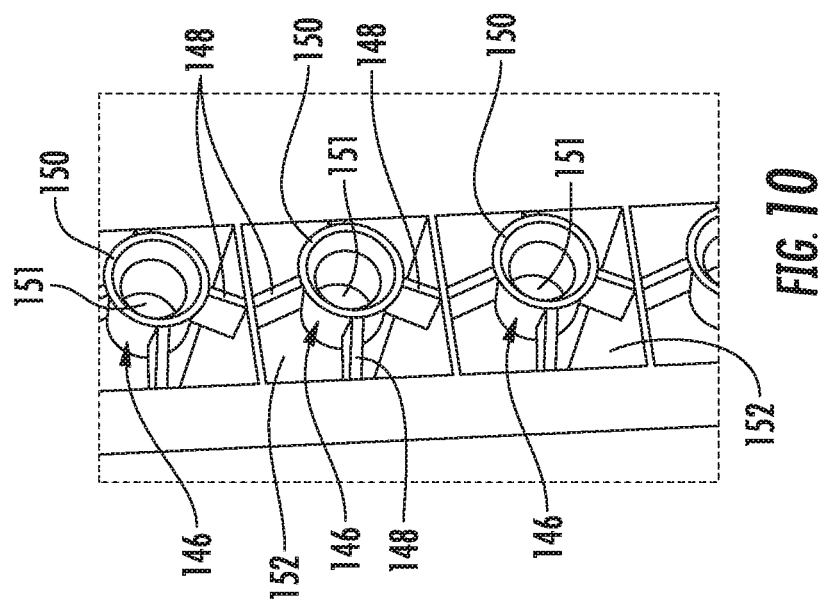
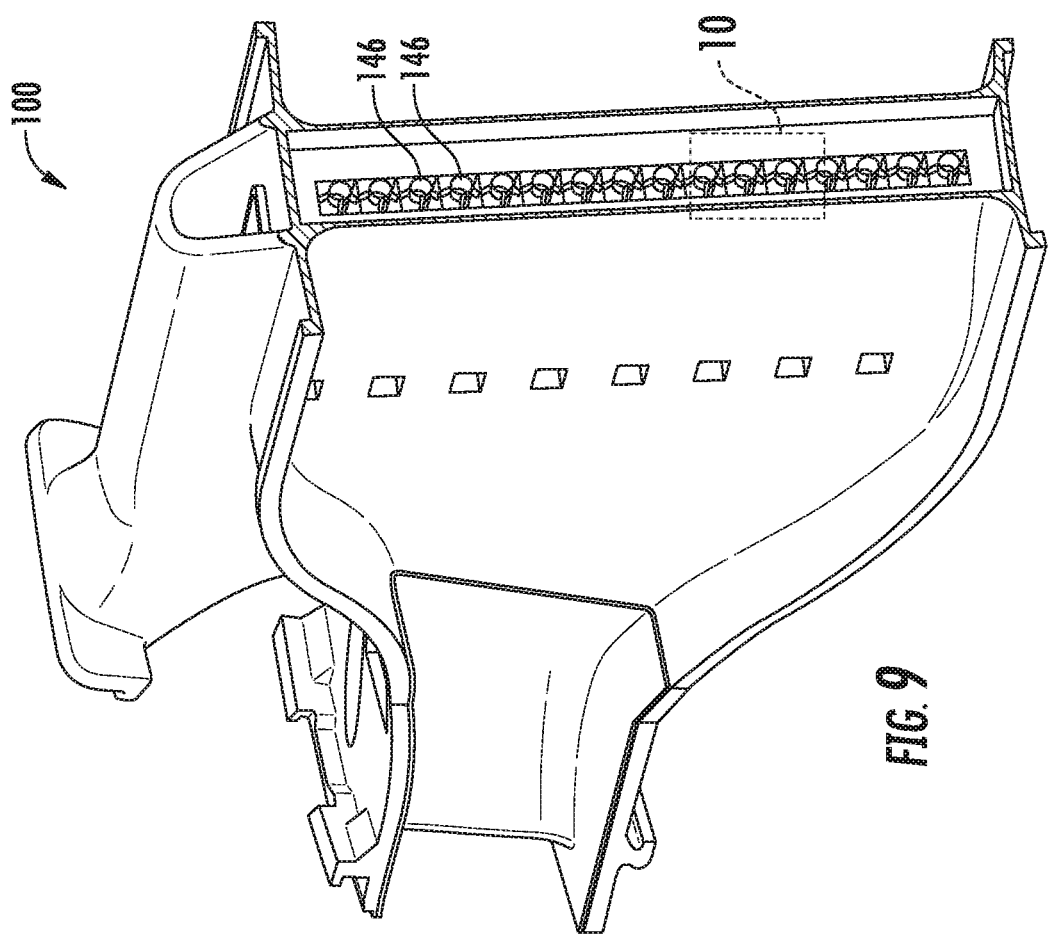

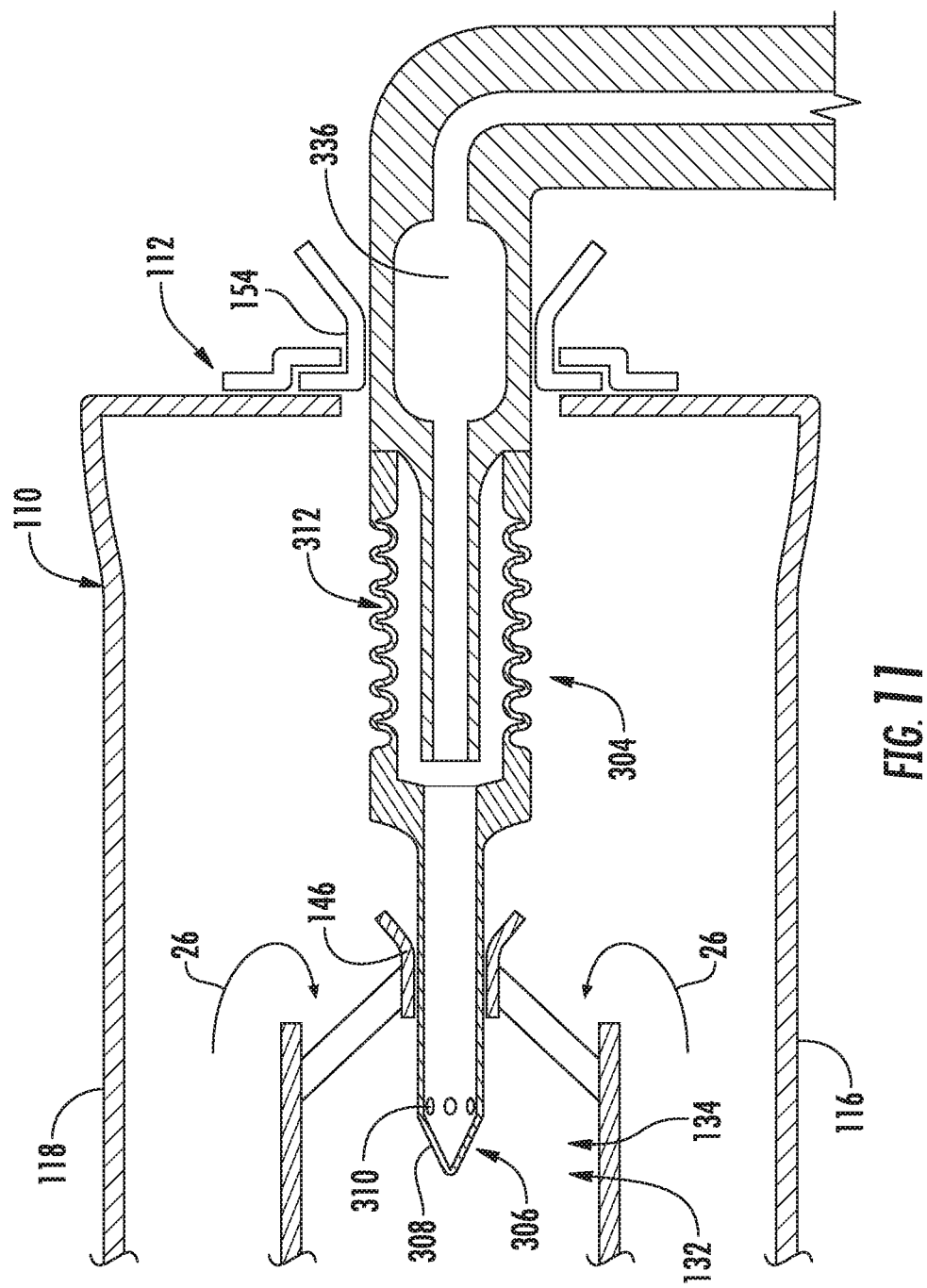

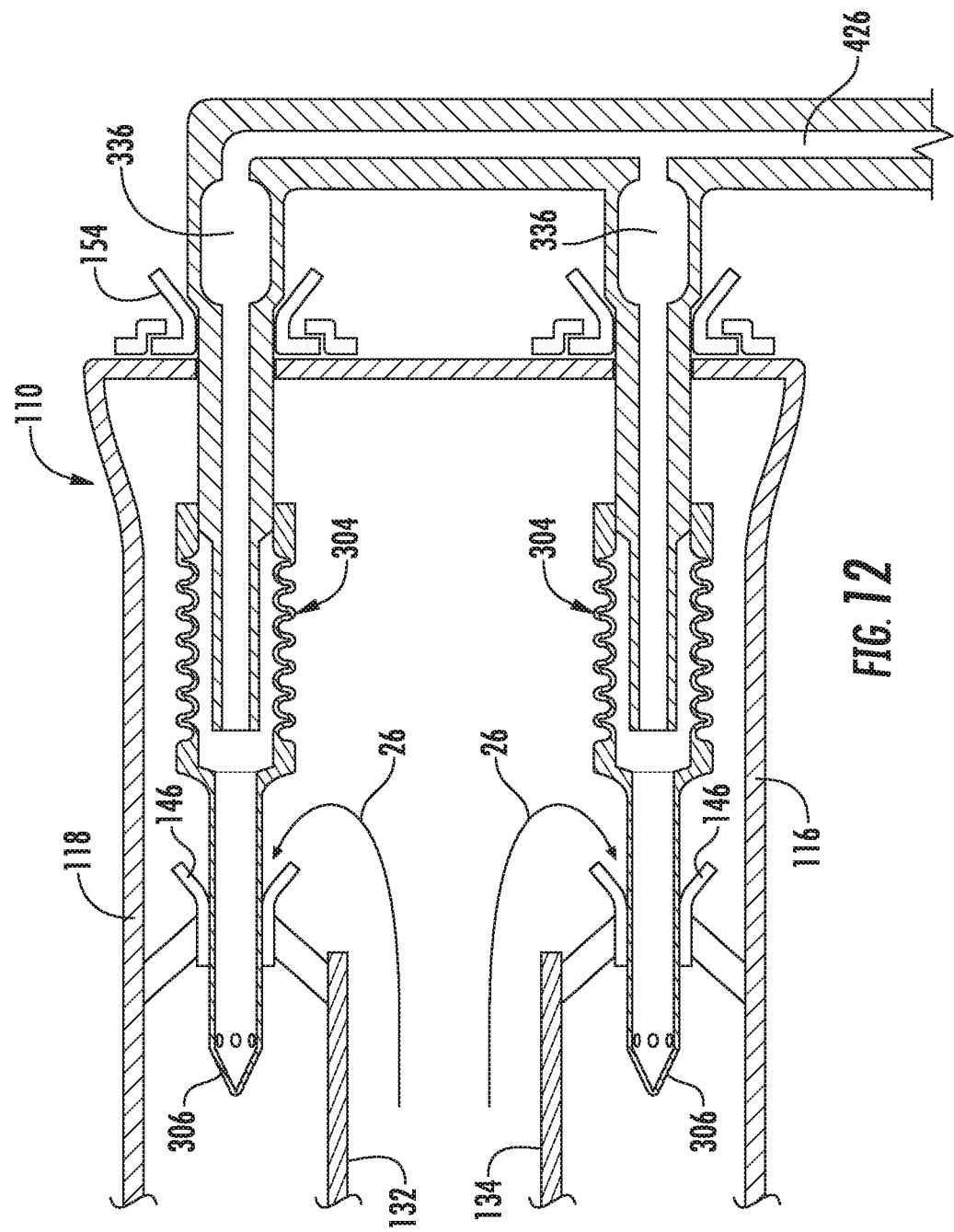

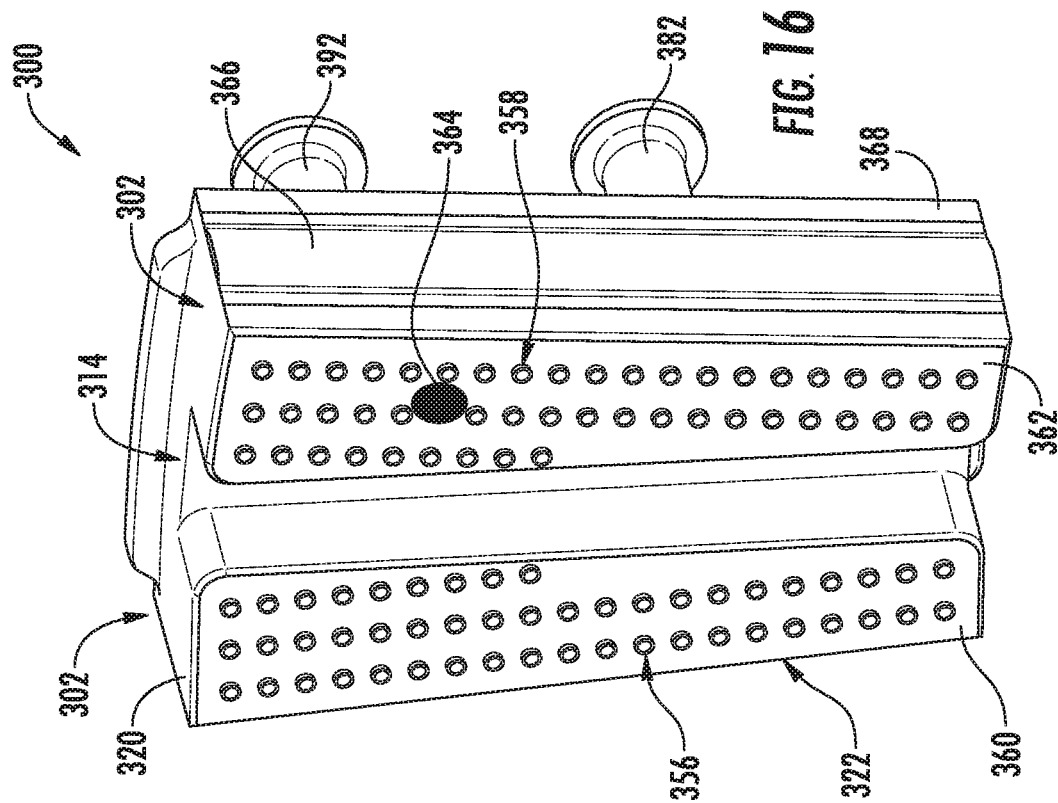
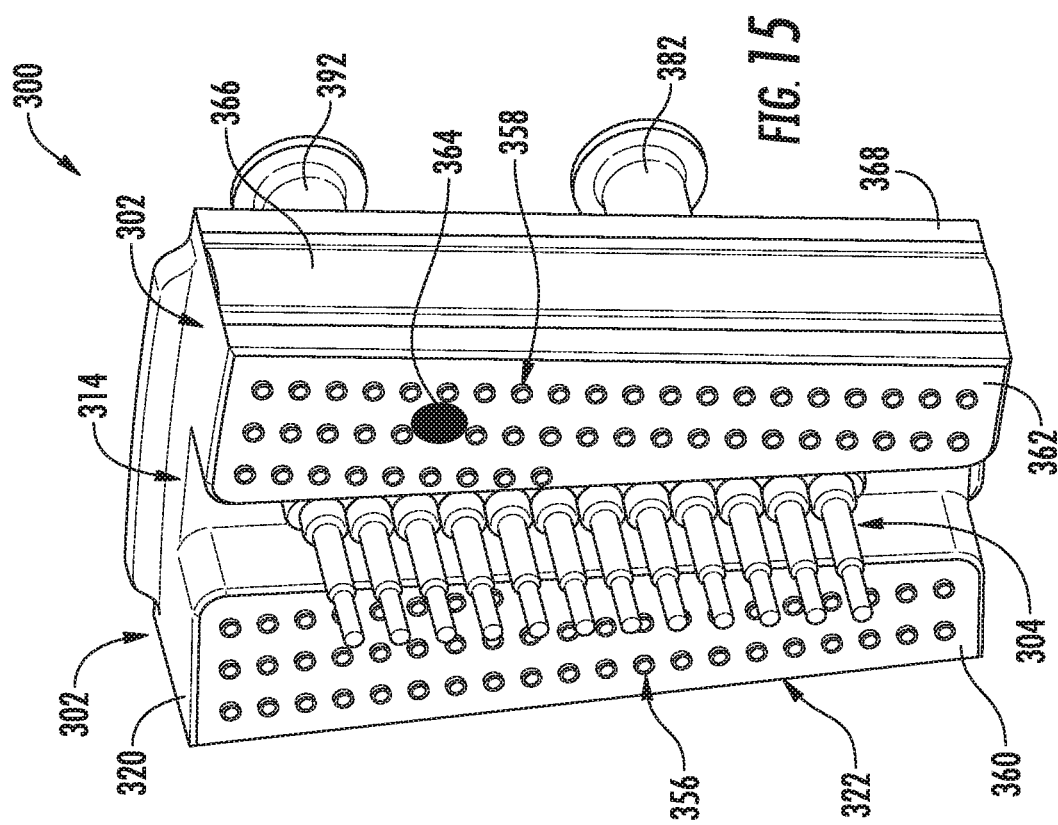

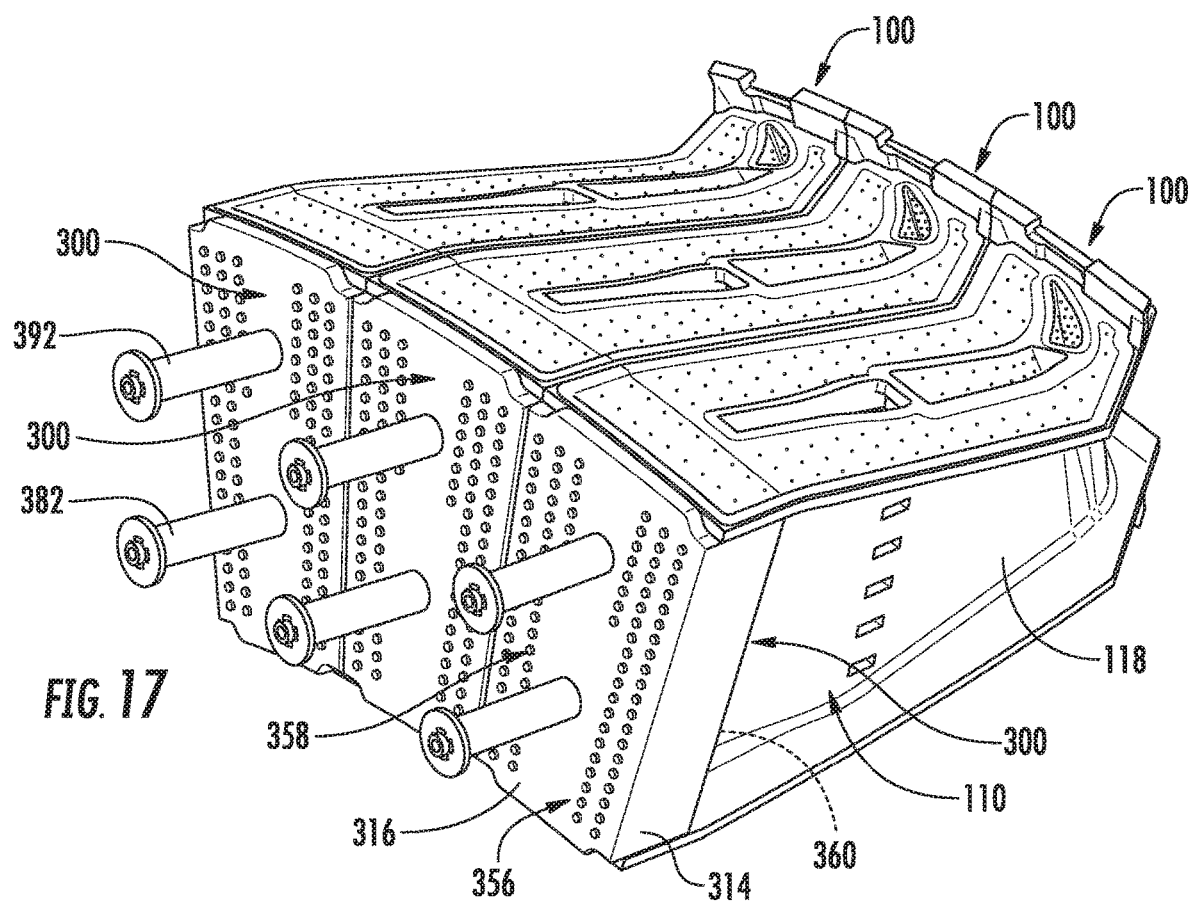

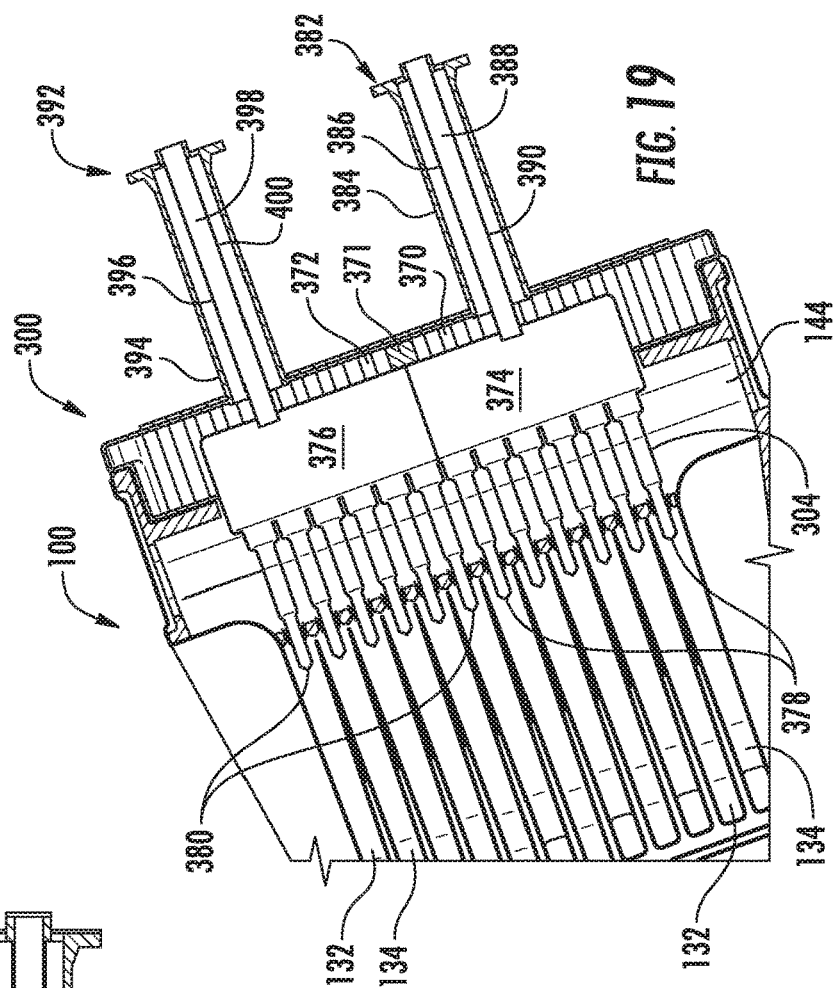
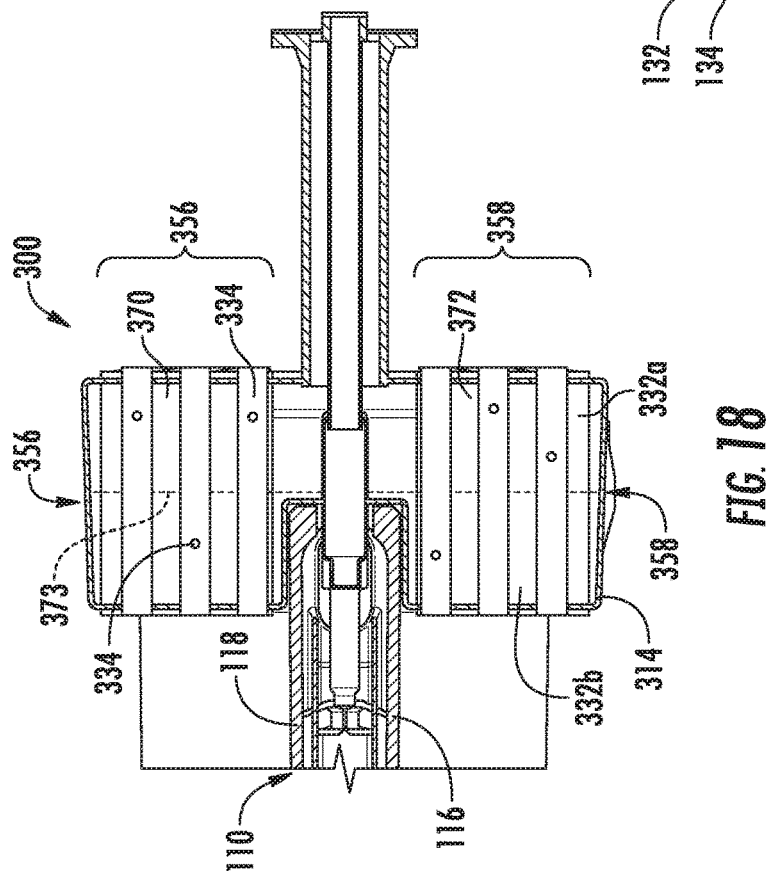

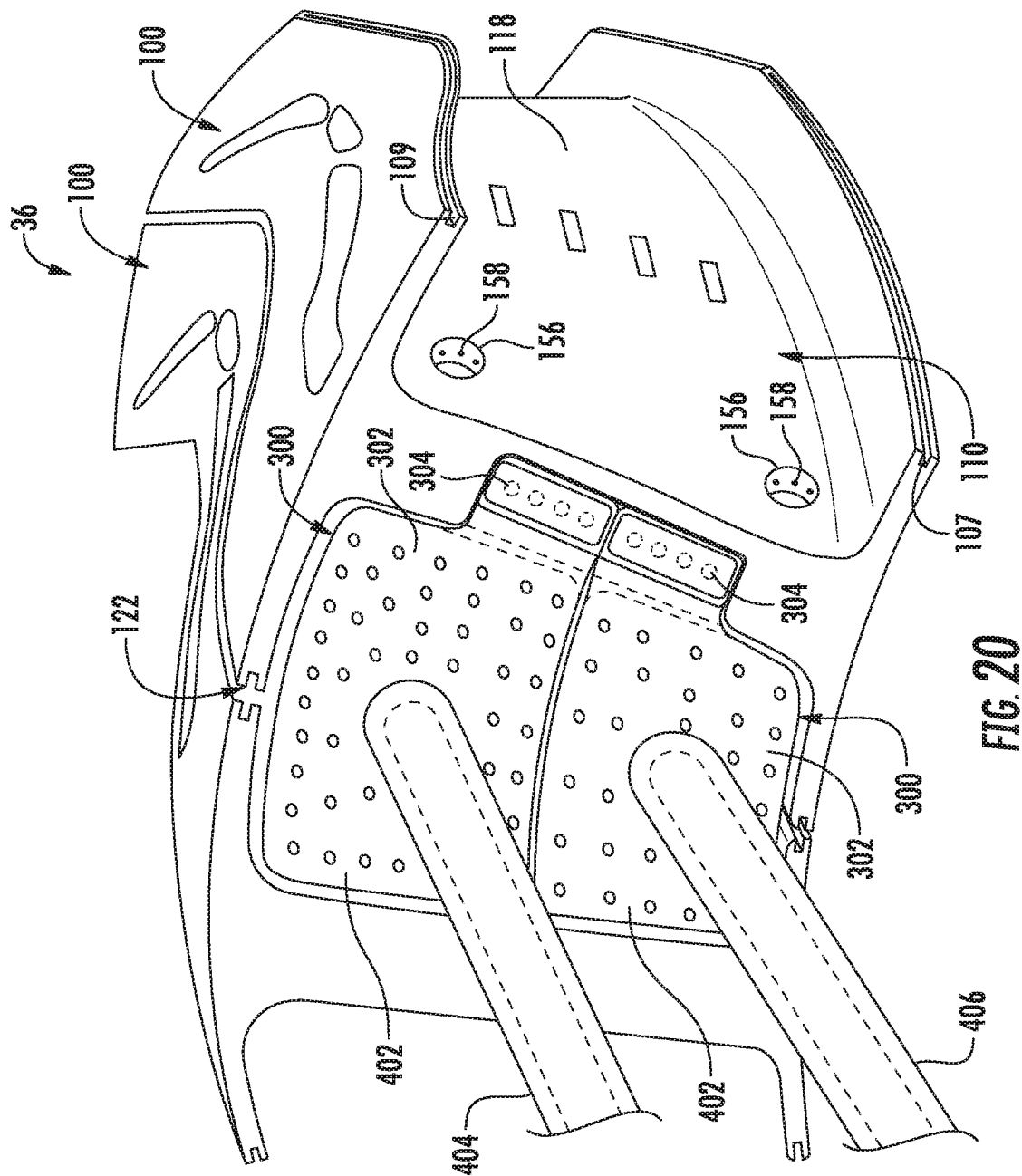

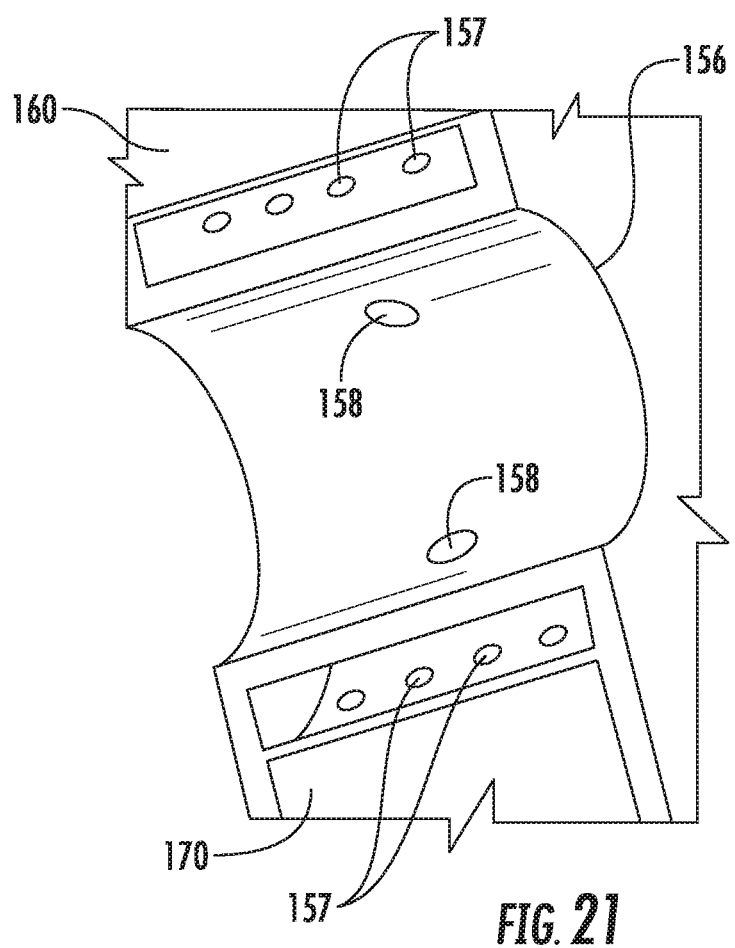

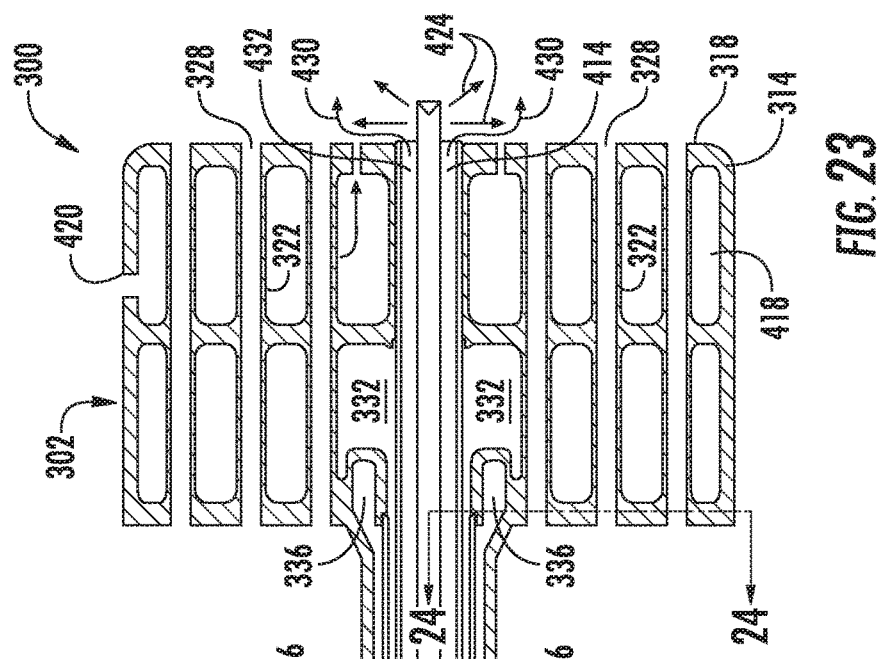
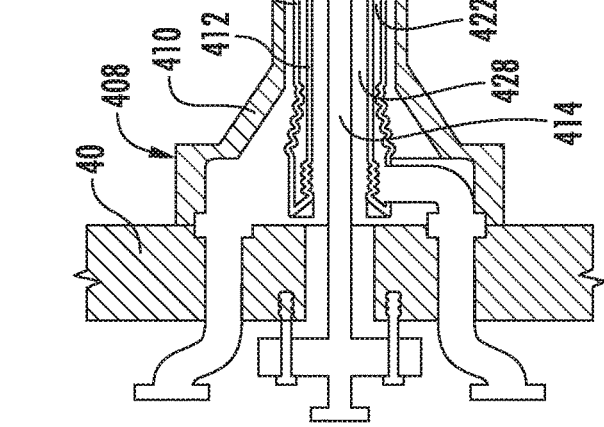
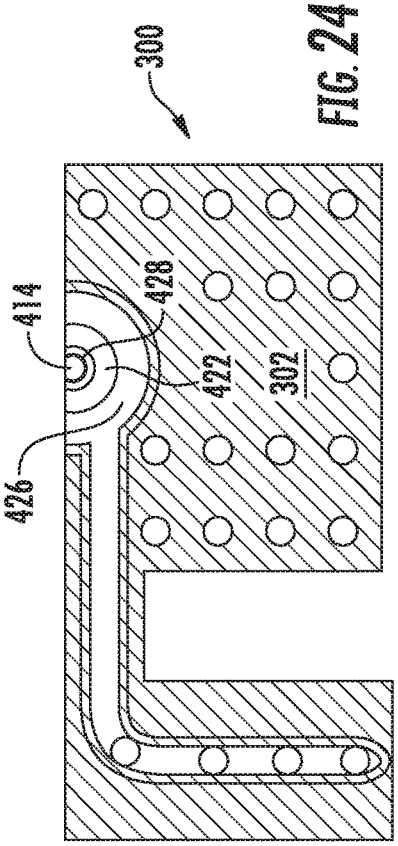

INTEGRATED COMBUSTOR NOZZLE FOR A SEGMENTED ANNULAR COMBUSTION SYSTEM

CROSS-REFERENCE TO RELATED APPLICATIONS

The present application is a non-provisional application, which claims priority to U.S. Provisional Application Ser. No. 62/313,312, filed Mar. 25, 2016, the entire disclosure of which is incorporated by reference herein.

STATEMENT REGARDING FEDERALLY SPONSORED RESEARCH OR DEVELOPMENT

This invention was made with Government support under Contract No. DE-FE0023965 awarded by the United States Department of Energy. The Government has certain rights in this invention.

TECHNICAL FIELD

The subject matter disclosed herein relates to a segmented annular combustion system for a gas turbine. More specifically, the disclosure is directed to an integrated combustor nozzle for a segmented annular combustion system for a gas turbine.

BACKGROUND

Industrial gas turbine combustion systems usually burn hydrocarbon fuels and produce air polluting emissions such as oxides of nitrogen (NOx) and carbon monoxide (CO). Oxidization of molecular nitrogen in the gas turbine depends upon the temperature of gas located in a combustor, as well as the residence time for reactants located in the highest temperature regions within the combustor. Thus, the amount of NOx produced by the gas turbine may be reduced or controlled by either maintaining the combustor temperature below a temperature at which NOx is produced, or by limiting the residence time of the reactant in the combustor.

One approach for controlling the temperature of the combustor involves pre-mixing fuel and air to create a fuel-air mixture prior to combustion. This approach may include the axial staging of fuel injectors where a first fuel-air mixture is injected and ignited at a first or primary combustion zone of the combustor to produce a main flow of high energy combustion gases, and where a second fuel-air mixture is injected into and mixed with the main flow of high energy combustion gases via a plurality of radially oriented and circumferentially spaced fuel injectors or axially staged fuel injector assemblies positioned downstream from the primary combustion zone. The injection of the second fuel-air mixture into the secondary combustion zone is sometimes referred to as a "jet-in-crossflow" arrangement.

Axially staged injection increases the likelihood of complete combustion of available fuel, which in turn reduces the air polluting emissions. However, with conventional axially staged fuel injection combustion systems, there are various challenges with balancing air flow to the various combustor components for cooling, to the head end of the combustor for the first fuel-air mixture, and/or to the axially staged fuel injectors for the second fuel-air mixture, while maintaining emissions compliance over the full range of operation of the gas turbine. Therefore, an improved gas turbine combustion system which includes axially staged fuel injection would be useful in the industry.

BRIEF DESCRIPTION OF THE TECHNOLOGY

Aspects and advantages are set forth below in the following description, or may be obvious from the description, or may be learned through practice.

Various embodiments of the present disclosure are directed to a segmented annular combustion system having a plurality of annularly arranged integrated combustor nozzles, where each integrated combustor nozzle is fluidly coupled to at least one fuel injection module, which includes a fuel nozzle portion and a plurality of fuel injection lances. Each integrated combustor nozzle includes an inner liner segment, an outer liner segment, and one or more fuel injection panels that extend between the inner liner segment and the outer liner segment. Each fuel injection panel is provided with a plurality of premixing channels therein, which receive fuel from the plurality of fuel injection lances. The fuel nozzle portion introduces a first fuel-air mixture to a primary combustion zone, and the fuel injection panel introduces a second fuel-air mixture into a secondary combustion zone axially downstream of the first combustion zone. The arrangement of the integrated combustor nozzles and fuel injection modules defines an annular array of primary combustion zones and secondary combustion zones.

In at least one embodiment, a downstream end portion of each fuel injection panel transitions into a turbine nozzle or airfoil that is seamlessly integrated with the fuel injection panel. As such, each fuel injection panel may be considered an airfoil without a leading edge. In particular embodiments, the turbine nozzle is at least partially wrapped or sheathed by a thermal shield or cover. In particular embodiments, a portion of the turbine nozzle and/or the shield may be formed from a ceramic matrix composite material.

Each fuel injection lance feeds or extends into a corresponding premixing channel defined within a respective fuel injection panel, and the premixing channels may be described as pressure side premixing channels or suction side premixing channels based on the location of their outlets. In one embodiment, the fuel injection panel has outlets located along a single side (pressure side or suction side). The outlets may be located in one or more axial planes, regardless of whether the outlets are located on one or both of the pressure side and the suction side. The outlets on the pressure side may be located in a different axial plane from the outlets on the suction side.

Each fuel injection lance or at least some of the fuel injection lances provide a fuel through one of the corresponding pressure side premixing channels or one of the suction side premixing channels. A forward or upstream end portion of each fuel injection panel includes a number of annular collars or seatings formed and/or sized to receive a respective fuel injection lance. Each collar may be supported by a number of struts. The struts may be spaced about a respective collar so as to allow air to flow around the fuel injection lance and into the corresponding pressure side premixing channel or the corresponding suction side premixing channel.

In particular embodiments, the pressure side premixing channels and/or the suction side premixing channels may have a long, straight portion and a curved portion defined proximate to a respective pressure side injection outlet or a suction side injection outlet. In particular embodiments, every other premixing channel is curved to direct flow from a first side (e.g., a pressure side) of the fuel injection panel, while the remaining premixing channels are curved to direct flow from the opposite side (e.g., a suction side) of the fuel injection panel. In particular embodiments, the pressure side premixing channels and the suction side premixing channels may be made integrally with the pressure side wall and the suction side wall of the fuel injection panel. In particular embodiments, the pressure side premixing channels and/or the suction side premixing channels may traverse radially inwardly or radially outwardly, between the pressure side wall and the suction side wall rather than along an axial or longitudinal plane of the corresponding fuel injection panel. In particular embodiments, all of the premixing channels may include a curved portion that curves in the same direction (i.e., toward the pressure side or the suction side), such that all of the fuel-air introduction by the fuel injection panel occurs on a single side of the fuel injection panel.

In particular embodiments, pressure side injection outlets and/or suction side injection outlets are set at different axial distances from either a forward end of the integrated combustor nozzle or an aft end of the integrated combustor nozzle. In particular embodiments, the pressure side premixing channels and/or the suction side premixing channels may be set or formed at different angles between the pressure side wall and the suction side wall. In particular embodiments, the injection outlets on the pressure side and/or the suction side may be arranged in one or more axial planes (i.e., on a given side, at least one outlet may be axially off-set from a radially adjacent outlet). In particular embodiments, the pressure side premixing channels and/or the suction side premixing channels may be formed with similar or dissimilar sizes and/or geometries. In particular embodiments, the pressure side premixing channels and/or the suction side premixing channels may be sized to control air flow split.

In particular embodiments, a pressure side wall thickness and/or a suction side wall thickness of each or some of the fuel injection panels may vary along the axial or longitudinal length and/or the radial span of the respective fuel injection panel.

In particular embodiments, the overall panel thickness may vary along the axial length and/or the radial span of the respective fuel injection panel. Variations in the panel thickness may provide advantages such as control of combustion velocities/residence time, adequate penetration of the secondary fuel jets into the flow of combustion products, and overall cooling effectiveness. In particular embodiments, each or at least some of integrated combustor nozzles may also include openings for permitting cross-fire between circumferentially adjacent integrated combustor nozzles. The cross-fire segments may be provided with air passages that create resonator features as well.

Those of ordinary skill in the art will better appreciate the features and aspects of such embodiments, and others, upon review of the specification.

BRIEF DESCRIPTION OF THE DRAWINGS

A full and enabling disclosure of the various embodiments, including the best mode known at the time of filing, is set forth more particularly in the remainder of the specification, including reference to the accompanying figures, in which:

FIG. 8 provides a cross-sectioned view of the combustor nozzle, as taken along line 8-8 of FIG. 5, according to at least one embodiment;

FIG. 9 provides a cross-sectioned downstream perspective view of an exemplary combustor nozzle, according to at least one embodiment of the present disclosure;

FIG. 10 provides an enlarged view of a portion of an exemplary fuel injection panel as shown in FIG. 9, according to at least one embodiment of the present disclosure;

FIG. 11 provides an overhead (top down) cross-sectioned view of a portion of an exemplary fuel injection panel with an exemplary fuel injection lance, according to at least one embodiment of the present disclosure;

FIG. 12 provides an overhead (top down) cross-sectioned view of a portion of an exemplary fuel injection panel with a pair of exemplary fuel injection lances, according to another embodiment of the present disclosure;

FIG. 15 provides an upstream perspective view of the fuel injection module, according to another embodiment of the present disclosure;

FIG. 16 provides an upstream perspective view of an alternate fuel injection module, according to another embodiment of the present disclosure;

FIG. 17 provides a downstream perspective view of three fuel injection modules (as shown in FIG. 15) mounted to three circumferentially adjacent combustor nozzles, according to one embodiment of the present disclosure;

FIG. 18 provides a cross-sectioned top view of a portion of the integrated combustor nozzle, which includes a portion of a fuel injection panel and a fuel injection module as shown in FIG. 17, according to at least one embodiment of the present disclosure;

FIG. 19 provides a cross-sectioned side view of the embodiment of the fuel injection module illustrated in FIG. 15, as installed into an exemplary combustor nozzle, according to one embodiment of the present disclosure;

FIG. 20 provides a downstream perspective view of a portion of an exemplary segmented annular combustion system including a pair of circumferentially adjacent combustor nozzles and a pair of radially mounted fuel injection modules, according to at least one embodiment of the present disclosure;

FIG. 21 provides a perspective view of a portion of a cross-fire tube, as shown incorporated in the combustor nozzle of FIG. 20;

FIG. 22 provides a downstream perspective view of an exemplary fuel injection module, according to at least one embodiment of the present disclosure;

FIG. 23 provides a cross-sectioned side view of an exemplary fuel injection module configured for both gas fuel and liquid fuel operation, according to at least one embodiment of the present disclosure;

FIG. 24 provides a cross-sectioned view of a portion of the fuel injection module shown in FIG. 23, according to one embodiment of the present disclosure;

DETAILED DESCRIPTION

Figure 1:
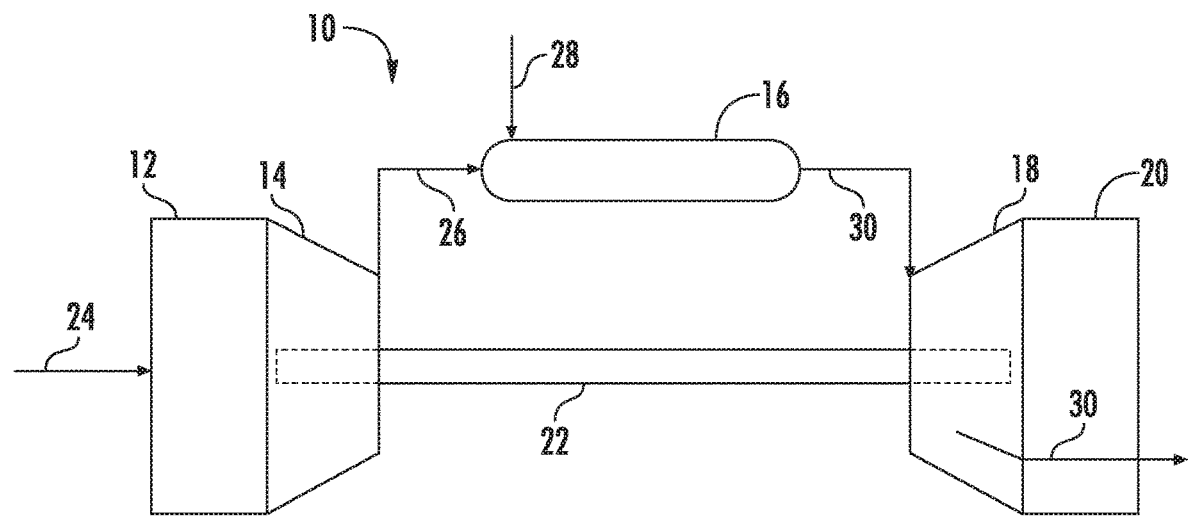
FIG. 1 is a functional block diagram of an exemplary gas turbine that may incorporate various embodiments of the present disclosure.

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a segmented annular combustion system for a land-based power-generating gas turbine for purposes of illustration, one of ordinary skill in the art will readily appreciate that embodiments of the present disclosure may be applied to any type of combustor for a turbomachine and are not limited to annular combustion systems for land-based power-generating gas turbines unless specifically recited in the claims.

Referring now to the drawings, FIG. 1 illustrates a schematic diagram of an exemplary gas turbine 10. The gas turbine 10 generally includes an inlet section 12, a compressor 14 disposed downstream of the inlet section 12, a combustion section 16 disposed downstream of the compressor 14, a turbine 18 disposed downstream of the combustion section 16, and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustion section 16. At least a portion of the compressed air 26 is mixed with a fuel 28 within the combustion section 16 and burned to produce combustion gases 30. The combustion gases 30 flow from the combustion section 16 into the turbine 18, wherein energy (kinetic and/or thermal) is transferred from the combustion gases 30 to rotor blades (not shown), thus causing shaft 22 to rotate. The mechanical rotational energy may then be used for various purposes, such as to power the compressor 14 and/or to generate electricity. The combustion gases 30 exiting the turbine 18 may then be exhausted from the gas turbine 10 via the exhaust section 20.

Figure 2:
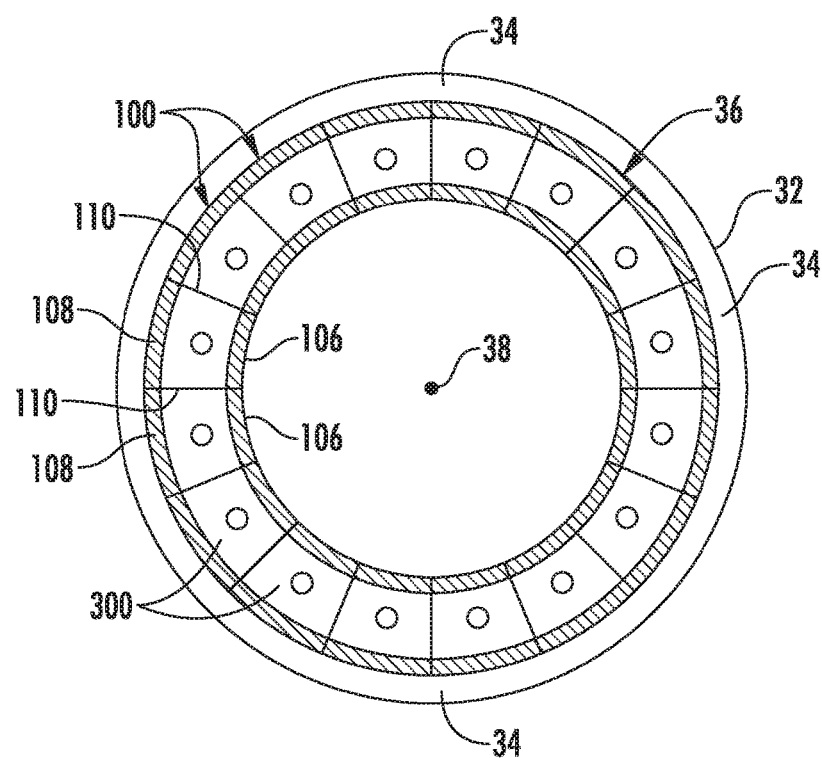
FIG. 2 is an upstream view of an exemplary combustion section of a gas turbine, according to at least one embodiment of the present disclosure.

FIG. 2 provides an upstream view of the combustion section 16, according to various embodiments of the present disclosure. As shown in FIG. 2, the combustion section 16 may be at least partially surrounded by an outer or compressor discharge casing 32. The compressor discharge casing 32 may at least partially define a high pressure plenum 34 that at least partially surrounds various components of the combustor 16. The high pressure plenum 34 may be in fluid communication with the compressor 14 (FIG. 1) so as to receive the compressed air 26 therefrom. In various embodiments, as shown in FIG. 2, the combustion section 16 includes a segmented annular combustion system 36 that includes a number of integrated combustor nozzles 100 arranged circumferentially around an axial centerline 38 of the gas turbine 10, which may be coincident with the gas turbine shaft 22.

Figure 3:
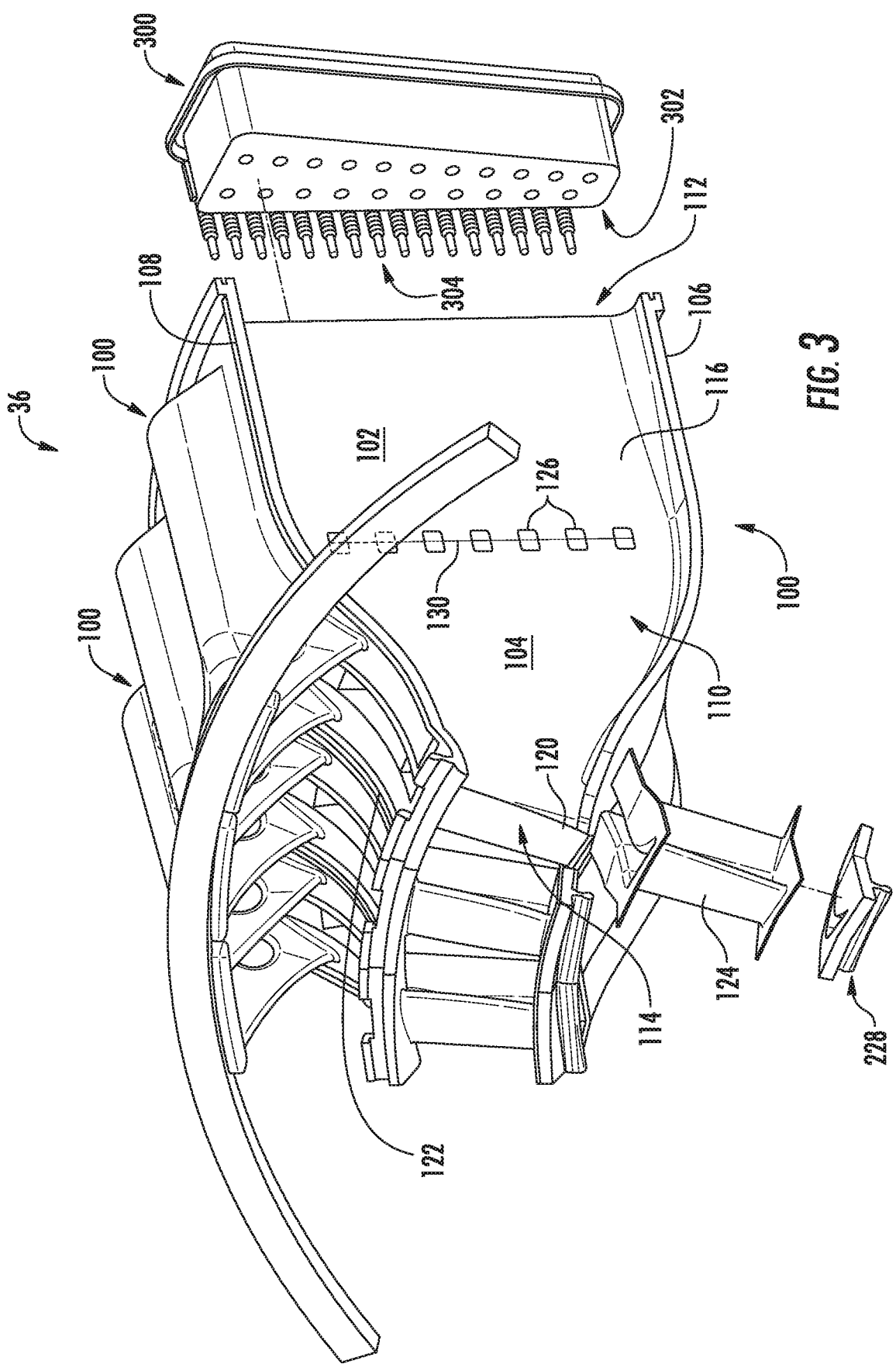
FIG. 3 is a partially exploded perspective view of a pressure side of a portion of an exemplary segmented annular combustion system, according to at least one embodiment of the present disclosure.
Figure 4:
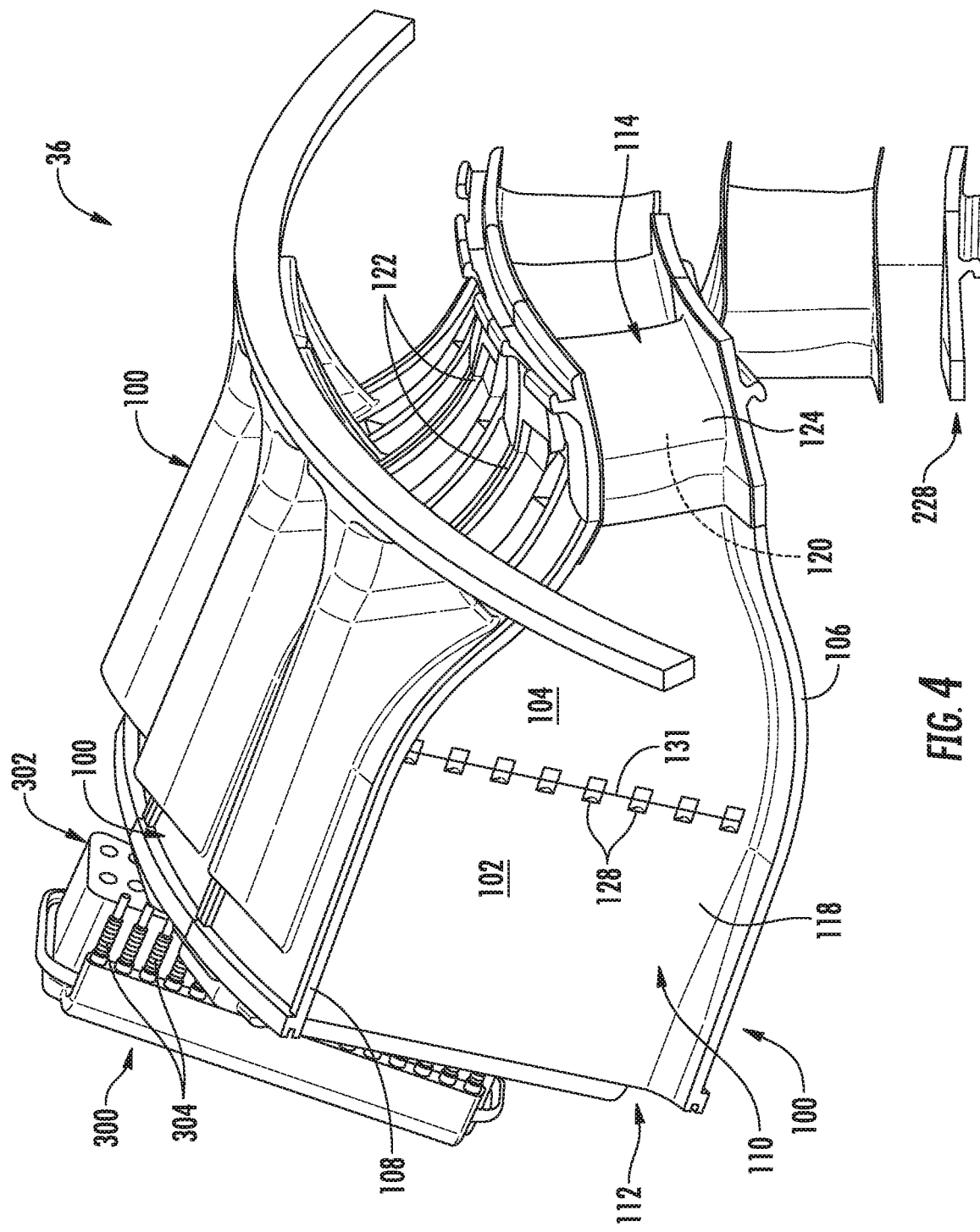
FIG. 4 is a partially exploded perspective view of a suction side of a portion of an exemplary segmented annular combustion system, according to at least one embodiment of the present disclosure.

FIG. 3 provides a partially exploded perspective view of a portion of the segmented annular combustion system 36, as viewed from a first side, according to at least one embodiment of the present disclosure. FIG. 4 provides a partially exploded perspective view of a portion of the segmented annular combustion system 36, as viewed from a second side, according to at least one embodiment of the present disclosure. As shown collectively in FIGS. 2, 3 and 4, the segmented annular combustion system 36 includes a plurality of integrated combustor nozzles 100. As described further herein, each combustor nozzle 100 includes a first side wall and a second side wall. In particular embodiments, the first side wall is a pressure side wall, while the second side wall is a suction side wall, based on the integration of the side walls with corresponding pressure and suction sides of a downstream turbine nozzle 120. It should be understood that any references made herein to pressure side walls and suction side walls are representative of particular embodiments, such references being made to facilitate discussion, and that such references are not intended to limit the scope of any embodiment, unless specific context dictates otherwise.

As shown collectively in FIGS. 3 and 4, each circumferentially adjacent pair of combustor nozzles 100 defines a respective primary combustion zone 102 and a respective secondary combustion zone 104 therebetween, thereby forming an annular array of primary combustion zones 102 and secondary combustion zones 104. The primary combustion zones 102 and the secondary combustion zones 104 are circumferentially separated, or fluidly isolated, from adjacent primary combustion zones 102 and secondary combustion zones 104, respectively, by the fuel injection panels 110.

As shown collectively in FIGS. 3 and 4, each combustor nozzle 100 includes an inner liner segment 106, an outer liner segment 108, and a hollow or semi-hollow fuel injection panel 110 that extends between the inner liner segment 106 and the outer liner segment 108. It is contemplated that more than one (e.g., 2, 3, 4, or more) fuel injection panels 110 may be positioned between the inner liner segment 106 and the outer liner segment 108, thereby reducing the number of joints between adjacent liner segments that require sealing. For ease of discussion herein, reference will be made to integrated combustor nozzles 100 having a single fuel injection panel 110 between respective inner and outer liner segments 106, 108, although a 2:1 ratio of liner segments to fuel injection panels is not required. As shown in FIGS. 3 and 4, each fuel injection panel 110 includes forward or upstream end portion 112, an aft or downstream end portion 114, a first (pressure) side wall 116 (FIG. 3) and a second (suction) side wall 118 (FIG. 4).

The segmented annular combustion system 36 further includes a plurality of annularly arranged fuel injection modules 300, shown in FIGS. 3 and 4 exploded away from the combustor nozzle 100. Each fuel injection module 300 includes a fuel nozzle portion 302 (shown as a bundled tube fuel nozzle) and a plurality of fuel injection lances 304, which are configured for installation in the forward end portion 112 of a respective fuel injection panel 110. For purposes of illustration herein, the fuel nozzle portion 302 may be referred to as a "bundled tube fuel nozzle" or "bundled tube fuel nozzle portion." However, the fuel nozzle portion 302 may include or comprise any type of fuel nozzle or burner (such as a swirling fuel nozzle or swozzle), and the claims should be not limited to bundled tube fuel nozzle unless specifically recited as such.

Each fuel injection module 300 may extend at least partially circumferentially between two circumferentially adjacent fuel injection panels 110 and/or at least partially radially between a respective inner liner segment 106 and outer liner segment 108 of the respective combustor nozzle 100. During axially staged fuel injection operation, the bundled tube fuel nozzle portion 302 provides a stream of premixed fuel and air (that is, a first combustible mixture) to the respective primary combustion zone 102, while the fuel injection lances 304 provide fuel (as part of a second combustible mixture) to the respective secondary combustion zone 104 via a plurality of pressure side and/or suction side premixing channels described in detail below.

In at least one embodiment, as shown in FIGS. 3 and 4, the downstream end portion 114 of one or more of the fuel injection panels 110 transitions into a generally airfoil-shaped turbine nozzle 120, which directs and accelerates the flow of combustion products toward the turbine blades. Thus, the downstream end portion 114 of each fuel injection panel 110 may be considered an airfoil without a leading edge. When the integrated combustor nozzles 100 are mounted within the combustion section 16, the turbine nozzle 120 may be positioned immediately upstream from a stage of turbine rotor blades of the turbine 18.

As used herein, the term "integrated combustor nozzle" refers to a seamless structure that includes the fuel injection panel 110, the turbine nozzle 120 downstream of the fuel injection panel, the inner liner segment 106 extending from the forward end 112 of the fuel injection panel 110 to the aft end 114 (embodied by the turbine nozzle 120), and the outer liner segment 108 extending from the forward end 112 of the fuel injection panel 110 to the aft end 114 (embodied by the turbine nozzle 120). In at least one embodiment, the turbine nozzle 120 of the integrated combustor nozzle 100 functions as a first-stage turbine nozzle and is positioned upstream from a first stage of turbine rotor blades.

As described above, one or more of the integrated combustor nozzles 100 is formed as an integral, or unitary, structure or body that includes the inner liner segment 106, the outer liner segment 108, the fuel injection panel 110, and the turbine nozzle 120. The integrated combustor nozzle 100 may be made as an integrated or seamless component, via casting, additive manufacturing (such as 3D printing), or other manufacturing techniques. By forming the combustor nozzle 100 as a unitary or integrated component, the need for seals between the various features of the combustor nozzle 100 may be reduced or eliminated, part count and costs may be reduced, and assembly steps may be simplified or eliminated. In other embodiments, the combustor nozzle 100 may be fabricated, such as by welding, or may be formed from different manufacturing techniques, where components made with one technique are joined to components made by the same or another technique.

In particular embodiments, at least a portion or all of each integrated combustor nozzle 100 may be formed from a ceramic matrix composite (CMC) or other composite material. In other embodiments, a portion or all of each integrated combustor nozzle 100 and, more specifically, the turbine nozzle 120 or its trailing edge, may be made from a material that is highly resistant to oxidation (coated with a thermal barrier coating) or may be coated with a material that is highly resistant to oxidation.

In another embodiment (not shown), at least one of the fuel injection panels 110 may taper to a trailing edge that is aligned with a longitudinal (axial) axis of the fuel injection panel 110. That is, the fuel injection panel 110 may not be integrated with a turbine nozzle 120. In these embodiments, it may be desirable to have an uneven count of fuel injection panels 110 and turbine nozzles 120. The tapered fuel injection panels 110 (i.e., those without integrated turbine nozzles 120) may be used in an alternating or some other pattern with fuel injection panels 110 having integrated turbine nozzles 120 (i.e., integrated combustor nozzles 100).

Returning again to FIGS. 3 and 4, in some embodiments, an axial joint or split line 122 may be formed between the inner liner segments 106 and the outer liner segments 108 of circumferentially adjacent integrated combustor nozzles 100. The split line 122 may be oriented along a circumferential center of the respective primary combustion zone 102 and the secondary combustion zone 104 formed between each pair of adjacent integrated combustor nozzles 100 or at some other location. In one embodiment, one or more seals (such as spline-type) seals may be disposed along each joint 122, which includes recessed seal-receiving areas (not shown) in one or both of the respective adjacent edges of the liner segment 106 or 108. A separate spline-type seal may be used between each circumferentially adjacent turbine nozzle 120 of adjacent integrated combustor nozzles 100. In other embodiments (not shown), the liner segments 106, 108 may extend circumferentially across multiple integrated combustor nozzles 100, in which case fewer seals per combustion system 36 are needed, and some subset of combustion zones 102, 104 may have surrounding split lines 122 and seals.

Figure 5:
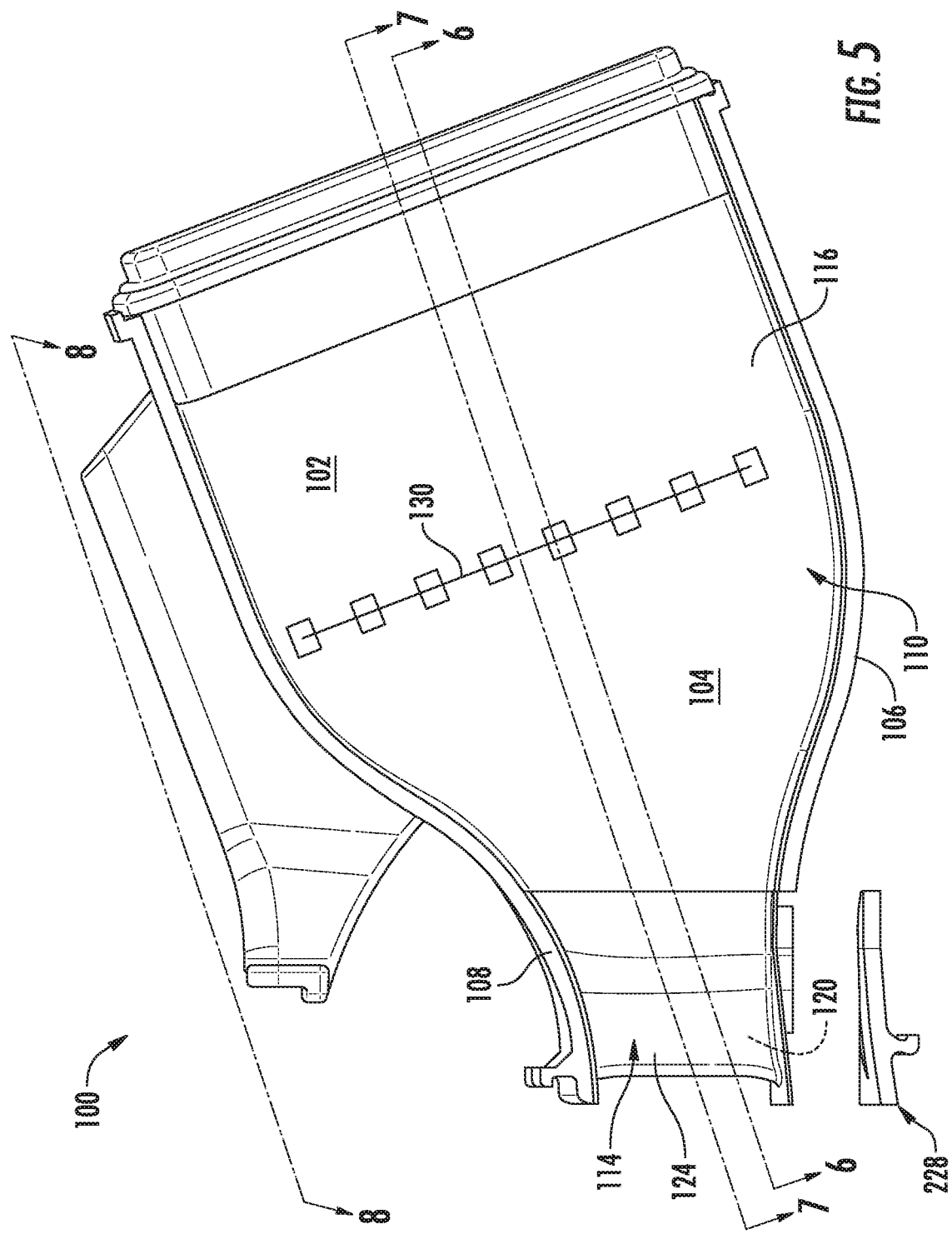
FIG. 5 is a cross-sectioned view of a pressure side of an exemplary combustor nozzle and a corresponding fuel injection module, according to at least one embodiment of the present disclosure.

FIG. 5 provides a cross-sectioned view of a pressure side 116 of an exemplary integrated combustor nozzle 100 at least partially assembled, according to at least one embodiment of the present disclosure. In particular embodiments, as shown collectively in FIGS. 3, 4 and 5, the turbine nozzle 120 portion or a portion of the downstream end portion 114 of one or more of the fuel injection panels 110 may be at least partially covered or sheathed by a corresponding shield 124. FIGS. 3 and 4 provide views with one shield 124 separated from a corresponding turbine nozzle portion 120 of the fuel injection panel 110 and two additional shields 124 installed on circumferentially adjacent turbine nozzles 120. The shields 124 may be formed from any material suitable for the high temperature operating environment of the integrated combustor nozzles 100. For example, in one or more embodiments one or more of the shields 124 may be formed from a CMC or other material that is highly resistant to oxidation. In some instances, the shield 124 may be coated with a thermal barrier coating.

In particular embodiments, as shown in FIGS. 3, 4 and 5, a portion of the inner liner segment 106 proximate to the downstream end portion 114 of the fuel injection panel 110 may be formed to allow the shield 124 to slide over the turbine nozzle 120. An inner hook plate 228, which is mounted to the inner liner segment 106, may be used to to secure the shield 124 in place.

In various embodiments, as shown in FIG. 3, each fuel injection panel 110 may include a plurality of radially spaced pressure side injection outlets 126 defined along the pressure side wall 116. As shown in FIG. 4, each fuel injection panel 110 may include a plurality of radially spaced suction side injection outlets 128 defined along the suction side wall 118. Each respective primary combustion zone 102 is defined upstream from the corresponding pressure side injection outlets 126 and/or suction side injection outlets 128 of a pair of circumferentially adjacent integrated combustor nozzles 100. Each secondary combustion zone 104 is defined downstream from the corresponding pressure side injection outlets 126 and/or suction side injection outlets 128 of the pair of circumferentially adjacent integrated combustor nozzles 100.

As shown in FIGS. 3, 4, and 5 collectively, the pressure side injection outlets 126 and the suction side injection outlets 128 of two circumferentially adjacent fuel injection panels 110 define respective injection plane(s) 130, 131 from which a second fuel and air mixture is injected into a flow of combustion gases originating from the respective primary combustion zone 102. In particular embodiments, the pressure side injection plane 130 and the suction side injection plane 131 may be defined or axially staged at the same axial distance from the downstream end portion 114 of the fuel injection panel 110. In other embodiments, the pressure side injection plane 130 and the suction side injection plane 131 may be defined or axially staged at different axial distances from the downstream end portion 114 of the fuel injection panel 110.

Although FIGS. 3 and 5 illustrate the plurality of pressure side injection outlets 126 as residing in a common radial or injection plane 130 with respect to an axial centerline of the integrated combustor nozzle 100 or at a common axial distance from the downstream end portion 114 of the fuel injection panel 110, in particular embodiments, one or more of the pressure side injection outlets 126 may be staggered axially with respect to radially adjacent pressure side injection outlets 126, thereby off-setting the axial distances of the pressure side injection outlets 126 to the downstream end portion 114 for particular pressure side injection outlets 126.

Similarly, although FIG. 4 illustrates the plurality of suction side injection outlets 128 in a common radial or injection plane 131 or at a common axial distance from the downstream end portion 114 of the fuel injection panel 110, in particular embodiments, one or more of the suction side injection outlets 128 may be staggered axially with respect to radially adjacent suction side injection outlets 128, thereby off-setting the axial distances of the pressure side injection outlets 128 to the downstream end portion 114 for particular suction side injection outlets 128.

Further, while the injection outlets 126, 128 are illustrated as having a uniform size (i.e., cross-sectional area), it is contemplated that it may be desirable, in some circumstances, to employ different sized injection outlets 126, 128 in different areas of the fuel injection panel 110. For instance, injection outlets 126, 128 having a larger diameter may be used in the radial central portion of the fuel injection panel 110, while injection outlets 126, 128 having a smaller diameter may be used in areas proximate the inner liner segment 106 and outer liner segment 108. Likewise, it may be desirable to have injection outlets 126 or 128 on a given side wall 116 or 118 be of a size different from the injection outlets 128 or 126 of the opposite side wall 118 or 116.

Figure 13:
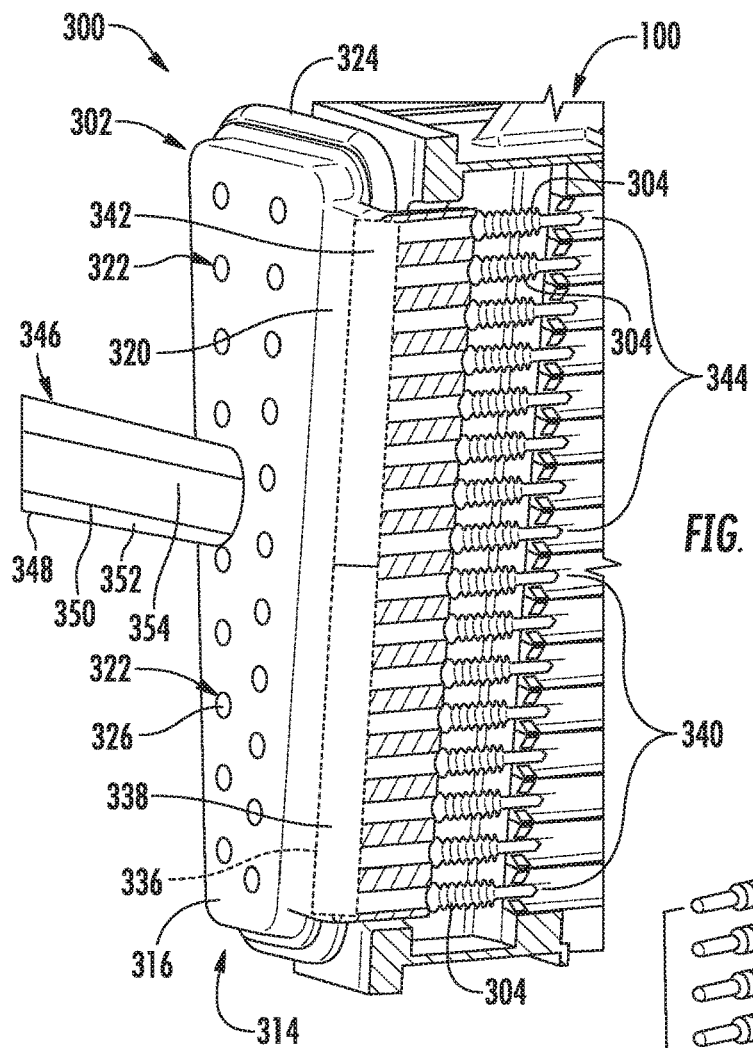
FIG. 13 provides a downstream perspective view of an exemplary fuel injection module inserted into a portion of an exemplary combustor nozzle, according to one embodiment of the present disclosure.

As mentioned above, in at least one embodiment, it may be desirable to have the secondary fuel-air introduction occur from a single side (e.g., the pressure side wall 116 or the suction side wall 118) of the fuel injection panel 110. Thus, each fuel injection panel 110 may be provided with only a single set of premixing channels having outlets on a common side wall (116 or 118). Moreover, each fuel injection panel 110 may be provided with two (or more) subsets of premixing channels on a single side wall, which are fueled separately by respective subsets of fuel injection lances 304, with fuel to each subset of lances 304 being independently activated, reduced, or deactivated. In other embodiments, each fuel injection panel 110 may be provided with two (or more) subsets of premixing channels having outlets on both side walls (116 and 118), which are fueled separately by respective subsets of fuel injection lances 304 (as shown in FIG. 13), with fuel to each subset of lances 304 being independently activated, reduced, or deactivated.

Figure 6:
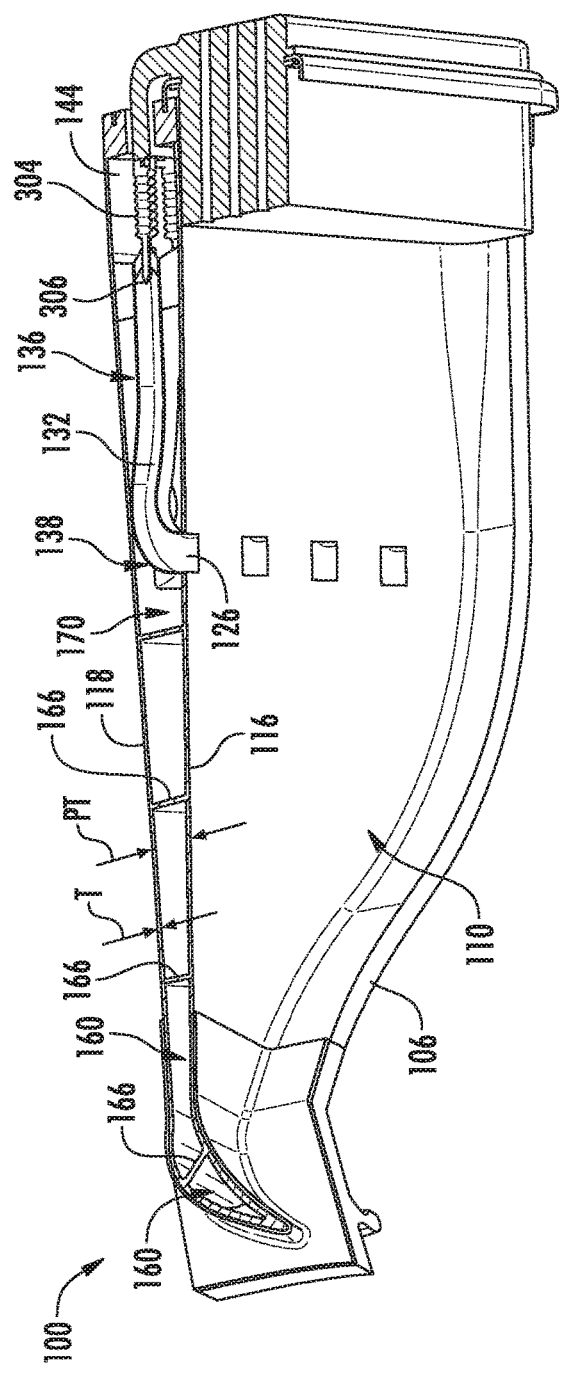
FIG. 6 provides a cross-sectioned perspective view of the combustor nozzle, as taken along line 6-6 of FIG. 5, according to one embodiment of the present disclosure.
Figure 7:
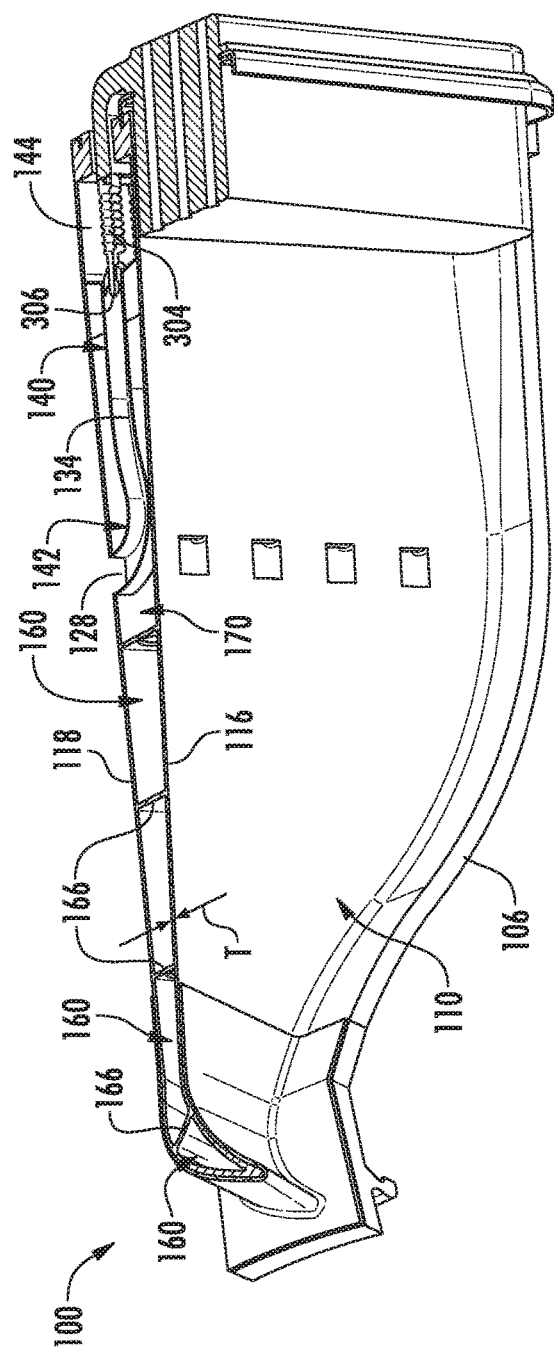
FIG. 7 provides a cross-sectioned perspective view of the combustor nozzle, as taken along line 7-7 of FIG. 5, according to one embodiment of the present disclosure.

FIGS. 6, 7 and 8 provide cross-sectioned views of the combustor nozzle 100 shown in FIG. 5, as taken along cross-sectional line 6-6, cross-sectional line 7-7, and cross-sectional line 8-8, respectively.

As shown collectively in FIGS. 6 and 7, each fuel injection panel 110 includes a plurality of premixing channels that have outlets on a side of the fuel injection panel 110. In one instance, pressure side premixing channels 132 (FIG. 6) are those channels having outlets 126 on the pressure side 116, while suction side premixing channels 134 (FIG. 7) are those channels having outlets 128 on the pressure side 118. Each pressure side premixing channel 132 is in fluid communication with a respective pressure side injection outlet 126. Each suction side premixing channel 134 is in fluid communication with a respective suction side injection outlet 128. In at least one embodiment, as shown in FIG. 6, the pressure side premixing channels 132 are defined within the fuel injection panel 110 between the pressure side wall 116 and the suction side wall 118. In at least one embodiment, as shown in FIG. 7, the suction side premixing channels 134 are defined within the fuel injection panel 110 between the pressure side wall 116 and the suction side wall 118.

As mentioned above, it is contemplated that the fuel injection panel 110 may have premixing channels (132 or 134) that terminate in outlets located along a single side (either the pressure side wall 116 or the suction side wall 118, respectively). Thus, while reference is made herein to embodiments having outlets 126, 128 on both the pressure side wall 116 and the suction side wall 118, it should be understood that there is no requirement that both the pressure side wall 116 and the suction side wall 118 have outlets 126, 128 for delivering a fuel-air mixture unless recited in the claims.

In particular embodiments, as shown in FIGS. 6 and 7, a wall thickness T of either or both of the pressure side wall 116 and the suction side wall 118 of the fuel injection panel 110 may vary along the axial (or longitudinal) length and/or along a radial span of the fuel injection panel 110. For example, the wall thickness T of either or both of the pressure side wall 116 and the suction side wall 118 of the fuel injection panel 110 may vary between the upstream end portion 112 and the downstream end portion 114 and/or between the inner liner segment 106 and the outer liner segment 108 (FIG. 5).

In particular embodiments, as illustrated in FIG. 6, an overall injection panel thickness PT may vary along the axial (or longitudinal) length and/or along a radial span of the fuel injection panel 110. For example, the pressure side wall 116 and/or the suction side wall 118 may include a concave portion that bulges outwardly towards and/or into the flow of combustion gases flowing between two circumferentially adjacent integrated combustor nozzles 100. The bulge or variation in overall injection panel thickness PT may occur at any point along the radial span and/or the axial length of the respective pressure side wall 116 or the suction side wall 118. Panel thickness PT or the position of the bulge may vary along the axial length and/or the radial span of the pressure side wall 116 or the suction side wall 118 to tailor the local areas to achieve a certain target velocity and residence time profile without requiring a change in wall thickness T. It is not required that the bulge area be symmetrical on both the pressure side wall 116 and the suction side wall 118 of a given fuel injection panel 110.

In particular embodiments, as shown in FIG. 6, one or more of the pressure side premixing channels 132 may have a generally straight or linear portion 136 extending along a longitudinal axis of the fuel injection panel 110 and a generally curved portion 138 defined just upstream from the respective pressure side injection outlet 126. In particular embodiments, as shown in FIG. 7, one or more of the suction side premixing channels 134 may have a generally straight portion 140 extending along the longitudinal axis of the fuel injection panel 110 and a curved portion 142 defined just upstream from the corresponding suction side injection outlet 128. The curved portions 138, 142 may include an inner radius (toward the upstream end 112 of the fuel injection panel 110) and an outer radius (toward the downstream end 114 of the fuel injection panel 110). In at least one embodiment, as shown in FIG. 8, the pressure side premixing channels 132 may be spaced radially apart or separated by corresponding suction side premixing channels 134.

In particular embodiments, as shown in FIGS. 6 and 7, the pressure side premixing channels 132 and/or the suction side premixing channels 134 may traverse or wind between the pressure side wall 116 and the suction side wall 118 of the fuel injection panel 110. In one embodiment, the pressure side premixing channels 132 and/or the suction side premixing channels 134 may traverse radially inwardly and/or outwardly between the pressure side wall 116 and the suction side wall 118 rather than along a straight or constant axial (or longitudinal) plane of the fuel injection panel 110.

The pressure side premixing channels 132 and/or the suction side premixing channels 134 may be oriented at different angles within the fuel injection panel 110. In particular embodiments, one or more of the pressure side premixing channels 132 and/or the suction side premixing channels 134 may be formed with varying sizes and/or geometries. In particular embodiments, one or more of the premixing channels 132, 134 may include a mixing-enhancing feature therein, such as a bend, a kink, a twist, a helical portion, a turbulator, or the like.

As shown in FIGS. 6, 7 and 8 collectively, fuel injection lances 304 from a respective fuel injection module 300 extend through a premix air plenum 144 defined within the fuel injection panel 110 and specifically defined between the pressure side wall 116 and the suction side wall 118 (FIGS. 6 and 7) proximate to the upstream end portion 112 of the fuel injection panel 110. A downstream end portion 306 of each fuel injection lance 304 extends at least partially into and is in fluid communication with a respective pressure side premixing channel 132 or a respective suction side premixing channel 134 of the respective fuel injection panel 110. Again, it is not required that both premixing channels 132, 134 be present. Rather, only one set of premixing channels 132 or 134 may be used.

FIG. 9 provides a cross-sectioned downstream perspective view of an exemplary integrated combustor nozzle 100 of the plurality of integrated combustor nozzles 100 with a portion of the premix air plenum 144 cut away, according to at least one embodiment of the present disclosure. FIG. 10 provides an enlarged view of a portion of the fuel injection panel 110 as shown in FIG. 9, according to at least one embodiment of the present disclosure.

In at least one embodiment, as shown in FIGS. 9 and 10 collectively, each fuel injection panel 110 includes a plurality of radially spaced annular collars or seats 146 for directing the fuel injection lances 304 into the premixing channels 132, 134. Each collar 146 defines a central opening 151 and is supported by a plurality of struts 148. Each collar 146 may include a tapered or diverging portion 150 circumscribing the central opening 151 to assist with inserting or aligning a corresponding fuel injection lance 304 into the central opening 151. The struts 148 may be spaced about the respective collars 146 to define flow passages 152 around the respective collars 146 and into a corresponding premixing channel 132 or 134. The flow passages 152 provide for fluid communication between the premix air plenum 144 and the pressure side and suction side premixing channels 132, 134. As shown in FIGS. 6, 7 and 8, the collars 146 may be sized to receive and/or to support at least a portion (such as the downstream end portions 306) of the fuel injection lances 304.

FIG. 11 provides an overhead (top down) cross-sectioned view of a portion of an exemplary fuel injection panel 110 with an exemplary fuel injection lance 304 inserted therein, according to at least one embodiment. In particular embodiments, as shown in FIG. 11, the downstream end portion 306 of one or more of the fuel injection lances 304 includes a dispensing tip 308. The dispensing tip 308 may be conical, converging, or tapered to facilitate installation through a respective collar 146 of the respective fuel injection panel 110 (as discussed above) and may extend at least partially into a respective pressure side premixing channel 132 or a respective suction side premixing channel 134. The dispensing tip 308 may include one or more injection ports 310, which are in fluid communication with an injector fuel plenum 336 (discussed further below).

In particular embodiments, as shown in FIG. 11, one or more of the fuel injection lances 304 includes a bellows portion or cover 312. The bellows portion 312 may allow for relative thermal growth or movement, in a generally axial direction, between the fuel injection panel 110 and the injection lances 304 during operation of the segmented annular combustion system 36. In particular embodiments, as shown in FIG. 11, the fuel injection panel 110 may include a plurality of floating collars 154 disposed proximate to or coupled to the upstream end portion 112 of the fuel injection panel 110. The floating collars 154 may allow for radial and/or axial movement between the integrated combustor nozzle 100 (particularly the fuel injection panel 110) and the fuel injection module 300.

As shown in FIGS. 8 through 11, the premixing channels 132, 134 are arranged in a common radial plane spaced between the pressure side wall 116 and the suction side wall 118 of the fuel injection panel 110. Alternately, as shown in FIG. 12, the pressure side premixing channels 132 and/or the suction side premixing channels 134 may be formed integrally with the suction side wall 118 and/or pressure side wall 116 of the fuel injection panel 110 with outlets on opposite sides of the fuel injection panel 110 or with outlets on the same side of the fuel injection panel 110. In this embodiment, the fuel injection lances 304 may be circumferentially separated into a first subset of pressure side fuel injection lances and a second subset of suction side fuel injection lances, so that the fuel injection lances 304 align with the inlets of corresponding premixing channels 132, 134. The first subset of fuel injection lances 304 and the second subset of fuel injection lances 304 may be fueled by one or more injector fuel plenums 336.

Figure 14:
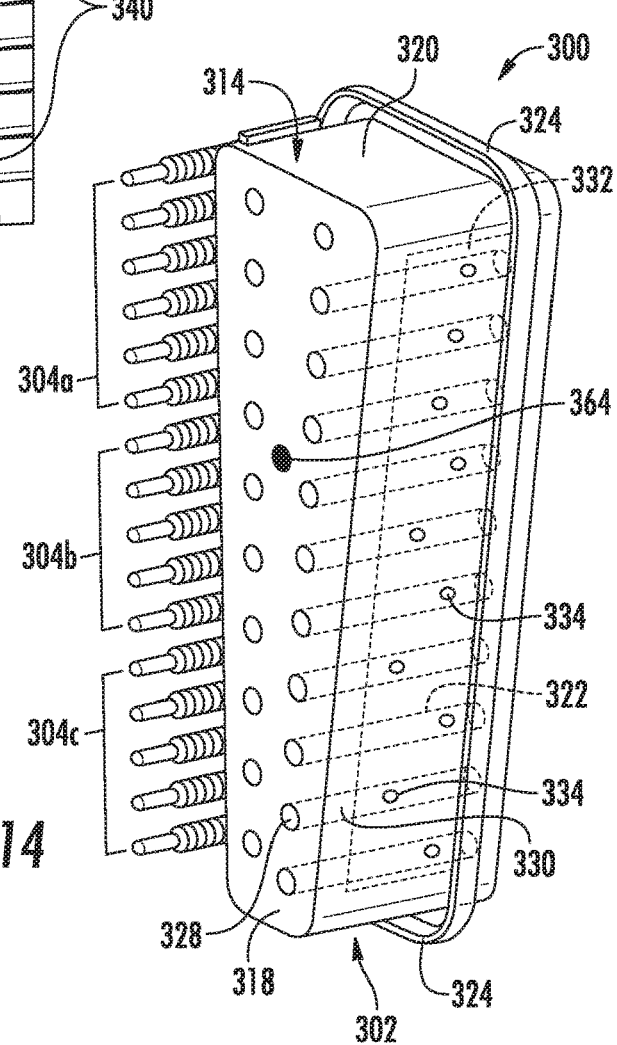
FIG. 14 provides an upstream perspective view of the fuel injection module as shown in FIG. 13, according to one embodiment of the present disclosure.

FIG. 13 provides a downstream perspective view of an exemplary fuel injection module 300 inserted into a portion of an exemplary integrated combustor nozzle 100, according to one embodiment. FIG. 14 provides an upstream perspective view of the fuel injection module 300, as shown in FIG. 13. In various embodiments, as shown in FIGS. 13 and 14 collectively, the fuel injection module 300 includes a bundled tube fuel nozzle portion 302 having a housing body 314. The housing body 314 may include a forward (or upstream) plate or face 316, an aft (or downstream) plate or face 318, an outer perimeter wall 320 that extends axially from the forward plate 316 to the aft plate 318, and a plurality of tubes 322 that extend axially through the forward plate 316 and the aft plate 318 within the outer perimeter wall 320. In particular embodiments, a seal 324 (such as a floating collar seal) surrounds at least a portion of the outer perimeter wall 320 of the housing body 314. The seal 324 may engage with a sealing surface such as the outer wall of a circumferentially adjacent fuel injection module 300 to prevent or reduce fluid flow therebetween.

Each tube 322 includes an inlet 326 (FIG. 13) defined at or upstream from the forward plate 316, an outlet 328 (FIG. 14) defined at or downstream from the aft plate 318, and a premix passage 330 (shown in hidden lines in FIG. 14) that extends between the respective inlet 326 and outlet 328. As shown in hidden lines in FIG. 14, a fuel nozzle plenum 332 is defined within the housing body 314 of the fuel injection module 300. Each tube 322 of the plurality of tubes 322 extends through the fuel nozzle plenum 332. At least some of the tubes 322 include or define at least one fuel port 334 positioned within the fuel nozzle plenum 332. Each fuel port 334 permits fluid communication from the fuel nozzle plenum 332 into a respective premix passage 330. In particular embodiments, the fuel nozzle plenum 332 may be subdivided or partitioned into two or more fuel nozzle plenums 332 defined within the housing body 314.

In operation, gaseous fuel (or in some embodiments, a liquid fuel reformed into a gaseous mixture) flows from the fuel nozzle plenum 332, via the fuel ports 334, into the respective premix passage 330 of each of the tubes 322, where the fuel mixes with air entering the respective inlet 326 of each tube 322. The fuel ports 334 may be positioned along the respective tubes 322 in a single axial plane or in more than one axial plane, for example, if a multi-tau arrangement is desired to address or tune combustion dynamics between two adjacent integrated combustor nozzles 100 or to mitigate coherent axial modes between the segmented annular combustion system 36 and the turbine 18.

In the embodiment provided in FIG. 13, each fuel injection lance 304 of the plurality of fuel injection lances 304 is radially spaced from adjacent fuel injection lances 304 along a radial wall portion of the outer perimeter wall 320 of the housing body 314 of the fuel injection module 300. As shown in hidden lines in FIG. 13, an injector fuel plenum or fuel circuit 336 is defined within the housing body 314 of the fuel injection module 300.

In particular embodiments, the fuel injection lances 304 are in fluid communication with the injector fuel plenum 336. In particular embodiments, the injector fuel plenum 336 may be subdivided into two or more injector fuel plenums 336. For example, in particular embodiments, the injector fuel plenum 336 may be subdivided into a first injector fuel plenum 338, which may feed fuel to a first subset 340 of the plurality of fuel injection lances 304, and a second injector fuel plenum 342, which may feed fuel to a second subset 344 of the plurality of fuel injection lances 304. As shown, the first subset 340 of fuel injection lances 304 may be a radially inner subset, while the second subset 344 of fuel injection lances 304 may be a radially outer subset.

In other embodiments, every other fuel injection lance 304 of the plurality of fuel injection lances 304 may be fueled by a first injector fuel plenum, while the remaining lances 304 are fueled by a separate fuel injector plenum. In such an arrangement, it is possible to supply fuel to the premixing channels (e.g., 132) having outlets along one side wall independently of the supply of fuel to the premixing channels (e.g. 134) of the opposite side wall.

In particular embodiments, the fuel injection lances 304 may be subdivided into a radially outer subset of fuel injection lances (304(a)), an intermediate or middle subset of fuel injection lances 304(b), and a radially inner subset of fuel injection lances 304(c). In this configuration, the radially outer subset and the radially inner subset of fuel injection lances 304(a), 304(c) may receive fuel from one fuel injector plenum, while the intermediate subset of fuel injection lances 304(b) may receive fuel from another (separate) fuel injector plenum. The plurality of fuel injection lances 304 may be subdivided into multiple independently or commonly fueled subsets of fuel injection lances 304, and the present disclosure is not limited to two or three subsets of the fuel injections lances unless otherwise recited in the claims.

Fuel may be supplied to the various plenums within the fuel injection modules 300 from a head end portion of the segmented annular combustion system 36. For example, fuel may be supplied to the various fuel injection modules 300 via an end cover (not shown) coupled to the compressor discharge casing 32 and/or via one or more tubes or conduits disposed within a head end portion of the compressor discharge casing 32.

Alternately, the fuel may be supplied radially through the outer liner segments 108 to the fuel injection module 110 from a radially outward fuel manifold or fuel supply assembly (not shown). In yet another configuration (not shown), fuel may be supplied to the aft end 114 of the fuel injection panel 110 and routed through the pressure side wall 116 and/or suction side wall 118 to cool the fuel injection panel 110 before being introduced via the bundled tube fuel nozzle 302 or the fuel injection lances 304.

In another configuration (not shown), fuel may be supplied to the aft end 114 of the fuel injection panel 110 and directed to premixing channels 132, 134, which originate from the aft end of the fuel injection panel 110 and have outlets 126, 128 in the pressure side wall 116 and the suction side wall 118, respectively. In this configuration, the need for fuel injection lances 304 is eliminated, and fuel to the bundled tube fuel nozzle 302 may be supplied either radially or axially (via fuel supply conduits, such as those described herein).

As shown in FIG. 13, in various embodiments, one or more conduits 346 may be used to provide fuel to the fuel nozzle plenum 332 and/or the injector fuel plenum 336 or injector fuel plenums 338, 342. For example, in one embodiment, the conduit 346 may comprise an outer tube 348 concentrically surrounding an inner tube 350 forming a tube-in-tube configuration. In this embodiment, an outer fuel circuit 352 is defined radially between the inner tube 350 and the outer tube 348, and an inner fuel circuit 354 is formed within the inner tube 350, thus defining concentric fuel flow paths to the fuel nozzle plenum 332 and/or the injector fuel plenum(s) 336, 338, 342. For example, the outer fuel circuit 352 may provide fuel to one or more of the injector plenum(s) 336, 338, 342, while the inner fuel circuit 354 provides fuel to the fuel nozzle plenum(s) 332, or vice versa. In another embodiment (not shown), separate tubes 348, 350 may be used to deliver fuel to the fuel nozzle plenum 332 and the injector fuel plenum 336.

FIG. 15 provides an upstream perspective view of the fuel injection module 300, according to another embodiment. FIG. 16 provides an upstream perspective view of an alternate fuel injection module 300, according to another embodiment. FIG. 17 provides a downstream perspective view of a plurality of the fuel injection modules 300 (as shown in FIG. 15) installed within circumferentially adjacent integrated combustor nozzles 100.

In the embodiments illustrated in FIGS. 15, 16 and 17 collectively, the plurality of tubes 322 of the bundled tube fuel nozzle portion 302 is subdivided into a first subset of tubes 356 and a second subset of tubes 358. The housing body 314 includes a common forward plate 316, a first aft plate 360, a second aft plate 362, and an outer perimeter wall 320 that extends around each subset of tubes 356, 358 to define one or more respective fuel nozzle plenums (not shown). As used herein, the terms "fuel nozzle plenum" and "bundled tube fuel plenum" may be used interchangeably to refer to the fuel plenums supplying fuel to the fuel nozzle portion 302 (in some cases, a bundled tube fuel nozzle) of the fuel injection module 300.

The first subset of tubes 356 extends through the forward plate 316, a first fuel nozzle plenum defined within the housing body 314, and the first aft plate 360. The second subset of tubes 358 extends through the forward plate 316, a second fuel nozzle plenum defined within the housing body 314, and the second aft plate 362. As shown in FIG. 15, the plurality of fuel injection lances 304 is disposed circumferentially between the first subset of tubes 356 and the second subset of tubes 358 and/or between the first aft plate 360 and the second aft plate 362.

FIG. 16 illustrates an alternate fuel injection module 300, which may be used in embodiments with a radial delivery of fuel to injector fuel plenums within the fuel injection panels 110. In this embodiment, the fuel injection lances 304 may be omitted from the fuel injection module 300, thus leaving a circumferential gap between respective subsets of tubes 356, 358.

In particular embodiments, as shown in FIGS. 14, 15 and 16, one or more of the fuel injection modules 300 may include an igniter 364 for igniting the fuel and air mixture exiting bundled tube fuel nozzle portion 302 of the fuel injection module 300. In particular embodiments, as shown in FIGS. 15 and 16, a seal 366 (such as a hula or spring-type seal) may be disposed along a side perimeter wall 368 of the housing body 314 of one or more of the fuel injection modules 300. The seal 366 may engage with an adjacent side perimeter wall of an adjacent fuel injection module 300 to prevent or reduce fluid flow therebetween.

FIGS. 15, 16 and 17 illustrate a pair of fuel conduits 382, 392 associated with each fuel injection module 300. In one embodiment (FIGS. 15 and 17), the fuel conduits 382, 392 may be constructed as tube-in-tube arrangements, as discussed above. In this case, a first fuel conduit 382 may supply fuel to the first subset of bundled tubes 356 and a first subset of fuel injection lances 304 (not separately labeled), while the other fuel conduit 392 may supply fuel to the second subset of bundled tubes 358 and a second subset of fuel injection lances 304.

In another embodiment (FIG. 16), the fuel conduit 382 may supply fuel to the first subset of bundled tubes 356, and the second conduit 392 may supply fuel to the second subset of bundled tubes 358. In yet another variation, the first subset of bundled tubes 356 and the second subset of bundled tubes 358 may be fed by a common first fuel nozzle plenum 372 (fed by the first fuel conduit 382) and a common second fuel nozzle plenum (fed by the second fuel conduit 392), thus permitting each subset of tubes 356, 358 to be further divided into a radially inner and radially outer grouping of bundled tubes. That is, the radially inner tubes of the first bundled subset 356 and the radially inner tubes of the second bundled subset 358 may be fueled by the first conduit 382, while the radially outer tubes of the subsets 356, 358 may be fueled by the second conduit 392. Thus, it is possible to create radially inner and radially outer bundled tube subsets, which may be independently fueled, within a common housing of a single fuel injection module 300.

FIG. 17 illustrates a set of three exemplary fuel injection modules 300 of FIG. 15, which are assembled with three respective combustor nozzles 100. As shown, the first subset of bundled tubes 356 is located circumferentially outboard of the suction side wall (118) of the fuel injection panel 110. The combustor nozzle 100 is positioned between the first and second bundled tube fuel nozzle subsets 356, 358. The second bundled tube fuel nozzle subset 358 is positioned circumferentially outboard of the pressure side (116) of the same fuel injection panel 110. Thus, each primary combustion zone 102 combusts fuel and air mixtures from the second bundled tube fuel nozzle subset 358 of a first fuel injection module 300 and the first bundled tube fuel nozzle 356 of a second (adjacent) fuel injection module 300. Similarly, in those embodiments having premixing channels 132, 134 disposed on each side wall of the fuel injection panels 110, each secondary combustion zone 104 combusts fuel and air mixtures from the suction side premixing channels 134 of a first fuel injection panel 110 and the pressure side premixing channels 132 of a second (adjacent) fuel injection panel 110.

FIG. 18 provides a cross-sectioned top view of a portion of the integrated combustor nozzle 100, including a portion of a fuel injection panel 110 and the fuel injection module 300 (as shown in FIGS. 15 and 17), according to at least one embodiment. FIG. 19 provides a cross-sectioned side view of the embodiment of the fuel injection module 300 (illustrated in FIG. 15) inserted into an exemplary integrated combustor nozzle 100 with the pressure side wall 116 cut away, according to at least one embodiment.

As shown in FIG. 18, the first subset of tubes 356 of the plurality of tubes 322 extends along a portion of the suction side wall 118 of the respective fuel injection panel 110, and the second subset of tubes 358 of the plurality of tubes 322 extends along the pressure side wall 116 of the same fuel injection panel 110. As such, as shown in FIG. 17, two circumferentially adjacent fuel injection modules 300 mounted to two circumferentially adjacent integrated combustor nozzles 100 may be required to form a full bank of tubes 322 for each primary combustion zone 102 within the segmented annular combustion system 36.

In particular embodiments, as shown in FIGS. 18 and 19, the bundled tube fuel plenum 332 may be subdivided into two or more bundled tube fuel plenums. For example, in one embodiment, the bundled tube fuel plenum 332 may be subdivided or partitioned into a first bundled tube fuel plenum 370 and a second bundled tube fuel plenum 372 via a wall 371 or other obstruction defined or disposed within the fuel injection module 300. In this configuration, as shown in FIG. 18, the first bundled tube fuel plenum 370 may provide fuel to the first subset of tubes 356, while the second bundled tube fuel plenum 372 may provide fuel to the second subset of tubes 358. In this configuration, the first subset of tubes 356 and the second subset of tubes 358 may be fueled or operated independently of each other.

In particular embodiments, as illustrated in FIG. 18, the bundled tube fuel plenum 332 may be subdivided axially across one or both subsets of tubes 356, 358, via one or more plates or walls 373 disposed within the housing body 314, thereby forming a forward bundled tube fuel plenum 332(a) and an aft bundled tube fuel plenum 332(b). One or more of the fuel ports 334 may be in fluid communication with the forward bundled tube fuel plenum 332(a), and one or more of the fuel ports 334 may be in fluid communication with the aft bundled tube fuel plenum 332(b), thereby providing multi-tau flexibility to address or to tune combustion dynamics.

In particular embodiments, as shown in FIG. 19, the injector fuel plenum 336 may be subdivided or split into a first injector fuel plenum 374 and a second injector fuel plenum 376. In this embodiment, the plurality of fuel injection lances 304 may be subdivided into a first (or radially inner) subset 378 of fuel injection lances 304 and a second (or radially outer) subset 380 of fuel injection lances 304. The first subset 378 of the fuel injection lances 304 may be in fluid communication with the first injector fuel plenum 374, and the second subset 380 of the fuel injection lances 304 may be in fluid communication with the second injector fuel plenum 376.

The first (or radially inner) subset 378 of fuel injection lances 304 may fuel a radially inner set of the pressure side wall and/or suction side wall premixing channels 132, 134, while the second (or radially outer) subset 380 of fuel injection lances 304 may fuel a radially outer set of the pressure side wall and/or suction side wall premixing channels 132,134. This configuration may increase operational flexibility, in that the first subset of fuel injection lances 304 and the second subset of fuel injection lances 304 may be operated independently or together depending on operating mode (e.g., full-load, part-load, or turndown) or desired emissions performance.

FIG. 19 further illustrates a first conduit 382 including an outer tube 384 that concentrically surrounds an inner tube 386 to form a tube-in-tube configuration that defines an inner fuel circuit 388 and an outer fuel circuit 390. The inner fuel circuit 388 may be used to supply fuel to the first bundled tube fuel plenum 370, and the outer fuel circuit 390 may be used to provide fuel to the first injector fuel plenum 374 (or vice versa). A second conduit 392, which includes an outer tube 394 that concentrically surrounds an inner tube 396 to form a tube-in-tube configuration, defines an inner fuel circuit 398 and an outer fuel circuit 400. The inner fuel circuit 398 may be used to supply fuel to the second bundled tube fuel plenum 372, and the outer fuel circuit 400 may be used to provide fuel to the second injector fuel plenum 376.

Conveniently, in the embodiments shown in FIGS. 15 and 17 through 19, the fuel to both the fuel nozzle portion 302 and the fuel injection lances 304 is delivered via common fuel conduits (e.g., tube-in-tube conduits), thereby reducing complexity and minimizing part count. While tube-in-tube arrangements are illustrated herein, it should be understood that separate fuel conduits may instead be used with at least one fuel conduit supplying fuel to the fuel nozzle portion 302 and at least one other fuel conduit supplying fuel to the fuel injection lances 304.

FIG. 20 provides a downstream perspective view of a portion of the segmented annular combustion system 36 including a pair of circumferentially adjacent integrated combustor nozzles 100 and a pair of radially mounted fuel injection modules 300, according to at least one embodiment. In one embodiment, as shown in FIG. 20, two fuel injection modules 300 may be radially stacked together, thereby forming a radially inner and a radially outer fuel injection module set 402. Each fuel injection module 300 of the fuel injection module set 402 is fueled individually with conduits 404, 406 having multiple fuel circuits, as described previously, such that the stacked fuel injection module set 402 has at least four independent fuel circuits. In this manner, the respective bundled tube fuel plenums and the injector fuel plenums may be charged or operated independently, as previously described.

In particular embodiments, as shown in FIG. 20, at least one of the fuel injection panels 110 may define at least one cross-fire tube 156 that extends through respective openings in the pressure side wall (hidden in FIG. 19) and the suction side wall 118 of the respective fuel injection panel 110. The cross-fire tube 156 permits cross-fire and ignition of circumferentially adjacent primary combustion zones 102 between circumferentially adjacent integrated combustor nozzles 100.

In one embodiment, as shown in FIG. 21, the cross-fire tube 156 is defined by a double-walled cylindrical structure with an air volume defined therebetween. The combustion gases 30, ignited in a first primary combustion zone 102, are permitted to flow through the inner wall of the cross-fire tube 156 into an adjacent primary combustion zone 102, where ignition of the fuel and air mixture in the adjacent primary combustion zone 102 occurs. To prevent combustion gases from stagnating in the cross-fire tube 156, purge air holes 158 are provided in the inner wall. In addition to the purge air holes 158, the outer walls of the cross-fire tubes 156 may be provided with air feed holes 157 that may be in fluid communication with at least one air cavity 160, 170 within the fuel injection panel 110 or some other source of compressed air. The purge air holes 158 are in fluid communication with the air volume, which receives air via the air feed holes 157. The combination of smaller air feed holes 157 in the outer wall and larger purge air holes 158 in the inner wall transforms the cross-fire tube 156 into a resonator for mitigating potential combustion dynamics within the segmented annular combustion system 36.

In particular embodiments, one or more of the fuel injection modules 300 may be configured to burn a liquid fuel in addition to a gaseous fuel. FIG. 22 provides a downstream perspective view of an exemplary fuel injection module configured for both gas fuel and liquid fuel operation, according to at least one embodiment of the present disclosure. FIG. 23 provides a cross-sectioned side view of the exemplary fuel injection module 300 shown in FIG. 22, taken along section line 23-23, and coupled to an end cover 40, according to one embodiment of the present disclosure. FIG. 24 provides a cross-sectioned view of the fuel injection module 300 shown in FIG. 23, taken along section line 24-24, according to one embodiment of the present disclosure.

In at least one embodiment, as shown in FIGS. 22 and 23 collectively, one or more of the fuel injection modules 300 may be fueled from an end cover 40 via a respective fuel supply conduit 408. As shown in FIG. 23, the fuel supply conduit 408 may comprise an outer conduit 410, an inner conduit 412, and a liquid fuel cartridge 414 that extends coaxially through the inner conduit 412. In particular embodiments, the fuel supply conduit 408 may include an intermediate conduit 416 disposed radially between the inner conduit 412 and the outer conduit 410. The outer conduit 410, the inner conduit 412, and the intermediate conduit 416 (when present) may define various fuel circuits therebetween for providing gaseous or liquid fuel to the bundled tube fuel nozzle portion 302 and/or the fuel injection lances 304 of the fuel injection module 300.

In various embodiments, as shown in FIG. 23, the housing body 314 of the fuel injection module 300 may define an air plenum 418 therein. The air plenum 418 may surround at least a portion of each tube 322 of the plurality of tubes 322. Air from the compressor discharge casing 32 may enter the air plenum 418 via openings 420 defined along the housing body 314 or by some other opening or passage, such as a channel (not shown) originating from the forward plate 316 and extending through the fuel plenum 332 to the air plenum 418.

In various embodiments, the liquid fuel cartridge 414 extends axially within and at least partially through the inner conduit 412. The liquid fuel cartridge 414 may supply liquid fuel 424 (such as oil) to at least a portion of the plurality of tubes 322. In addition or in the alternative, the liquid fuel cartridge 414 may project a liquid fuel 424 generally axially downstream and radially outwardly from the outlets 328 of the tubes 322 beyond the aft plate(s) 318, 360, 362, such that the liquid fuel 424 may be atomized with a premixed gaseous fuel-air mixture flowing from the tube outlets 328 (or with air flowing through the tube outlets, when the combustion system is operating only on liquid fuel, and the gaseous fuel supply to the tubes 332 is inactive).

In this configuration, as illustrated in FIG. 23, liquid fuel may be injected directly into the primary combustion zone 102 via the liquid fuel cartridge 414. In particular embodiments, the liquid fuel cartridge 414 and the inner conduit 412 may at least partially define an annular purge air passage 428 therebetween. During operation, purge air 430 may be provided to the purge air passage 428 to thermally insulate the liquid fuel cartridge 414, thereby minimizing coking. The purge air 430 may be exhausted from the purge air passage 428, via an annular gap 432 defined between a downstream end portion of the liquid fuel cartridge 414 and a downstream end portion of the inner conduit 412.

The inner conduit 412 and the intermediate conduit 416 define an inner fuel passage 422 therebetween for providing a gaseous fuel to the fuel plenum 332, which supplies fuel to the plurality of tubes 322 of the fuel injection module 300. A flow of premixed (gaseous or gasified liquid) fuel and air may be injected into the primary combustion zone 102, via the tube outlets 328 of the bundled tube fuel nozzle portion 302.

An outer fuel passage 426 defined between the intermediate conduit 416 and the outer conduit 410 directs gaseous fuel to the injector fuel plenum 336, which supplies fuel to the fuel injection lances 304. FIG. 24 illustrates the concentricity between the liquid fuel cartridge 414, the purge air passage 428, the inner fuel passage 422, and the outer fuel passage 426.

Figure 25:
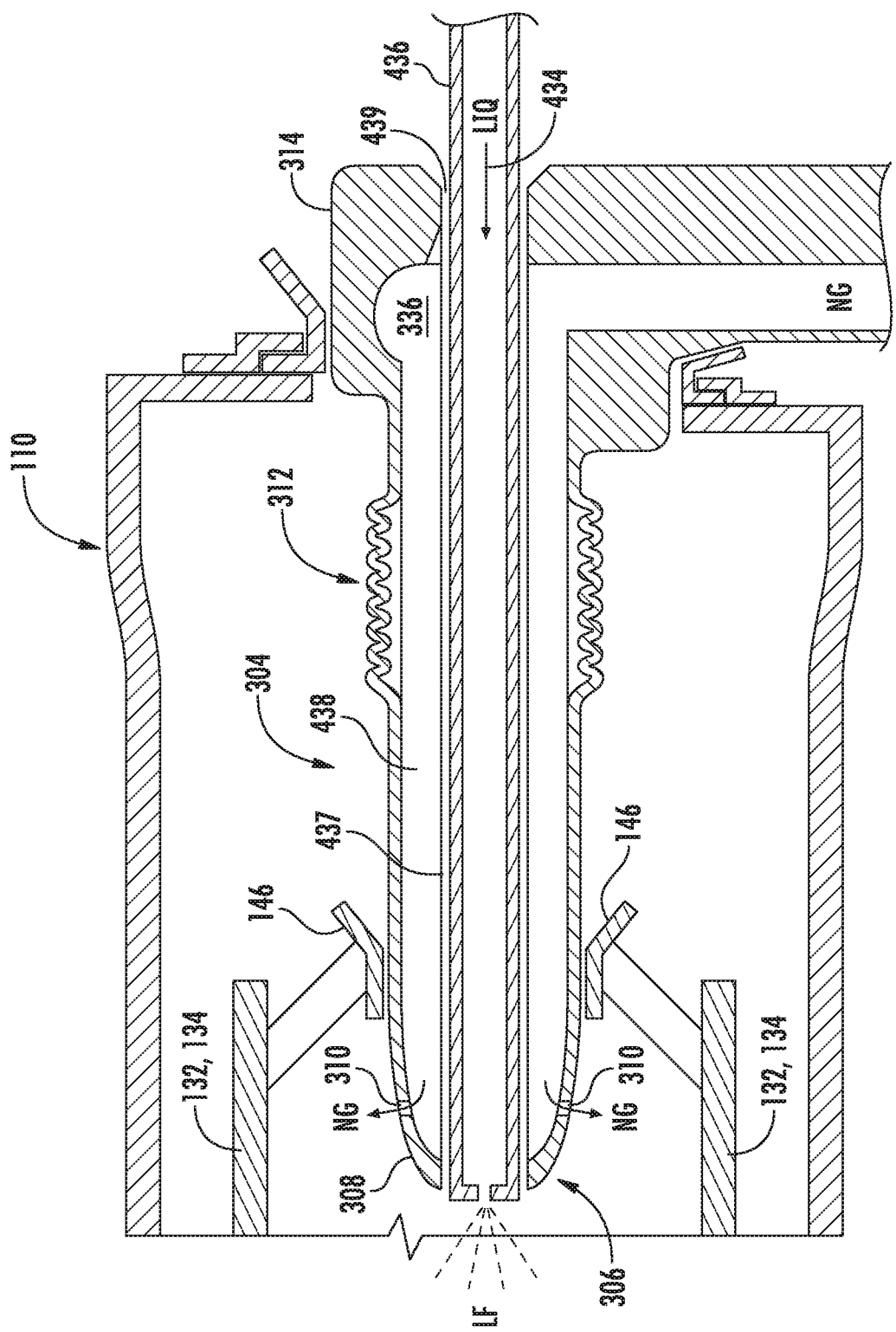
FIG. 25 provides a top down cross-sectioned view of a portion of an exemplary fuel injection panel shown in FIG. 17 with an exemplary fuel injection lance, according to at least one embodiment of the present disclosure.

FIG. 25 provides an overhead (top down) cross-sectioned view of a portion of an exemplary fuel injection panel 110 with an exemplary fuel injection lance 304, according to at least one embodiment of the present disclosure. In particular embodiments, as shown in FIG. 25, liquid fuel 434 may be supplied to one or more of the fuel injection lances 304 via a liquid fuel cartridge 436 that extends axially through the respective fuel injection lance 304. The liquid fuel cartridge 436 may extend through the housing body 314. The liquid fuel cartridge 436 is installed within a protective tube 437 (akin to the inner conduit 412), which defines an annulus 439 around the liquid fuel cartridge 436. The annulus 439 provides a passage through which air flows, thereby providing a thermal insulating shield to the liquid fuel cartridge 436 to minimize coking. An outer fuel passage 438 may be defined between the protective tube 437 and an inner surface of the respective fuel injection lance 304. The outer fuel passage 438 may be in fluid communication with the injector fuel plenum 336, thereby providing dual-fuel capability to the fuel injector lances 304.

In operation, each bundled tube fuel nozzle portion 302 produces a hot effluent stream of combustion gases via a relatively short flame originating from the outlets 328 of each of the tubes 322 in each corresponding primary (or first) combustion zone 102. The hot effluent stream flows downstream and into a second fuel and air stream provided by the pressure side premixing channels 132 of one of a first fuel injection panel 110 and/or by suction side premixing 134 channels of a circumferentially adjacent (or second) fuel injection panel 110. The hot effluent stream and the second premixed fuel and air streams react in the corresponding secondary combustion zone 104. The hot effluent streams from the primary combustion zones 102, approximately 40% to 95% of total combustion gas flow, are conveyed downstream to the injection planes 130, 131, where the second fuel and air mixtures are introduced and where the balance of flow is added into the respective secondary combustion zones. In one embodiment, approximately 50% of total combustion gas flow originates from the primary combustion zones 102, and the remaining approximately 50% originates from the secondary combustion zones 104. This arrangement of axial fuel staging with targeted residence times in each combustion zone minimizes overall NOx and CO emissions.

Circumferential dynamics modes are common in traditional annular combustors. However, largely due to the use of integrated combustor nozzles 110 with secondary fuel-air injection, the segmented annular combustion system provided herein reduces the likelihood that these dynamic modes will develop. Further, because each segment is isolated from circumferentially adjacent segments, dynamics tones and/or modes associated with some can-annular combustion systems are mitigated or non-existent.

During operation of the segmented annular combustion system 36, it may be necessary to cool one or more of the pressure side walls 116, the suction side walls 118, the turbine nozzle 120, the inner liner segments 106, and/or the outer liner segments 108 of each integrated combustor nozzle 100 in order to enhance mechanical performance of each integrated combustor nozzle 100 and of the segmented annular combustion system 36 overall. In order to accommodate cooling requirements, each integrated combustor nozzle 100 may include various air passages or cavities that may be in fluid communication with the high pressure plenum 34 formed within the compressor discharge casing 32 and/or with the premix air plenum 144 defined within each fuel injection panel 110.

Figure 26:
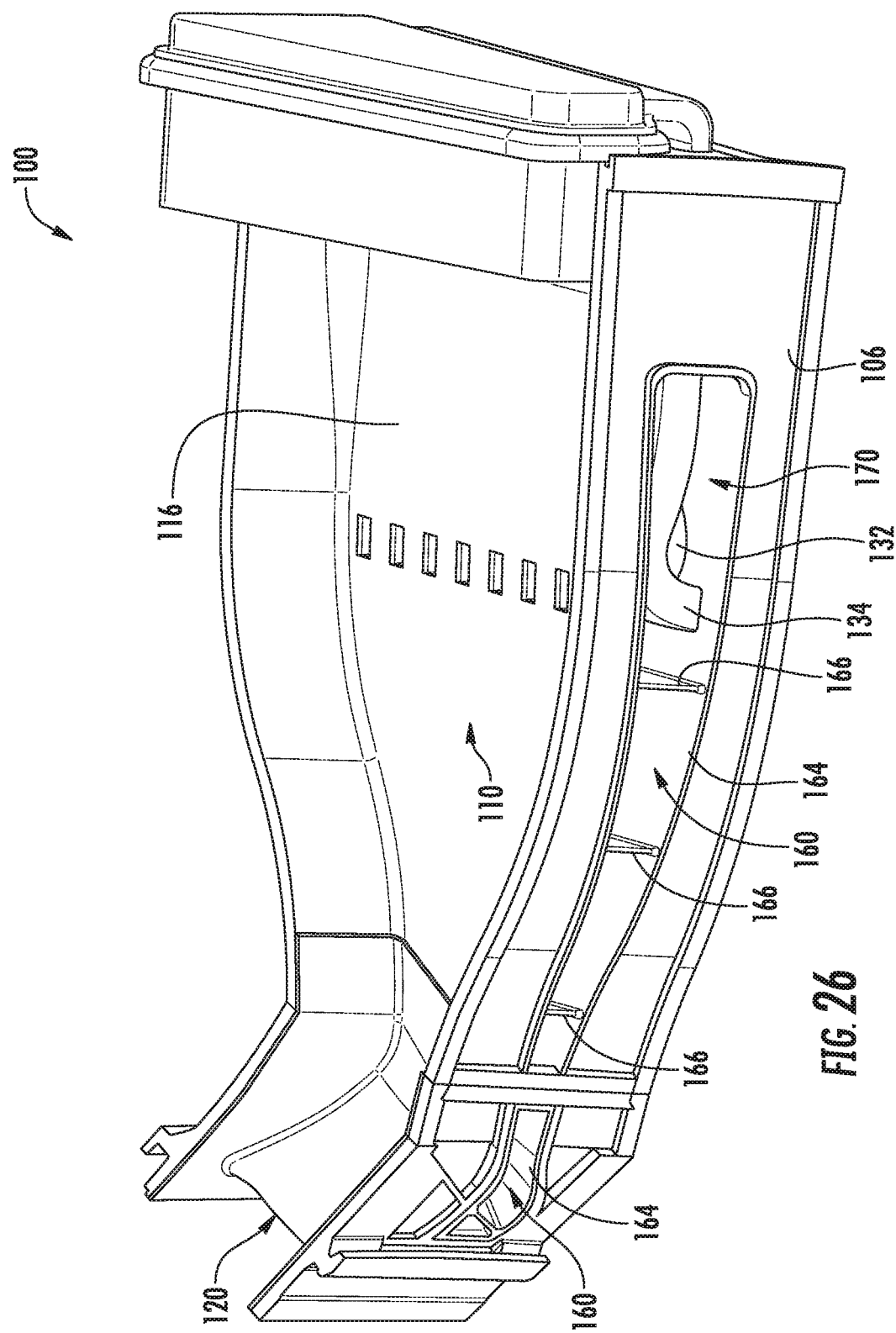
FIG. 26 provides a bottom side perspective view of an exemplary combustor nozzle, according to at least one embodiment of the present disclosure.

The cooling of the integrated combustor nozzles 100 may be best understood with reference to FIGS. 6, 8 and 26. FIG. 26 provides a bottom perspective view of an exemplary integrated combustor nozzle 100, according to at least one embodiment.

In particular embodiments, as shown in FIGS. 6, 8 and 26 collectively, an interior portion of each fuel injection panel 110, which is defined between the pressure side wall 116 and the suction side wall 118, may be partitioned into various air passages or cavities 160 by walls 166. In particular embodiments, the air cavities 160 may receive air from the compressor discharge casing 32 or other cooling source, via one or more openings 162 defined in the outer liner segment 108 (FIG. 8) and/or via one or more openings 164 defined in the inner liner segment 106 (FIG. 26).

As shown in FIGS. 6, 8 and 26 collectively, walls or partitions 166 may extend within the interior portion of the fuel injection panel 110 to at least partially form or separate the plurality of air cavities 160. In particular embodiments, some or all of the walls 166 may provide structural support to the pressure side wall 116 and/or the suction side wall 118 of the fuel injection panel 110. In particular embodiments, as shown in FIG. 8, one or more of the walls 166 may include one or more apertures 168 that allow fluid to flow between adjacent air cavities 160.

In various embodiments, as shown in FIGS. 6, 8 and 26 collectively, the plurality of air cavities 160 includes a premix channel air cavity 170 that surrounds the pressure side premixing channels 132 and the suction premixing channels 134 (or whichever set of premixing channels 132 or 134 is present). In particular embodiments, at least one air cavity 160 of the plurality of air cavities 160 extends through the turbine nozzle portion 120 of each fuel injection panel 110.

In operation, air from the high pressure plenum 34 formed by the compressor discharge casing 32 may enter the plurality of air cavities 160 via the openings 162, 164 in the outer liner segment 108 and/or the inner liner segment 106 respectively. In particular embodiments, where the interior of the fuel injection panel 110 is partitioned via the wall(s) 166, the air may flow through the apertures 168 into adjacent air cavities 160. In particular embodiments, the air may flow through one or more apertures 168 towards and/or into the premix channel air cavity 170 and/or into the premix air plenum 144 of the fuel injection panel 110. The air may then flow around the collars 146 and into the pressure side premixing channels 132 and/or the suction side premixing channels 134.

Figure 27:
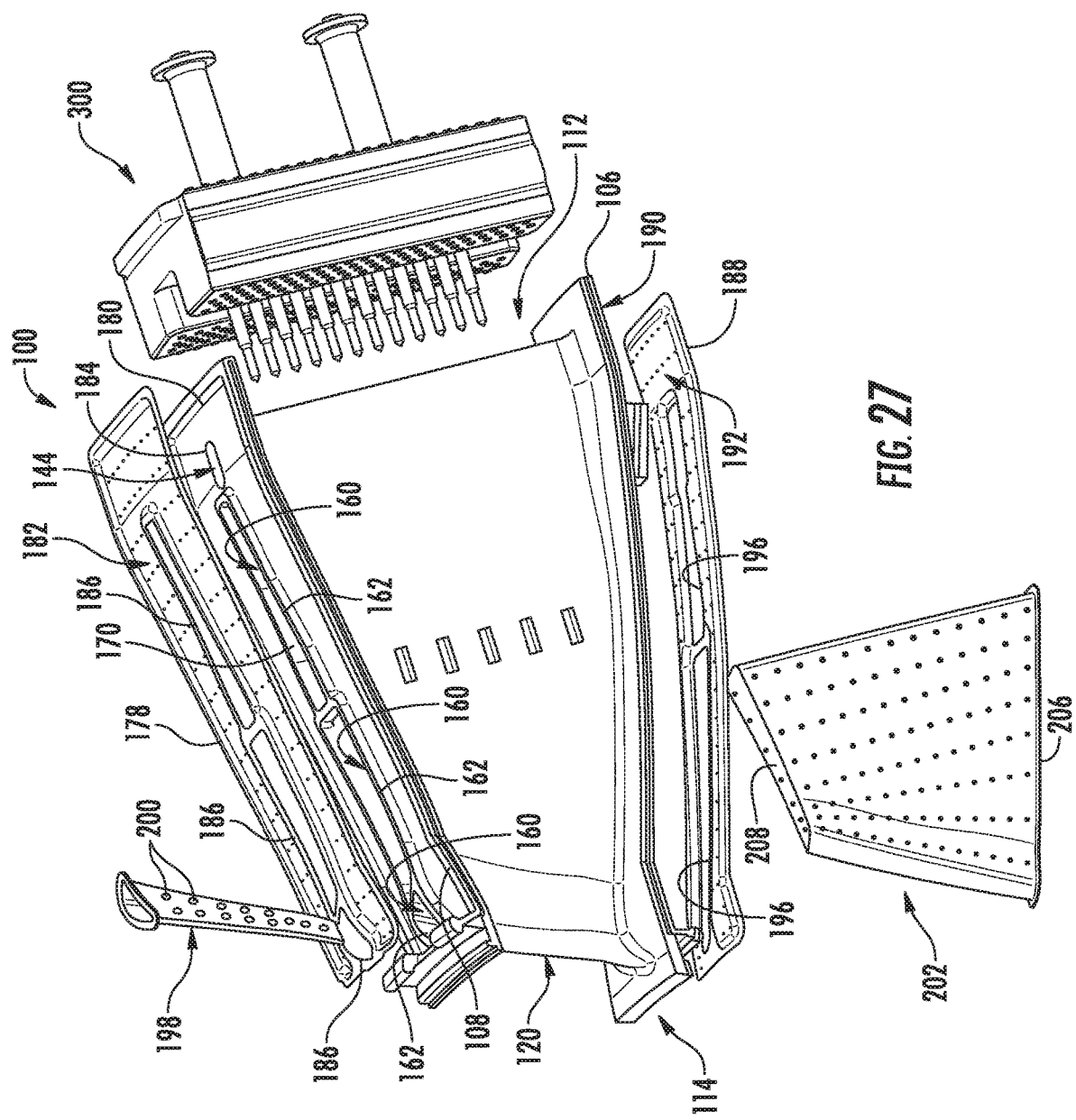
FIG. 27 provides an exploded perspective view of an exemplary combustor nozzle, according to at least one embodiment of the present disclosure.
Figure 28:
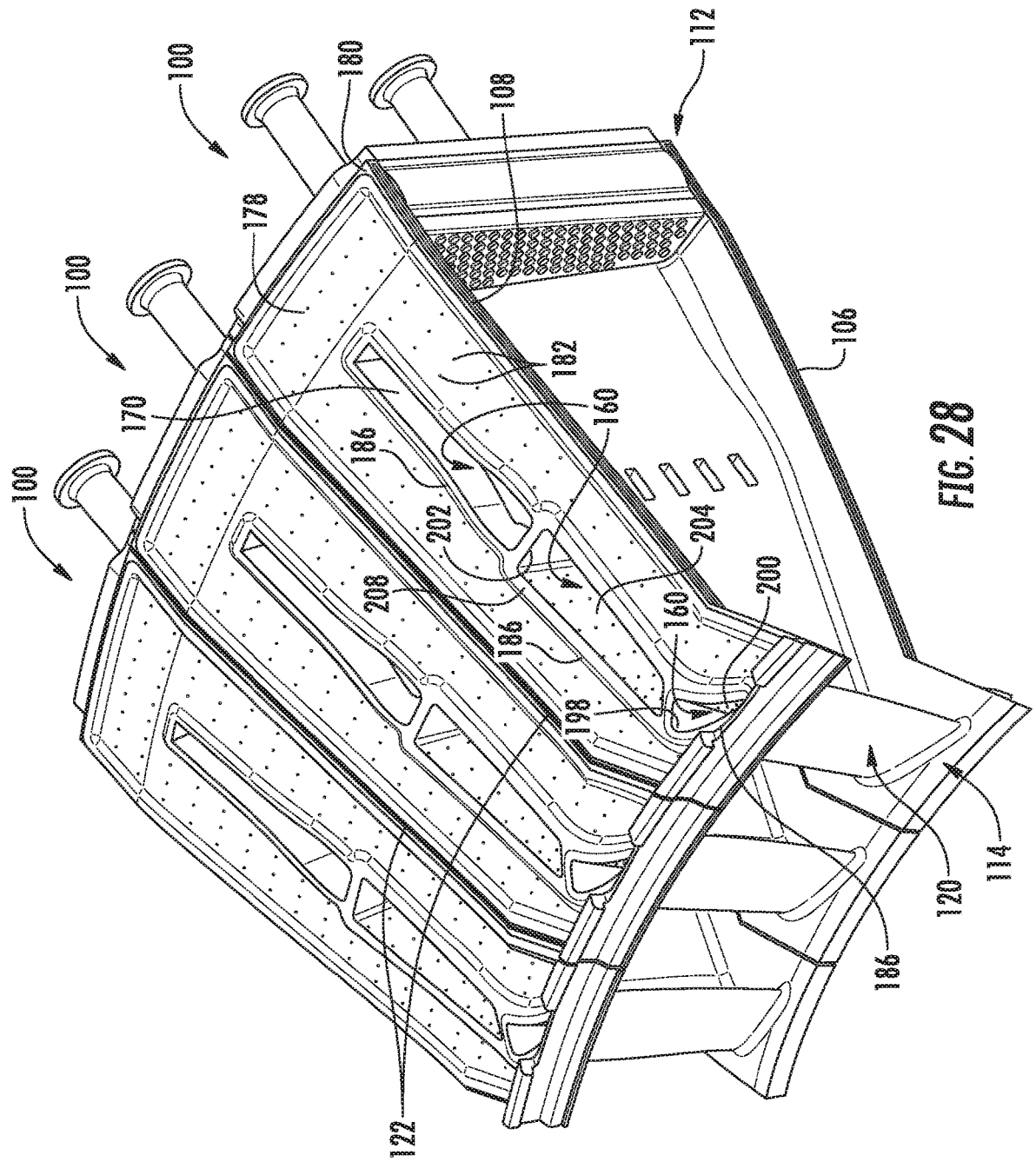
FIG. 28 provides a top view of three assembled exemplary combustor nozzles, as shown in exploded view in FIG. 27, according to at least one embodiment of the present disclosure.
Figure 29:
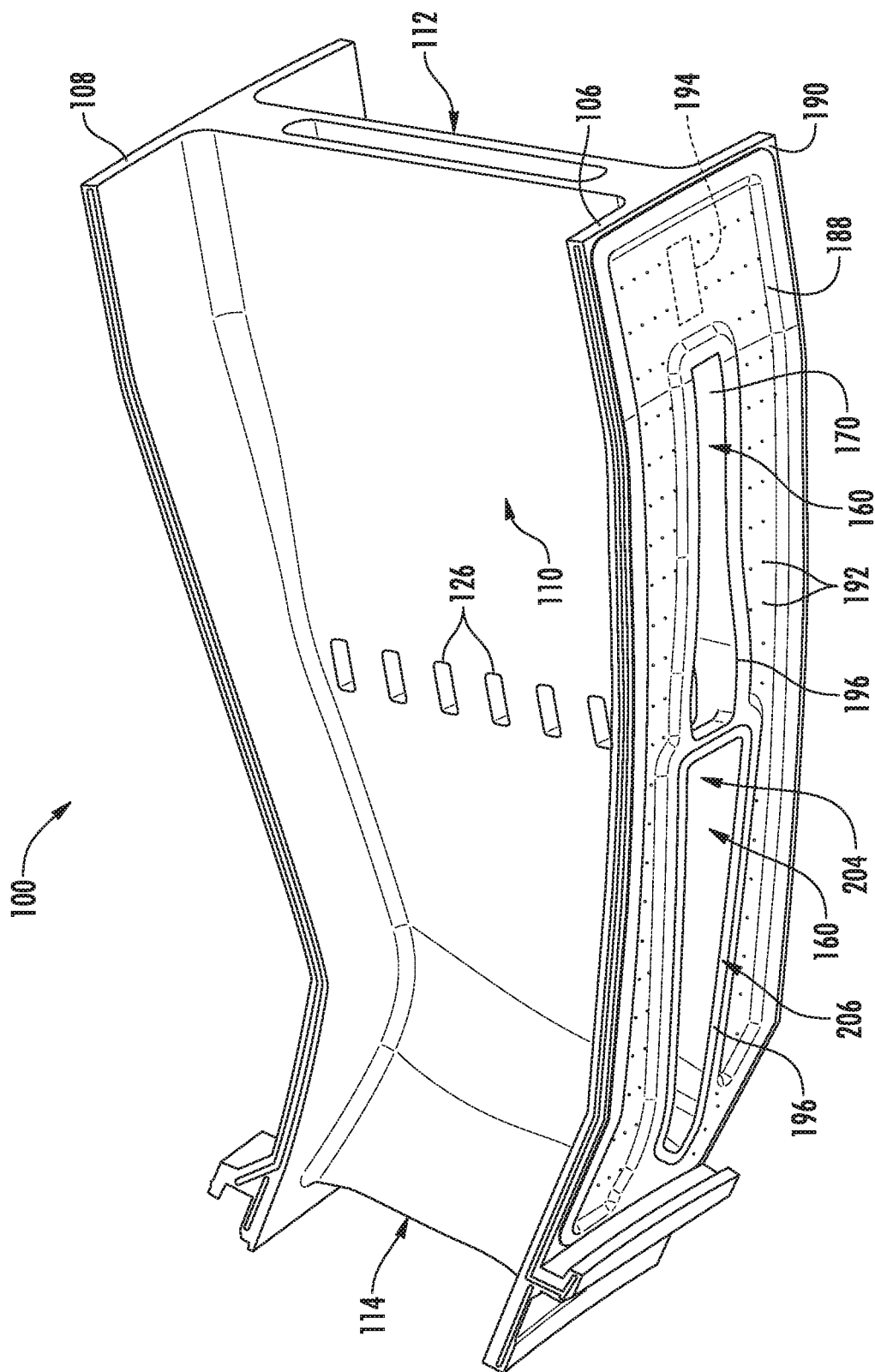
FIG. 29 provides an assembled bottom view of the combustor nozzle as shown in exploded view in FIG. 27, according to at least one embodiment of the present disclosure.

FIG. 27 provides an exploded perspective view of an exemplary integrated combustor nozzle 100, according to at least one embodiment of the present disclosure. FIG. 28 provides a top view of three assembled exemplary integrated combustor nozzles 100 (as shown exploded in FIG. 27), according to at least one embodiment. FIG. 29 provides a bottom view of an exemplary integrated combustor nozzle 100 (as shown exploded in FIG. 27), according to at least one embodiment.

In particular embodiments, as shown collectively in FIGS. 27 and 28, each integrated combustor nozzle 100 may include an outer impingement panel 178 that extends along an outer surface 180 of the outer liner segment 108. The outer impingement panel 178 may have a shape corresponding to the shape, or a portion of the shape, of the outer liner segment 108. The outer impingement panel 178 may define a plurality of impingement holes 182 defined at various locations along the outer impingement panel 178. In particular embodiments, as shown in FIG. 27, the outer impingement panel 178 may extend across an inlet 184 to the premix air plenum 144, which is defined along the outer surface 180 of the outer liner segment 108. In particular embodiments, as shown in FIGS. 27 and 28 collectively, the outer impingement panel 178 may define a plurality of openings 186 that align with, or correspond to, one or more of the openings 162 defined along the outer liner segment 108 and that correspond with the various air cavities 160 defined within the integrated combustor nozzle 100.

In particular embodiments, as shown collectively in FIGS. 27 and 29, each integrated combustor nozzle 100 may include an inner impingement panel 188 that extends along an outer surface 190 of the inner liner segment 106. The inner impingement panel 188 may have a shape corresponding to the shape, or a portion of the shape, of the outer liner segment 106. The inner impingement panel 188 may include a plurality of impingement holes 192 defined at various locations along the inner impingement panel 188. In particular embodiments, as shown in hidden lines in FIG. 29, the inner impingement panel 188 may extend across an inlet 194 to the premix air plenum 144, which is defined along the outer surface 190 of the inner liner segment 106. In particular embodiments, as shown in FIGS. 27 and 29, the inner impingement panel 188 may define a plurality of openings 196 that align with, or correspond to, one or more of the openings 164 (FIG. 25) defined along the inner liner segment 106 and that correspond with particular air cavities 160 defined within the integrated combustor nozzle 100.

In particular embodiments, as shown in FIGS. 27 and 28 collectively, one or more of the integrated combustor nozzles 100 includes a first impingement air insert 198 that is positioned within the turbine nozzle portion 120 of the corresponding integrated combustor nozzle 100. The first impingement air insert 198 is formed as a hollow structure, with an opening at one or both ends, in a shape complementary to the air cavity 160 in the turbine nozzle portion 120. The impingement air insert 198 defines a plurality of impingement holes 200. During operation, air from the compressor discharge casing 32 may flow through a corresponding opening 162 defined in the outer liner 108 and/or opening 186 defined in the outer impingement panel 178 and into the first impingement insert 198, where the air may flow through the impingement holes 200 as discrete jets, which impinge on interior surfaces of the turbine nozzle 120.

In particular embodiments, as shown in FIGS. 27, 28 and 29 collectively, one or more of the integrated combustor nozzles 100 may include a second impingement air insert 202. The second impingement air insert 202 may be positioned, or mounted, in a cavity 204 (FIG. 28) of the corresponding fuel injection panel 110, which is defined downstream of the pressure side injection outlets 126 and/or suction side injection outlets 128 and upstream of the turbine nozzle 120. As shown in FIGS. 28 and 29 collectively, the second impingement air insert 202 may be open on both a radially inner end 206 (FIG. 29) and a radially outer end 208 (FIG. 28) to allow air from the compressor discharge casing 32 to flow freely through the fuel injection panel 110. A portion of the air passing through the impingement air insert 202 is used to impinge on an interior surface of the corresponding fuel injection panel 110. After impinging on the interior surfaces of the fuel injection panel 110, air flows through the fuel injection panel 110 toward the forward end 112 of the fuel injection panel 110, where the air is directed into the inlets of the premixing channels 132, 134.

Air that passes freely through the second impingement air insert 202 may be mixed with compressed air within the compressor discharge casing 32 as the compressed air flows towards the bundled tube fuel nozzle portion 302 of each of the fuel injection modules 300 where it may be mixed with fuel. In various embodiments, the air from the compressor discharge casing 32 may flow into the premixing channel cooling cavity 170 for cooling the pressure side and/or the suction side premixing channels 132, 134.

In other embodiments, two impingement air inserts may be inserted within a given air cavity 160, such as a first impingement air insert installed through the inner liner segment 106 and a second impingement air insert installed through the outer liner segment 108. Such an assembly may be useful when the cavity 160 has a shape (e.g., an hourglass shape) that prevents insertion of a single impingement air insert through the radial dimension of the cavity 160. Alternately, two or more impingement air inserts may be positioned sequentially in an axial direction within a given cavity 160.

Figure 30:
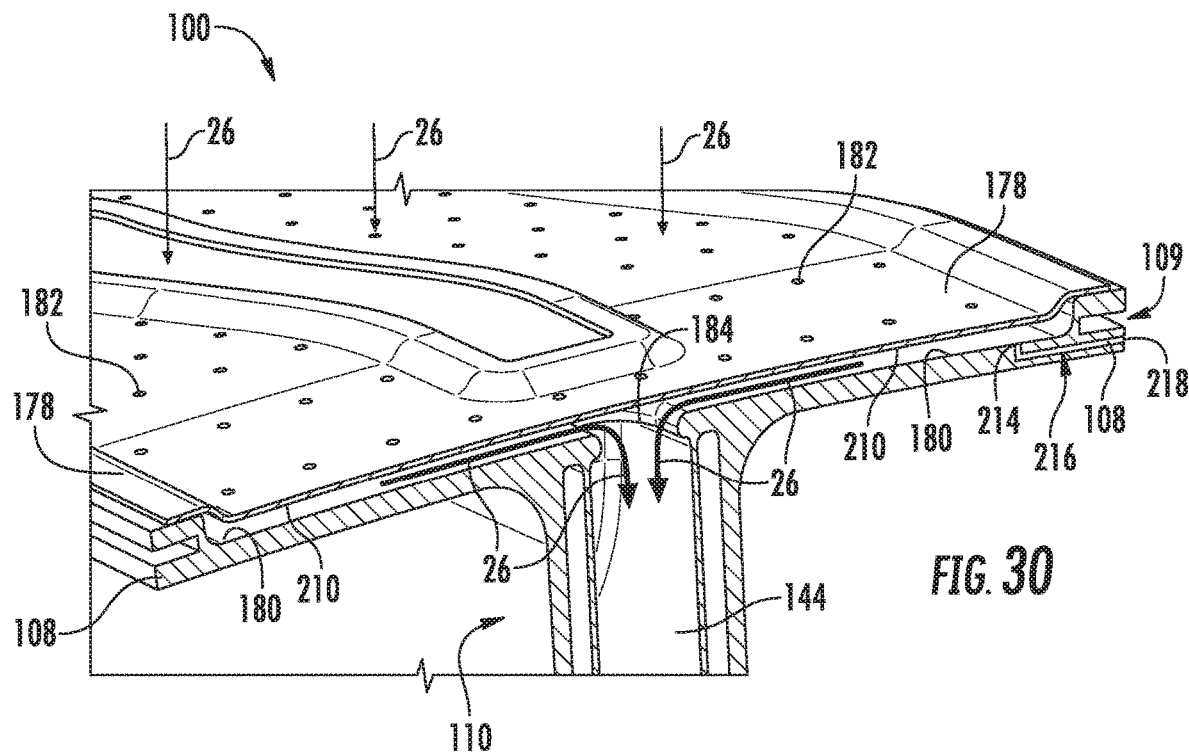
FIG. 30 provides an enlarged view of a first (radially outer) portion of the exemplary combustor nozzle as shown in FIG. 29, according to at least one embodiment of the present disclosure.
Figure 31:
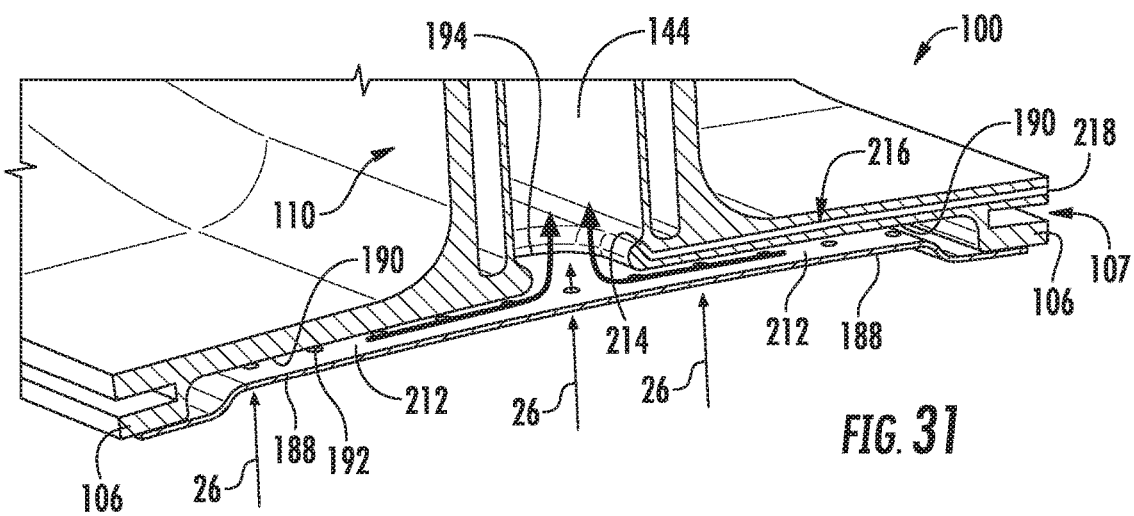
FIG. 31 provides an enlarged view of a second (radially inner) portion of the exemplary combustor nozzle as shown in FIG. 29, according to at least one embodiment of the present disclosure.

FIG. 30 provides an enlarged view of a portion of the outer liner segment 108 of one of the exemplary integrated combustor nozzles 100, as shown in FIG. 29. FIG. 31 provides an enlarged view of a portion of the inner liner segment 106 of one of the exemplary integrated combustor nozzles 100, as shown in FIG. 29.

In particular embodiments, as shown in FIG. 30, the outer impingement panel 178 may be radially spaced from the outer surface 180 of the outer liner segment 108 to form a cooling flow gap 210 therebetween. The cooling flow gap 210 may extend between the downstream end portion 114 and the upstream end portion 112 of the corresponding fuel injection panel 100. During operation, as shown in FIG. 30, air 26 from the compressor discharge casing 32 (FIG. 2) flows against the outer impingement panel 178 and through the impingement holes 182. The impingement holes 182 direct multiple jets of the air 26 against and/or across the outer surface 180 of the outer liner segment 108 at discrete locations to provide jetted or impingement cooling thereto. The air 26 may then flow through the inlet 184 at the upstream end portion 112 of the outer liner segment 108 and into the premix air plenum 144 defined within the fuel injection panel 110 where it may be distributed to the individual pressure side premixing channels 132 and/or suction side premixing channels 134. The outer liner segment 108 may define, along each longitudinal edge thereof, a C-shaped slot 109 within which a seal (not shown) may be installed along its length to seal the joint 122 between adjacent outer liner segments 108.

As shown in FIG. 31, the inner impingement panel 188 may be radially spaced from the outer surface 190 of the inner liner segment 106 to form a cooling flow gap 212 therebetween. The cooling flow gap 212 may extend between the downstream end portion 114 and the upstream end portion 112 of the corresponding fuel injection panel 100. During operation, as shown in FIG. 31, air 26 from the compressor discharge casing 32 flows against the inner impingement panel 188 and through the impingement holes 192. The impingement holes 192 direct multiple jets of the air against and/or across the outer surface 190 of the inner liner segment 106 at discrete locations to provide jetted or impingement cooling thereto. The air 26 may then flow through the inlet 194 at the upstream end portion 112 of the inner liner segment 106 and into the premix air plenum 144 defined within the fuel injection panel 110 where it may be distributed to the individual pressure side premixing channels 132 and/or the suction side premixing channels 134. The inner liner segment 106 may define, along each longitudinal edge thereof, a C-shaped slot 107 within which a seal (not shown) may be installed along its length to seal the joint 122 between adjacent inner liner segments 106.

FIGS. 30 and 31 further illustrate at least one microchannel cooling passage 216 extending through the outer liner segment 108 and/or the inner liner segment 106, respectively. The micro-channel cooling passage 216 has an inlet hole 214 in communication with the cooling flow gap 210 (as shown in FIG. 30) or the premix air plenum (as shown in FIG. 31). The micro-channel cooling passages 216 terminate in air outlet holes 218, which may be located along the longitudinal edges of the respective liner segment 106 or 108.

Figure 32:
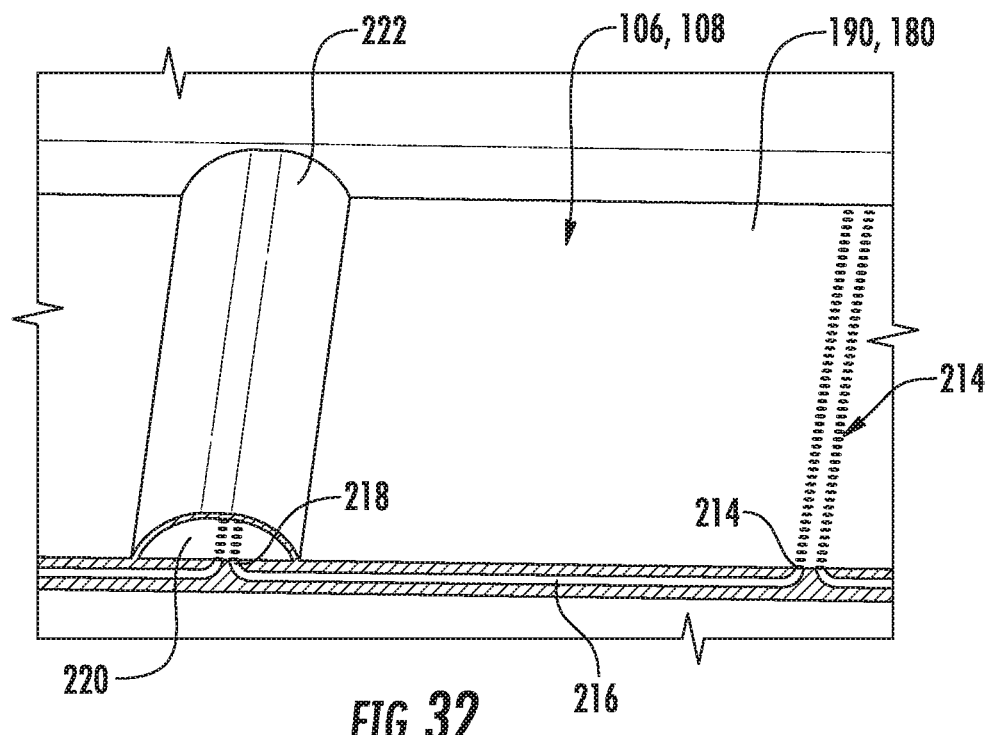
FIG. 32 provides a portion of either an inner liner segment or an outer liner segment of a combustor nozzle, according to at least one embodiment of the present disclosure.
Figure 33:
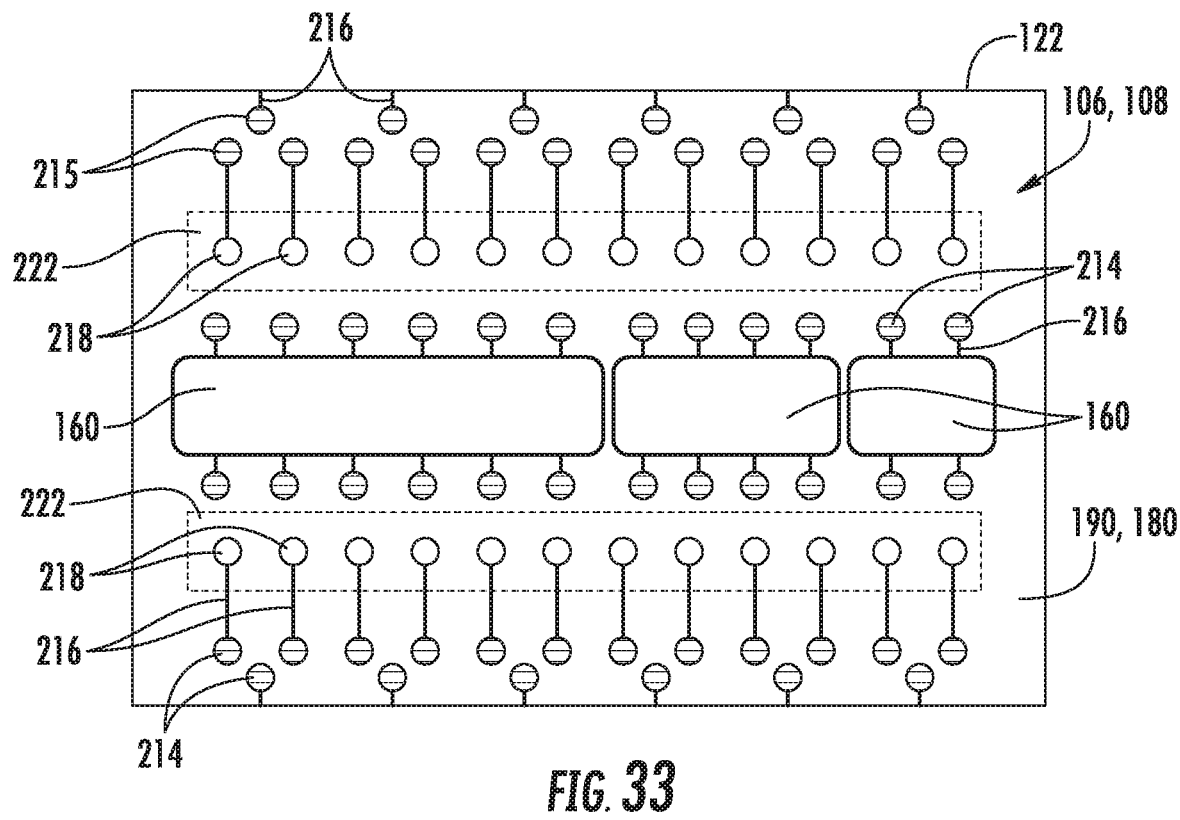
FIG. 33 provides a portion of either an inner liner segment or an outer liner segment of a combustor nozzle, according to at least one embodiment of the present disclosure.

FIGS. 32 and 33 are intended to be illustrative of a portion of either the inner liner segment 106 or the outer liner segment 108, according to particular embodiments of the present disclosure. In particular embodiments, as shown in FIGS. 32 and 33, the outer surface 190 of the inner liner segment 106 and/or the outer surface 180 of the outer liner segment 108 may define or include a plurality of air inlet holes 214 for receiving air from the compressor discharge casing 32 (FIG. 2). Each inlet hole 214 (shown in hatched lines in FIG. 33) may be integrated with a relatively short micro-channel cooling passage 216 that terminates at a corresponding air outlet hole 218 (shown as a solid circle in FIG. 33). In the illustrated embodiment, the inlet hole(s) 214 and the corresponding outlet hole(s) 218 are disposed on the same surface (i.e., the outer surface 180, 190) of the respective liner segment 108, 106. However, in other embodiments, the outlet hole(s) 218 may be disposed on the inner surface.

The length of the micro-channel cooling passages 216 may vary. In particular embodiments, the length of some or all of the micro-channel cooling passages 216 may be less than about ten inches. In particular embodiments, the length of some or all of the micro-channel cooling passages 216 may be less than about six inches. In particular embodiments, the length of some or all of the micro-channel cooling passages 216 may be less than about two inches. In particular embodiments, the length of some or all of the microchannel cooling passages 216 may be less than about one inch. Generally speaking, the micro-channel cooling passages 216 may have a length of between 0.5 inches and six inches. The length of the various micro-channel cooling passages 216 may be determined by the diameter of the micro-channel cooling passage 216, the heat pick-up capability of the air flowing therethrough, and the local temperature of the area of the liner segment 106, 108 being cooled.

In particular embodiments, one or more of the air outlet holes 218 may be located along the outer surface 190, 180 of the respective inner liner segment 106 or the outer liner segment 108 and may deposit the air from the respective inlet holes 214 into a collection trough 220 (FIG. 32). As shown in FIG. 32, the collection trough 220 may be defined by a duct 222 that extends along the respective outer surface 190 of the inner liner segment 106 or the outer surface 180 of the outer liner segment 108. The collection trough 220 may channel at least a portion of the air to the premix air plenum 144 (FIG. 31) of the fuel injection panel 110 where it may be distributed to the various pressure side premixing channels 132 and/or the suction side premixing channels 134. More details about microchannel cooling are described in commonly assigned U.S. patent application Ser. No. 14/944,341, filed Nov. 18, 2015.

In particular embodiments, as shown in FIG. 32, one or more of the micro-channel cooling passages 216 may be oriented so as to terminate in the openings 162, 164 of one or more of the air cavities 160. Thus, the air from one or more of the micro-channel cooling passages 216 may be mixed with the air that is used to cool the interior of the fuel injection panel 110, which may or may not have impingement air inserts therein. In particular embodiments, as shown in FIGS. 30 and 31, the outlet holes 218 of one or more of the micro-channel cooling passages 216 may be located along a side wall of the inner liner segment 106 or a side wall of the outer liner segment 108 such that the air flows through the micro-channel cooling passages 216 and then between two circumferentially adjacent inner liner segments 106 or outer liner segments 108 along the split line 122 (FIG. 28), thereby creating a fluid seal therebetween. In one embodiment, the outlet holes 218 of one or more of the micro-channel cooling passages 216 may be located along an inner surface of the inner liner segment 106 or an inner surface of the outer liner segment 108 such that the air flows through the micro-channel cooling passages 216 and then enters either the primary or the secondary combustion zones 102, 104 as film air.

It is also contemplated herein that, instead of (or in addition to) cooling the liner segments 106, 108 by impingement cooling or microchannel cooling, the liner segments 106, 108 may be cooled convectively. In this configuration (not shown), the liner segments 106, 108 are provided with correspondingly shaped cooling sleeves, thereby defining an annulus between the liner segment and the sleeve. The aft ends of the sleeves are provided with a plurality of cooling inlet holes, which permit air 26 to enter the annulus and be conveyed upstream to the premixed plenum 144. The outer surface of the liner segment 106, 108 and/or the inner surface(s) of the sleeve(s) may be provided with heat-transfer features, such as turbulators, dimples, pins, chevrons, or the like, to augment the heat transfer away from the liner segment 106, 108. As the air 26 passes through the annulus and over or around the heat-transfer features, the air convectively cools the respective liner segment 106, 108. The air 26 then enters the premixing air plenum 144 and is mixed with fuel, in one or both of the bundled tube fuel nozzle 302 or the premixing channels 132, 134. In the case where the air is directed into the premixing channels 132, 134, the air further cools the channels 132, 134, as the air flows through.

Figure 34:
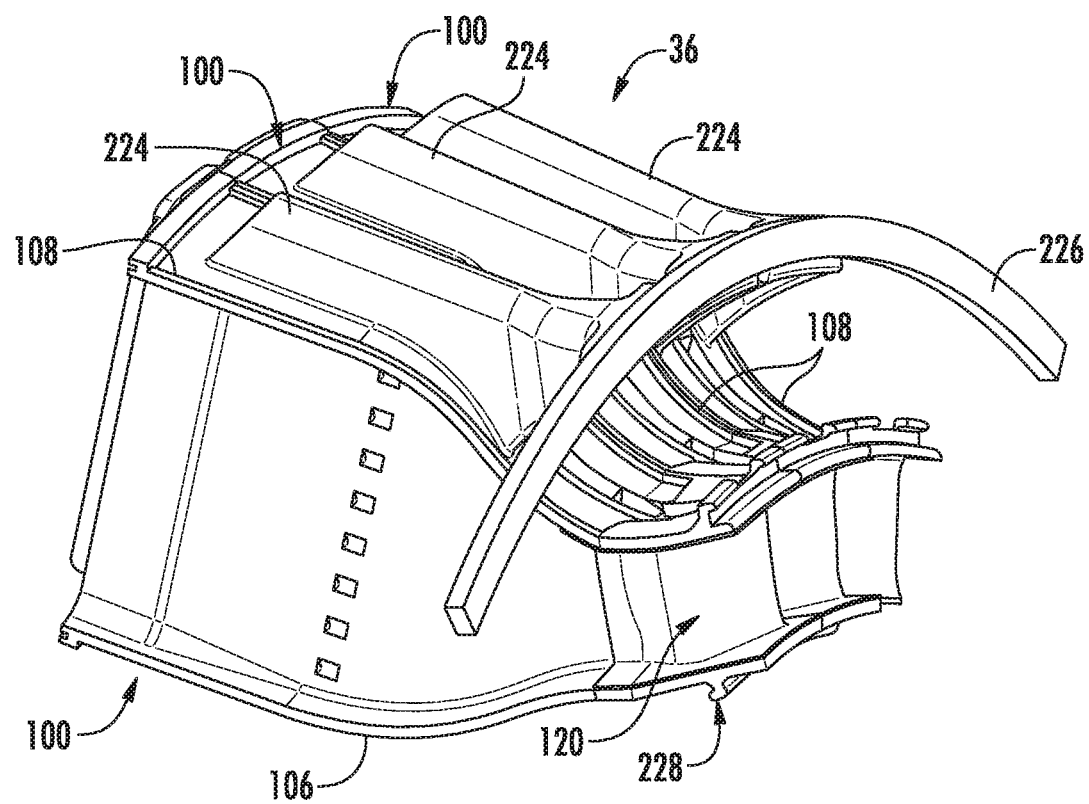
FIG. 34 provides a suction side perspective view of a portion of an exemplary segmented annular combustion system, according to at least one embodiment of the present disclosure.
Figure 35:
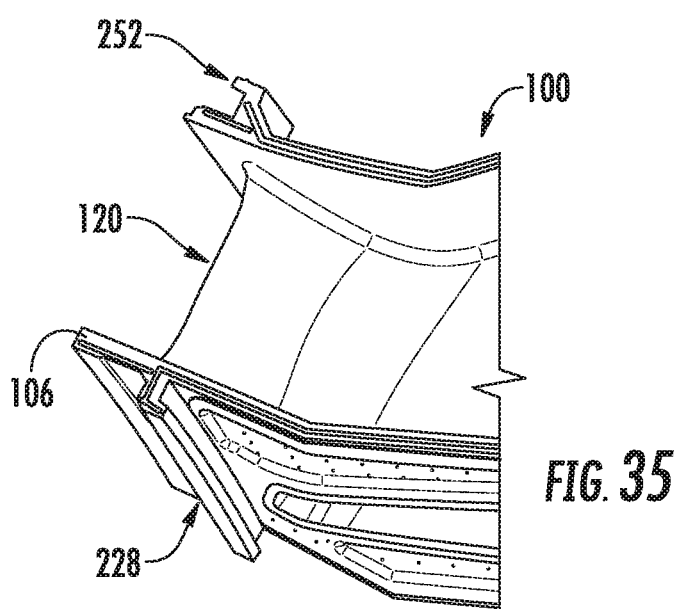
FIG. 35 provides a bottom perspective view of a portion of the combustor nozzle as shown in FIG. 34, according to one embodiment of the present disclosure.
Figure 36:
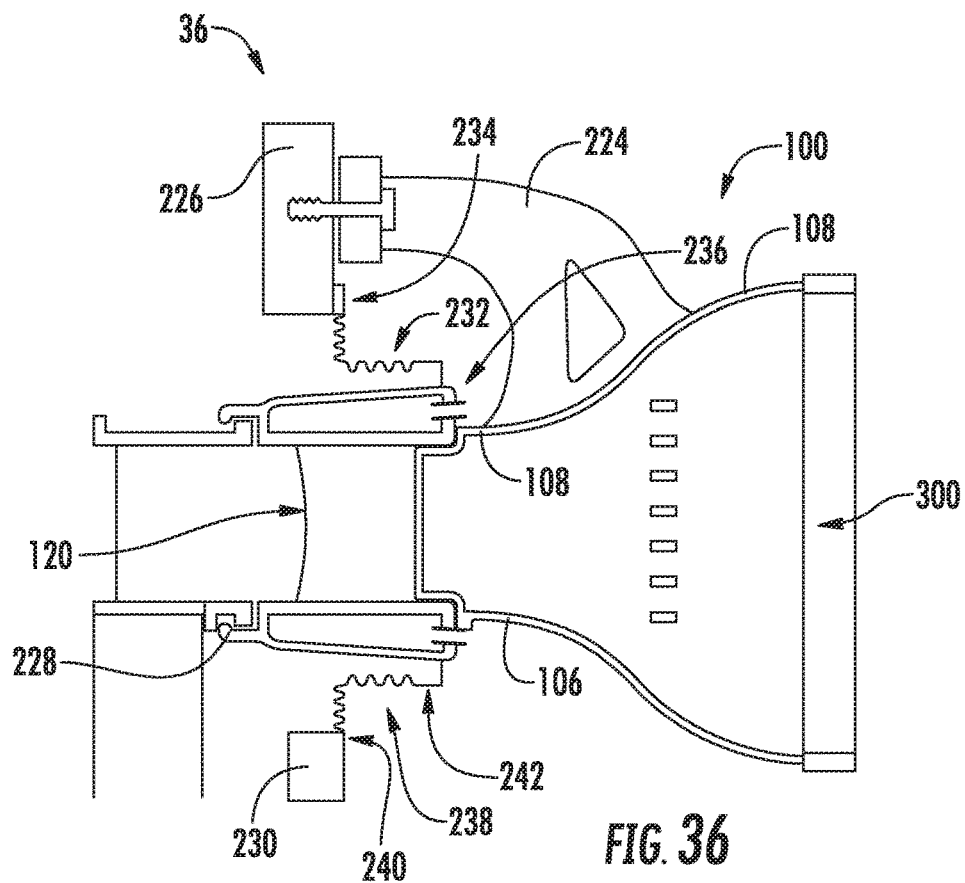
FIG. 36 provides a cross-sectioned side view of an exemplary combustor nozzle mounted within the segmented annular combustion system, according to one embodiment of the present disclosure.

FIG. 34 provides a perspective view of a portion of a suction side of the segmented annular combustion system 36, according to at least one embodiment of the present disclosure. FIG. 35 provides a bottom perspective view of a portion of one exemplary integrated combustor nozzle 100, according to one embodiment of the present disclosure. FIG. 36 provides a cross-sectioned side view of an exemplary integrated combustor nozzle 100 mounted within the segmented annular combustion system 36, according to one embodiment of the present disclosure.

In one embodiment as shown in FIG. 34, each integrated combustor nozzle 100 includes a mounting strut 224 attached to a corresponding outer liner segment 108. In order to support the integrated combustor nozzles 100 within the combustion section 16, each mounting strut 224 is attached to an outer mounting ring 226. Although the outer mounting ring 226 is shown at the aft end of the liner segments 108, it should be understood that the mounting struts 224 may be configured to permit the mounting ring 226 to be disposed at the forward end of the liner segments 108 (as in FIG. 36) or at some position intermediate between the forward and aft ends.

In particular embodiments, as shown in FIGS. 34, 35 and 36 collectively, each integrated combustor nozzle 100 may include an inner hook or hook plate 228 and an outer hook or hook plate 252. The inner hook 228 may be disposed along, or may be attached to, the inner liner segment 106 or may form a part of the inner liner segment 106 proximate the turbine nozzle 120. The outer hook 252 may be disposed along, or may be attached to, the outer liner segment 108 or may form a part of the outer liner segment 108 proximate the turbine nozzle 120. As shown in FIG. 36, each inner hook 228 may be coupled to an inner mounting ring 230. The inner hook 228 and the outer hook 252 may be oppositely disposed or extend in opposite axial directions.

In particular embodiments, as shown in FIG. 36, an outer double bellows seal 232 extends between the outer mounting ring 226 and the outer liner segment 108 proximate to the turbine nozzle 120. One end portion 234 of the outer double bellows seal 232 may be coupled to or sealed against the outer mounting ring 226. A second end portion 236 of the outer double bellows seal 232 may be coupled to or sealed against the outer liner segment 108 or an intermediate structure attached to the outer liner segment 108. In other embodiments, the outer double bellows seal 238 may be replaced by one or more leaf seals.

In particular embodiments, an inner double bellows seal 238 extends between the inner mounting ring 230 and the inner liner segment 106 proximate to the turbine nozzle 120. One end portion 240 of the inner double bellows seal 238 may be coupled to or sealed against the inner mounting ring 230. A second end portion 242 of the inner double bellows seal 238 may be coupled to or sealed against the inner liner segment 106 or an intermediate structure attached to the inner liner segment 106. In other embodiments, the inner double bellows seal 238 may be replaced by one or more leaf seals.

Figure 37:
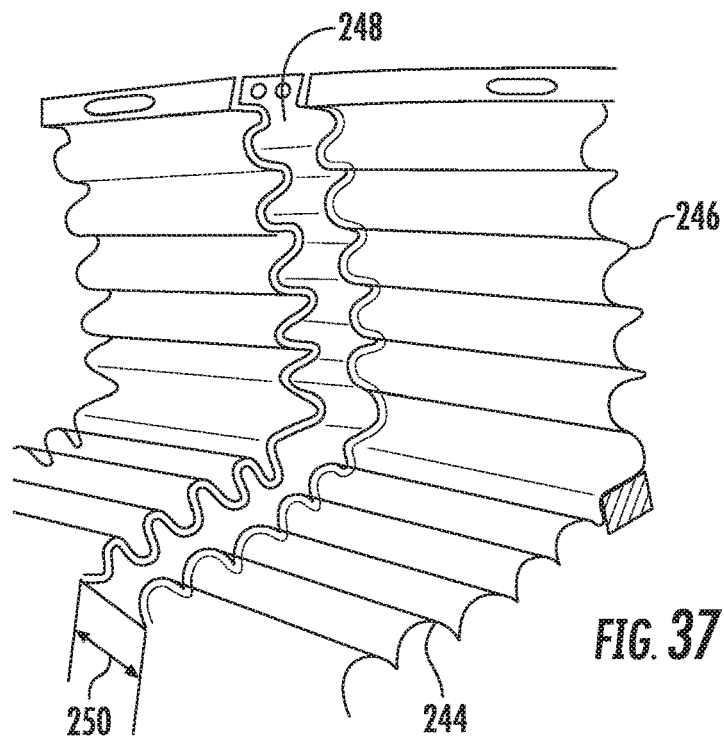
FIG. 37 provides a perspective view of a pair of circumferentially adjacent double bellows seals, according to at least one embodiment of the present disclosure.

FIG. 37 provides a perspective view of a pair of circumferentially adjacent double bellows seals and is intended to be illustrative of either the inner or the outer double bellows seals 238, 232, according to at least one embodiment. The inner and/or outer double bellows seals 238, 232 may be produced by welding or otherwise joining two bellows segments 244 and 246. The inner and/or outer double bellows seals 238, 232 (or leaf seals) may accommodate movement between the inner mounting ring 230 and the integrated combustor nozzles 100 and/or movement between the outer mounting ring 226 and the integrated combustor nozzles 100 in both axial and radial directions. Each or some of the inner double bellows seals 238 or the outer double bellows seal 232 (or, alternately, leaf seals) may circumferentially span more than one integrated combustor nozzle 100. In particular embodiments, an intermediate double bellows seal 248 (or leaf seal) may be placed over a gap 250, which may be formed between circumferentially adjacent double bellows (or leaf) seals.

Figure 38:
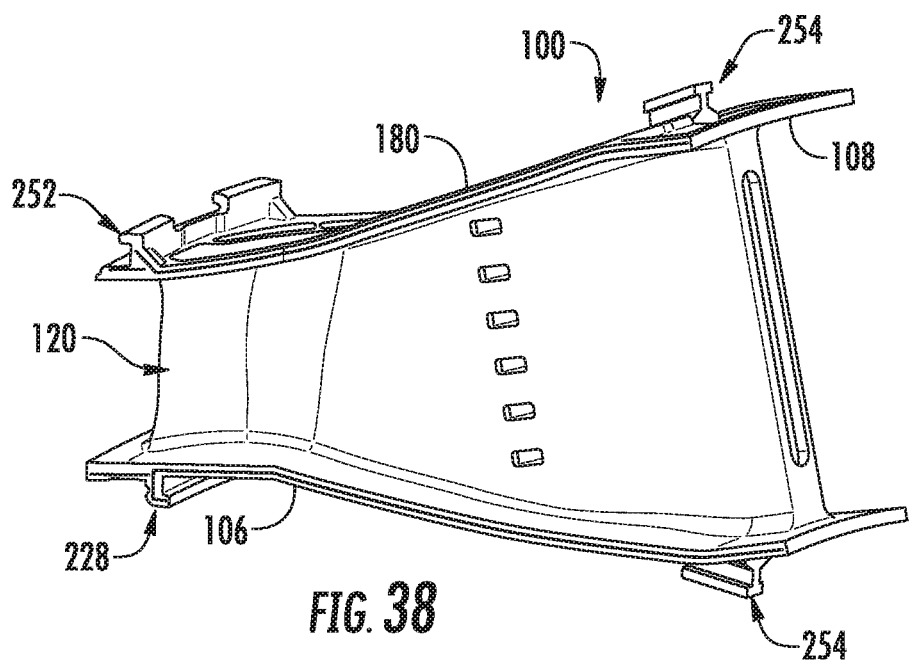
FIG. 38 provides a pressure side perspective view of an exemplary combustor nozzle, according to one embodiment of the present disclosure.
Figure 39:
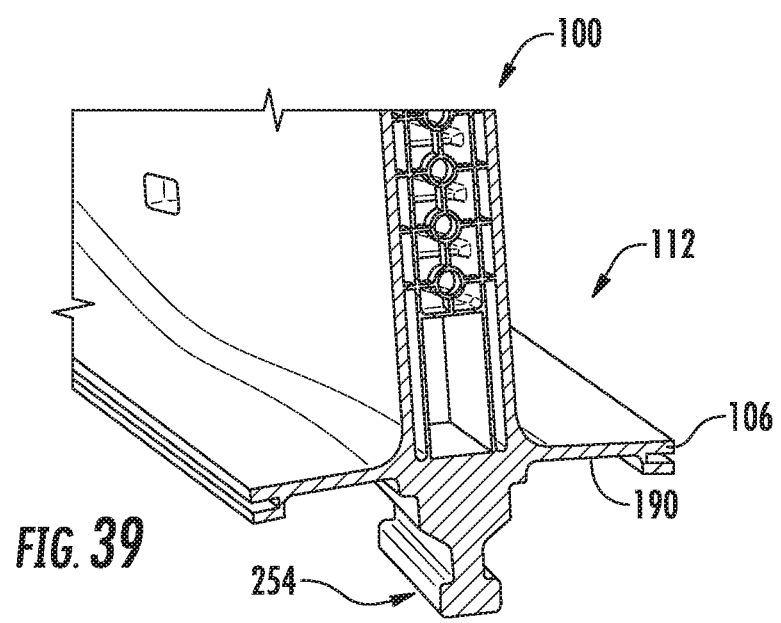
FIG. 39 provides a cross-sectioned perspective view of a portion of the combustor nozzle as shown in FIG. 38, according to one embodiment of the present disclosure.

FIG. 38 provides a perspective view of a pressure side of an exemplary integrated combustor nozzle 100, according to one embodiment of the present disclosure. FIG. 39 provides a cross-sectioned perspective view of a portion of the integrated combustor nozzle 100, as shown in FIG. 38. In one embodiment, as shown in FIGS. 35 and 38, the integrated combustor nozzle 100 includes the inner hook or hook plate 228. The inner hook 228 may be disposed along or may be attached to the inner liner segment 106 or may form a part of the inner liner segment 106 proximate the turbine nozzle 120. The integrated combustor nozzle 100 may also include one or more outer hooks 252 defined along the outer surface 180 of the outer liner segment 108 proximate the turbine nozzle 120.

As shown in FIGS. 38 and 39, the integrated combustor nozzle 100 further includes a mounting tenon or root 254 disposed along the outer surface 190 of the inner liner segment 106 proximate the upstream end 112 of the integrated combustor nozzle 100. In particular embodiments, as shown in FIG. 38, a separate mounting tenon 254 may be disposed along and/or attached to the outer surface 180 of the outer liner segment 108 proximate the upstream end 112 of the integrated combustor nozzle 100, instead of, or in addition to, the mounting tenon 254 attached to the inner liner segment 106. In particular embodiments, the mounting tenon 254 (whether on the inner liner segment 106 or the outer liner segment 108 or both) may have a dovetail or fir tree shape.

Figure 40:
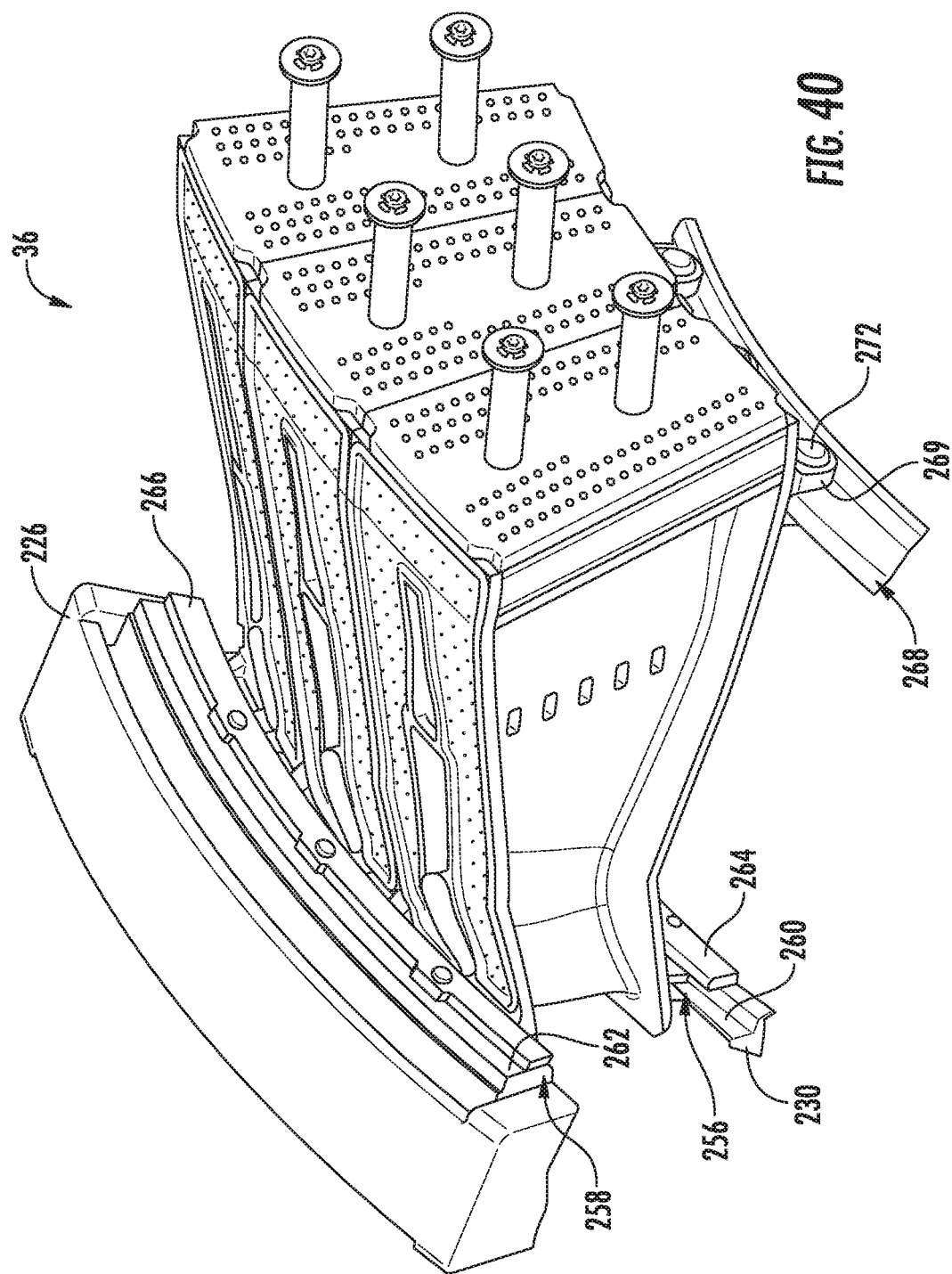
FIG. 40 provides a perspective view of a portion of a segmented annular combustion system, according to one embodiment of the present disclosure.
Figure 41:
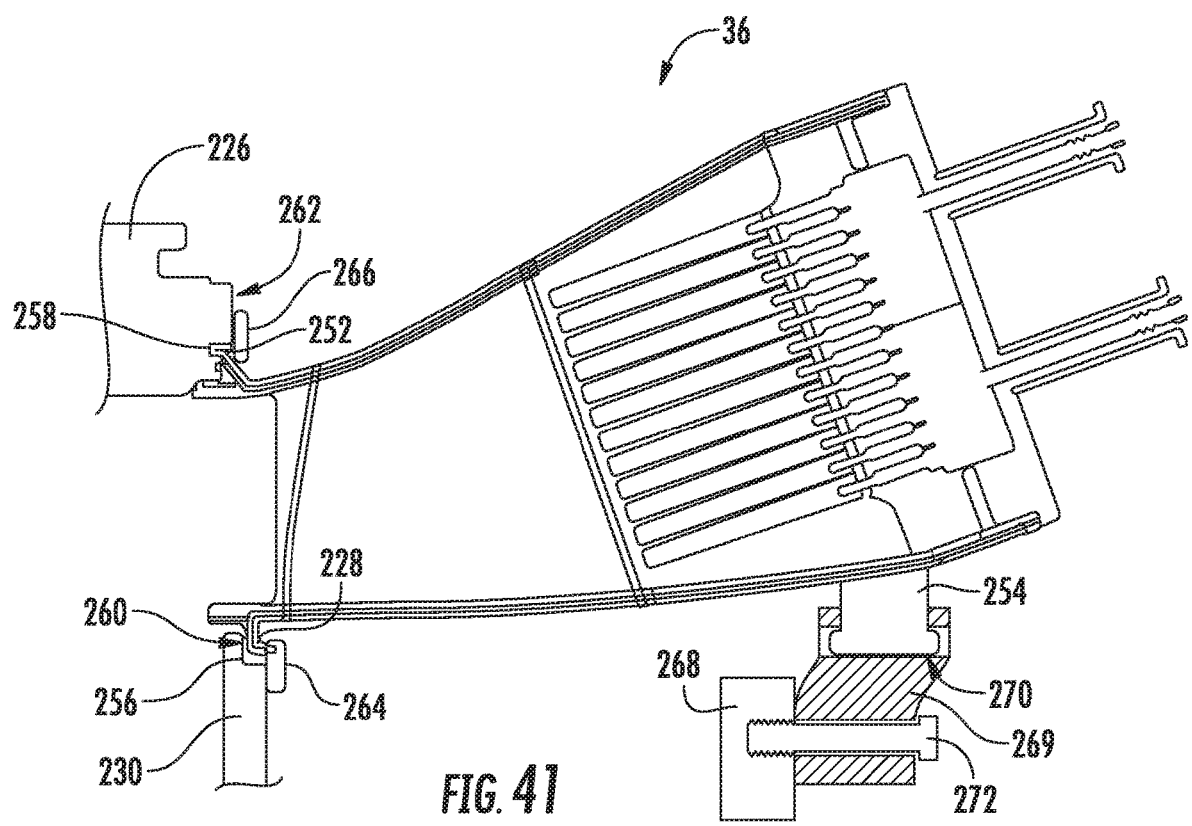
FIG. 41 provides a cross-sectioned side view of the portion of the segmented annular combustion system shown in FIG. 40, according to one embodiment of the present disclosure.

FIG. 40 provides a perspective view of a portion of the segmented annular combustion system 36, according to one embodiment of the present disclosure. FIG. 41 provides a cross-sectioned side view of the portion of the segmented annular combustion system 36 shown in FIG. 40, according to one embodiment. As shown in FIGS. 40 and 41 collectively, the segmented annular combustion system 36 may be mounted to the outer mounting ring 226 and to the inner mounting ring 230.

As shown in FIGS. 40 and 41 collectively, inner slots 256 and outer slots 258 are provided and/or defined on vertical face portions 260, 262 of the inner mounting ring 230 and the outer mounting ring 226 respectively, for receiving the inner hooks 228 and the outer hooks 252, respectively. As mentioned above, the inner hooks 228 and the outer hooks 252 may be oppositely disposed or extend in opposite axial directions. An inner slot cover 264 may cover or secure the inner hooks 228 within the inner slots 256. The inner slot cover 264 may be bolted or otherwise joined to the inner mounting ring 230 to secure the inner hooks 228 into place. An outer slot cover 266 may cover or secure the outer hooks 252 within the outer slots 258. The outer slot cover 266 may be bolted or otherwise joined to the outer mounting ring 226 to secure the outer hooks 252 into place.

Figure 42:
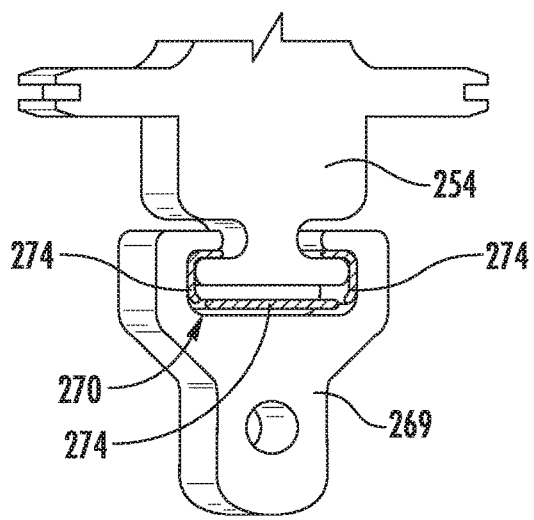
FIG. 42 provides a cross-sectioned downstream perspective view of an exemplary tenon mounted within a tenon mount, according to at least one embodiment of the present disclosure.

In various embodiments (shown in FIG. 41), the mounting tenon 254 on the inner liner segment 106 may be installed within a tenon mount 269, which includes a slot 270 shaped to receive the mounting tenon 254. In turn, the tenon mount 269 may be joined, via a mechanical fastener 272 (such as a bolt or pin), to an inner forward mounting ring 268. FIG. 42 provides a cross-sectioned downstream perspective view of an exemplary tenon 254 mounted within the mounting flange slot 270, according to at least one embodiment of the present disclosure.

In particular embodiments, as shown in FIG. 42, a damper 274 (such as a spring, spring seal, or damping mesh material) may be disposed within each slot 270 between the slot walls and the tenon 254. The damper(s) 274 may reduce wear and improve the mechanical life and/or performance of the tenon 254 over time by reducing vibrations at that joint or interface.

The various embodiments of the segmented annular combustion system 36, particularly the integrated combustor nozzles 100 in combination with the fuel injection modules 300 described and illustrated herein, provide various enhancements or improvements to the operations and turndown capability over conventional annular combustion systems. For example, during start-up of the segmented annular combustion system 36, the igniters 364 ignite the fuel and air mixture flowing from the outlets 328 of the tubes 322 of the plurality of tubes 322. As power needs increase, fuel to some portion or all of the fuel injection lances 304 supplying the fuel injection panels 110 may be turned on simultaneously or sequentially until each fuel injection panel 110 is fully operational.

To reduce power output, the fuel flowing to some portion or all of the fuel injection lances 304 may be throttled down simultaneously or sequentially, as desired. When it becomes desirable or necessary to turn off some of the fuel injection panels 110, the fuel injection lances 304 of every other fuel injection panel 110 may be shut off, thereby minimizing any disturbance to the turbine operation.

Depending on the particular configurations of the fuel injection modules 300, the fuel injection lances 304 feeding the suction side premixing channels 134 may be turned off, while fuel to the fuel injection lances 304 feeding the pressure side premixing channels 132 continues. Depending on the particular configurations of the fuel injection modules 300, the fuel injection lances 304 feeding the pressure side premixing channels 132 may be turned off, while fuel to the fuel injection lances 304 feeding the suction side premixing channels 134 continues. Depending on the particular configurations of the fuel injection modules 300, the fuel injection lances 304 feeding every other fuel injection panel 110 may be turned off, while fuel to the fuel injection lances 304 feeding alternate fuel injection panels 110 continues.

In particular embodiments, fuel may be shut off to the radially inner (or first) subset 340 of fuel injection lances 304, or fuel may be shut off to the radially outer (or second) subset 344 of fuel injection lances 304 of one or more of the fuel injection panels 100. In particular embodiments, fuel to the first subset 340 of fuel injection lances 304 or fuel to the second subset 344 of fuel injection lances 304 of one or more of the fuel injection panels 100 may be shut off in an alternating pattern (radially inner/radially outer/radially inner/etc.) until all of the fuel injection lances 304 are turned off, and only the bundled tube fuel nozzle portions 302 are fueled. In other embodiments, various combinations of fueled and unfueled fuel lances 304 and bundled tube fuel nozzle portions 302 may be used to achieve the desired level of turndown.

While reference has been made throughout the present disclosure and in the accompanying Figures to a fuel injection module 300 with individual fuel lances 304, it is contemplated that the fuel lances 304 may be replaced by a fuel manifold in the fuel injection module 300 that interfaces with the premixing channels 132, 134 or by a fuel manifold located within the fuel injection panel 110 that delivers fuel to the premixing channels 132, 134. It is further contemplated that the fuel manifold may be located toward the aft end of the fuel injection panel 110, such that the fuel (or fuel-air mixture) cools the aft end of the fuel injection panel 110 before being introduced through the outlets 126, 128.

It is to be understood that fuel may be supplied to one or more of the fuel injection panels 110 and/or to one or more fuel injection modules 300 of the segmented annular combustion system 36 during various operational modes of the combustor. It is not required that each circumferentially adjacent fuel injection panel 110 or circumferentially adjacent fuel injection module 300 be supplied with fuel or fired simultaneously. Thus, during particular operational modes of the segmented annular combustion system 36, each individual fuel injection panel 110 and/or each fuel injection module 300 or random subsets of the fuel injection panels 110 and/or random subsets of the fuel injection modules 300 may be brought on-line (fueled) or shut off independently and may have similar or different fuel flow rates so as provide operational flexibility for such operational modes as start-up, turndown, base-load, full-load and other operational conditions.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A combustor nozzle of an annular combustor, comprising:
    an inner liner segment;
    an outer liner segment radially spaced from the inner liner segment; and
    a fuel injection panel that extends radially between the inner liner segment and the outer liner segment, the fuel injection panel including a forward end portion at an upstream end of the annular combustor, an aft end portion, a first side wall, a second side wall, a plurality of premixing channels defined between the first side wall and the second side wall, and a plurality of injection outlets defined along at least one of the first side wall and the second side wall;
    wherein each injection outlet of the plurality of injection outlets is in fluid communication with a respective premixing channel of the plurality of premixing channels; and
    wherein the aft end portion of the fuel injection panel defines a turbine nozzle.

2. The combustor nozzle as in claim 1, wherein the first side wall is a pressure side wall, and the second side wall is a suction side wall.

3. The combustor nozzle as in claim 2, wherein the plurality of injection outlets comprises a plurality of suction side injection outlets radially spaced along the suction side wall, the plurality of suction side injection outlets defining a radial injection plane downstream of the forward end portion of the fuel injection panel, and wherein each suction side injection outlet is in fluid communication with a respective premixing channel of the plurality of premixing channels.

4. The combustor nozzle as in claim 2, wherein the plurality of injection outlets comprises a plurality of pressure side injection outlets radially spaced along the pressure side wall, the plurality of pressure side injection outlets defining a radial injection plane downstream of the forward end portion of the fuel injection panel, and wherein each pressure side injection outlet is in fluid communication with a respective premixing channel of the plurality of premixing channels.

5. The combustor nozzle as in claim 1, wherein the plurality of injection outlets comprises a plurality of suction side injection outlets radially spaced along the suction side wall in a first radial plane and a plurality of pressure side injection outlets radially spaced along the pressure side wall in a second radial plane, and wherein each suction side injection outlet and each pressure side injection outlet is in fluid communication with a respective premixing channel of the plurality of premixing channels.

6. The combustor nozzle as in claim 5, wherein the first radial plane is axially offset from the second radial plane.

7. The combustor nozzle as in claim 2, further comprising a premix air plenum defined between the pressure side wall and the suction side wall, wherein each premixing channel of the plurality of premixing channels is in fluid communication with the premix air plenum.

8. The combustor nozzle as in claim 2, further comprising a partition that extends within the fuel injection panel between an inner surface of the pressure side wall and an inner surface of the suction side wall, wherein the partition at least partially defines a cooling air cavity within the fuel injection panel.

9. The combustor nozzle as in claim 8, wherein the partition defines a plurality of apertures, wherein the plurality of apertures provide for cooling air flow through the partition into or out of the cooling air cavity.

10. The combustor nozzle as in claim 1, wherein one or more of the premixing channels of the plurality of premixing channels includes a straight portion and a curved portion, and wherein the curved portion is defined proximate to a respective injection outlet of plurality of injection outlets.

11. The combustor nozzle as in claim 2, wherein the plurality of premixing channels is radially stacked within the fuel injection panel between the pressure side wall and the suction side wall.

12. The combustor nozzle as in claim 11, wherein the plurality of premixing channels comprises a plurality of pressure side premixing channels and a plurality of suction side premixing channels arranged in an alternating radial stack between the pressure side wall and the suction side wall within the fuel injection panel.

13. The combustor nozzle as in claim 12, wherein each pressure side premixing channel of the plurality of pressure side premixing channels includes a straight portion and a curved portion that curves towards the pressure side wall, and each suction side premixing channel of the plurality of suction side premixing channels includes a straight portion and a curved portion that curves towards the suction side wall.

14. The combustor nozzle as in claim 1, further comprising a thermal shield extending at least partially across the turbine nozzle of the fuel injection panel.

15. The combustor nozzle as in claim 1, wherein the first side wall is a pressure side wall and the second side wall is a suction side wall, and wherein the turbine nozzle comprises a concave pressure side and a convex suction side, the concave pressure side being integral with the pressure side wall and the convex suction side being integral with the suction side wall.

16. The combustor nozzle as in claim 1, further comprising a plurality of collars radially stacked within the fuel injection panel upstream from the plurality of premixing channels, wherein each respective collar is aligned with a respective premixing channel of the plurality of premixing channels.

17. The combustor nozzle as in claim 16, wherein the first side wall is a pressure side wall and the second side wall is a suction side wall, and wherein each collar of the plurality of collars is connected to at least one of the pressure side wall and the suction side wall.

18. The combustor nozzle as in claim 16, wherein the fuel injection panel defines an opening disposed along the forward end portion and aligned with the plurality of collars, wherein one or more floating collars at least partially surround the opening.

19. The combustor nozzle as in claim 1, wherein the first side wall is a pressure side wall and the second side wall is a suction side wall, wherein the pressure side wall varies in thickness between the forward end portion and the aft end portion of the fuel injection panel, between the outer liner segment and the inner liner segment of the fuel injection panel, or both.

20. The combustor nozzle as in claim 1, wherein the first side wall is a pressure side wall and the second side wall is a suction side wall, and wherein the suction side wall varies in thickness between the forward end portion and the aft end portion of the fuel injection panel, between the outer liner segment and the inner liner segment of the fuel injection panel, or both.

21. The combustor nozzle as in claim 1, wherein an overall panel thickness of the fuel injection panel varies along at least one of an axial length and a radial span of the fuel injection panel.

22. The combustor nozzle as in claim 1, wherein the fuel infection panel defines a cross-fire tube that extends through the pressure side wall and the suction side wall.

23. The combustor nozzle as in claim 22, wherein the cross-fire tube includes a plurality of purge air holes in fluid communication with a cooling air cavity defined within the panel fuel injector.

24. The combustor nozzle as in claim 1, wherein the inner liner segment, the outer liner segment, and the fuel injection panel are formed as a singular body.

* * * * *